(12) United States Patent
Aharoni et al.

(10) Patent No.: US 9,846,235 B2
(45) Date of Patent: Dec. 19, 2017

(54) FRIEND OR FOE IDENTIFICATION SYSTEM AND METHOD

(71) Applicant: ISRAEL AEROSPACE INDUSTRIES LTD., Lod (IL)

(72) Inventors: Abraham Aharoni, Rehovot (IL); David Lou Alon, Ashkelon (IL); Aharon Yifrach, Ashkelon (IL)

(73) Assignee: Israel Aerospace Industries Ltd., Lod (IL)

( * ) Notice: Subject to any disclaimer, the term of this patent is extended or adjusted under 35 U.S.C. 154(b) by 503 days.

(21) Appl. No.: 14/419,954

(22) PCT Filed: Aug. 8, 2013

(86) PCT No.: PCT/IL2013/050677
§ 371 (c)(1),
(2) Date: Feb. 6, 2015

(87) PCT Pub. No.: WO2014/024196
PCT Pub. Date: Feb. 13, 2014

(65) Prior Publication Data
US 2015/0168554 A1    Jun. 18, 2015

(30) Foreign Application Priority Data

Aug. 9, 2012 (IL) .......................................... 221365
Mar. 17, 2013 (IL) .......................................... 225251

(51) Int. Cl.
*G01S 13/78* (2006.01)
*G01S 17/74* (2006.01)
(Continued)

(52) U.S. Cl.
CPC .............. *G01S 17/74* (2013.01); *G01S 7/484* (2013.01); *G01S 7/4911* (2013.01);
(Continued)

(58) Field of Classification Search
CPC ........ G01S 17/74; G01S 7/4911; G01S 13/78; G01S 13/88; G01S 15/74; G01S 17/08;
(Continued)

(56) References Cited

U.S. PATENT DOCUMENTS 4,736,463 A * 4/1988 Chavez .................... H01Q 3/34
                                                        342/367
4,743,911 A * 5/1988 Evans .................... H01Q 21/22
                                                        342/375

(Continued)

FOREIGN PATENT DOCUMENTS

EP    0 254 197 B1    2/1993
IL    225251           3/2013

OTHER PUBLICATIONS

Goodwin, Michael M. et al, "Constant Beamwidth Beamforming", Acoustics Research Department, AT&T Bell Laboratories, pp. I-169-I-172, 1993.

(Continued)

*Primary Examiner* — Peter M Bythrow
(74) *Attorney, Agent, or Firm* — Haug Partners LLP; William S. Frommer

(57) ABSTRACT

There are provided methods and systems for producing a wave-beam having substantially constant lateral extent over a desired range of distances, and interrogation and response system and methods utilizing the same. The method for producing a wave-beam having substantially constant lateral extent includes generating a plurality of at least partially incoherent constituent wave-beams having different divergences and directing the plurality constituent wave-beams to propagate along substantially parallel propagation axes such that the constituent wave-beams at least partially overlap and superpose to form a combined wave-beam. The divergences and intensities of the constituent wave-beams are selected such that the combined wave-beam has a desired (Continued)

substantially constant extent over a desired range of distances along said propagation axes.

22 Claims, 21 Drawing Sheets

(51) Int. Cl.
*G01S 7/52* (2006.01)
*H01Q 21/29* (2006.01)
*G10K 11/34* (2006.01)
*G01S 15/74* (2006.01)
*G01S 13/04* (2006.01)
*G01S 13/88* (2006.01)
*G01S 15/04* (2006.01)
*G01S 17/08* (2006.01)
*G01S 7/484* (2006.01)
*G01S 7/491* (2006.01)

(52) U.S. Cl.
CPC .......... *G01S 7/52046* (2013.01); *G01S 13/04* (2013.01); *G01S 13/78* (2013.01); *G01S 13/88* (2013.01); *G01S 15/04* (2013.01); *G01S 15/74* (2013.01); *G01S 17/08* (2013.01); *G10K 11/34* (2013.01); *H01Q 21/29* (2013.01)

(58) Field of Classification Search
CPC . G01S 7/52046; G01S 7/52047; G10K 11/34; H01Q 21/29
See application file for complete search history.

(56) References Cited

U.S. PATENT DOCUMENTS

| | | | | |
|---|---|---|---|---|
| 5,124,712 A * | 6/1992 | Caille | ............... | H01Q 21/0025 342/368 |
| 5,142,290 A * | 8/1992 | DuFort | ............... | H01Q 3/22 342/372 |
| 5,745,575 A * | 4/1998 | Otto | ............... | G01S 13/78 342/45 |
| 5,966,226 A * | 10/1999 | Gerber | ............... | F41G 3/2655 342/45 |
| 6,043,779 A * | 3/2000 | Lalezari | ............... | H01Q 3/26 342/371 |
| 6,369,700 B1 * | 4/2002 | Yamada | ............... | G01S 7/35 180/169 |
| 6,448,556 B1 | 9/2002 | Cowley et al. | | |
| 6,784,835 B2 * | 8/2004 | Kohno | ............... | H01Q 21/08 342/360 |
| 7,768,709 B2 * | 8/2010 | Froehlich | ............... | G01J 3/02 359/618 |
| 7,948,606 B2 | 5/2011 | Visser et al. | | |
| 8,184,981 B2 | 5/2012 | Ivtsenkov et al. | | |
| 8,466,848 B2 * | 6/2013 | Guy | ............... | H01Q 3/2676 343/853 |
| 2003/0147651 A1 * | 8/2003 | Roes | ............... | F41G 3/2655 398/108 |
| 2004/0243000 A1 * | 12/2004 | Umemura | ............... | G01S 7/52026 600/437 |
| 2005/0157762 A1 * | 7/2005 | DeMaria | ............... | B23K 26/0604 372/9 |
| 2006/0256335 A1 | 11/2006 | Chen | | |
| 2007/0295974 A1 * | 12/2007 | Fontanella | ............... | B23K 26/0604 257/88 |
| 2008/0027318 A1 * | 1/2008 | Umemura | ............... | G01S 7/5209 600/437 |
| 2008/0092657 A1 * | 4/2008 | Fritsch Yusta | ............... | G10K 11/341 73/596 |
| 2009/0009422 A1 * | 1/2009 | Guy | ............... | H01Q 3/2676 343/893 |
| 2009/0048789 A1 * | 2/2009 | Yu | ............... | G01N 29/069 702/39 |
| 2009/0109107 A1 * | 4/2009 | Gonzalez | ............... | H01Q 21/29 343/756 |
| 2009/0326377 A1 * | 12/2009 | Hirama | ............... | G01S 7/52046 600/447 |
| 2013/0033404 A1 * | 2/2013 | Abe | ............... | H01Q 13/02 343/776 |
| 2016/0195612 A1 * | 7/2016 | Shi | ............... | G01S 7/03 342/27 |

OTHER PUBLICATIONS

International Search Report dated Aug. 20, 2014.
European Search Report dated Feb. 17, 2016.

* cited by examiner

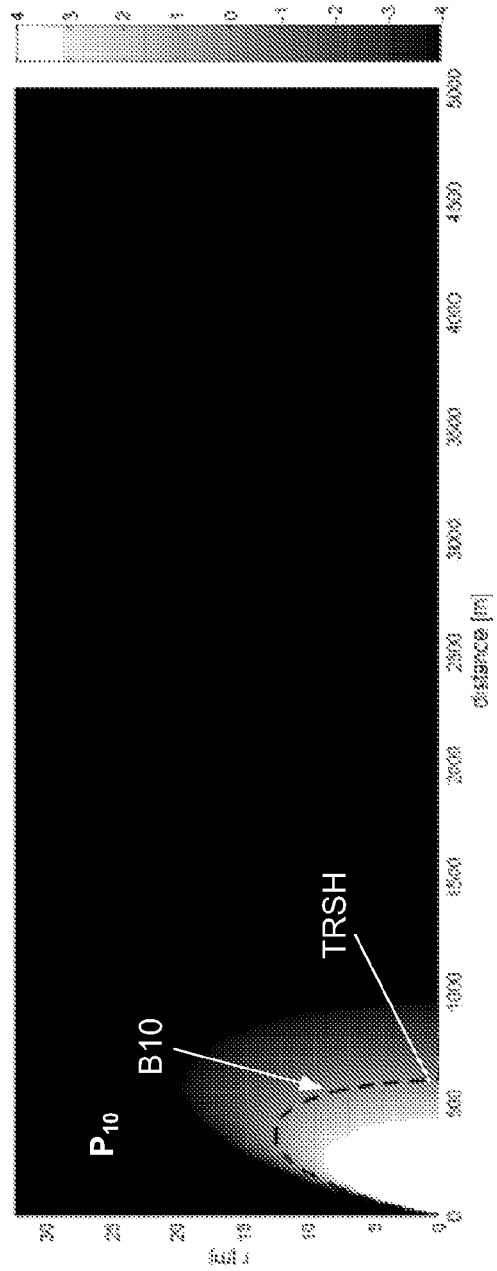
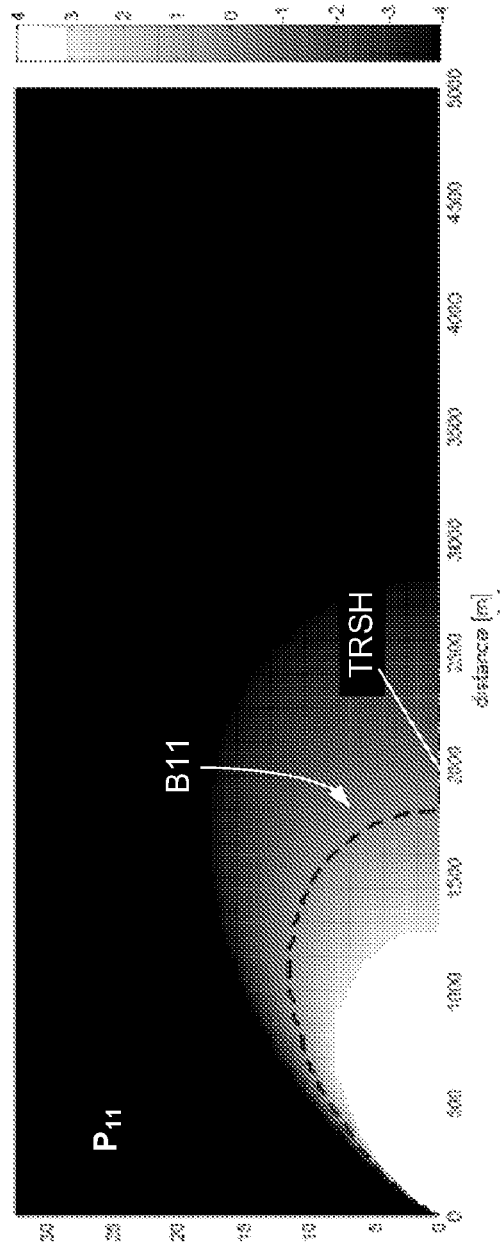
Fig. 3A
Fig. 3B

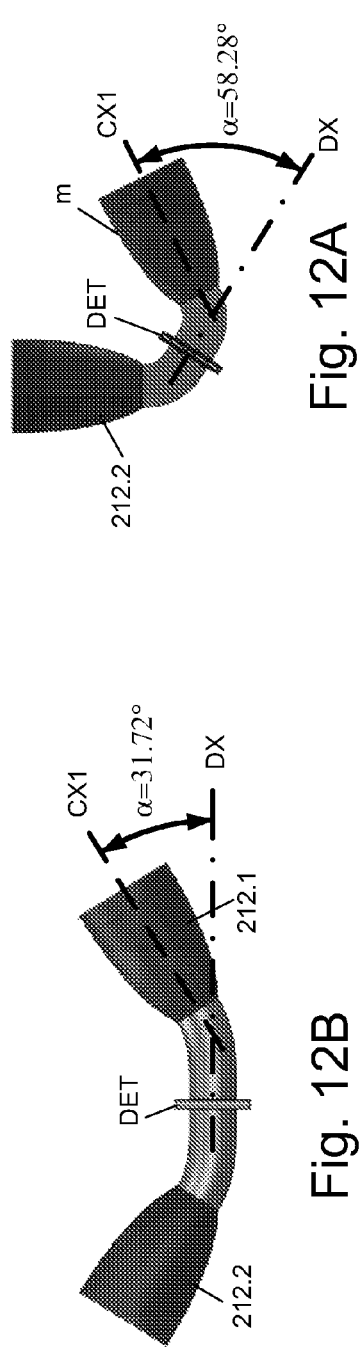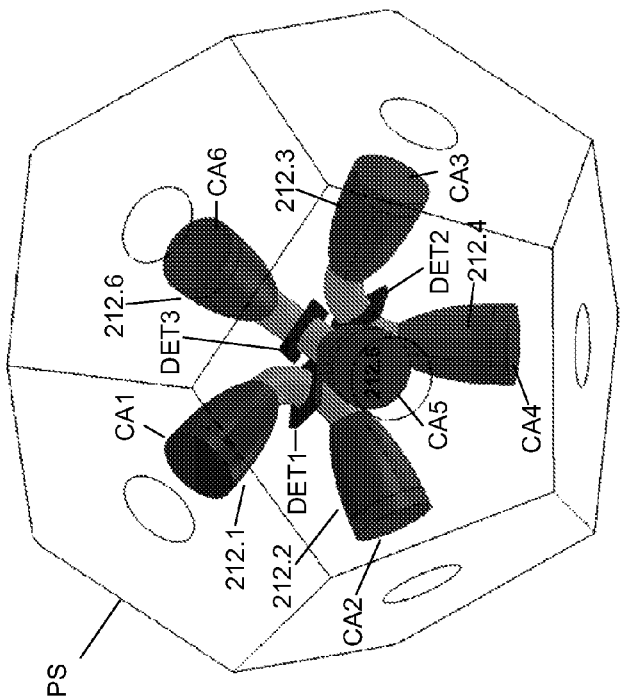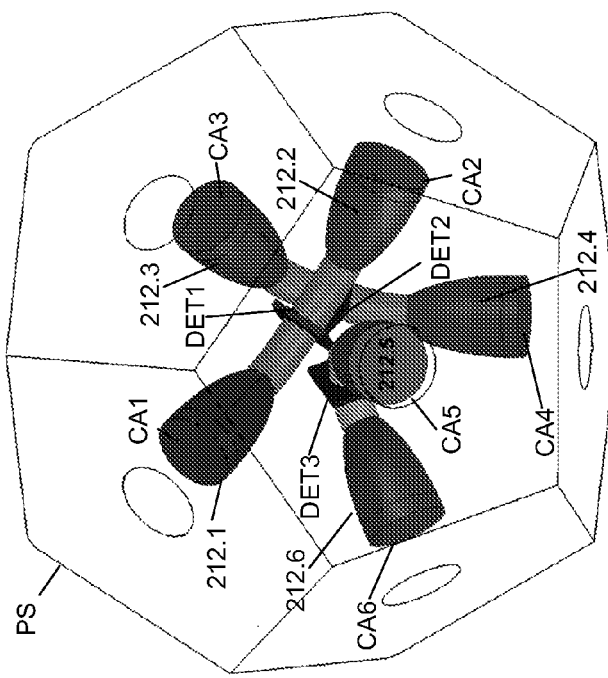
Fig. 12A
Fig. 12B
Fig. 12C
Fig. 12D

FRIEND OR FOE IDENTIFICATION SYSTEM AND METHOD

TECHNOLOGICAL FIELD

The present invention relates to techniques for shaping wave-beams and in particular to methods and systems for identification of friend-or-foe (IFF) utilizing shaped interrogation wave-beams.

BACKGROUND

Known in the art are communication systems for friend-or-foe (IFF) identification which typically include laser emitters mounted on aiming devices (e.g. mounted on fire-arms), which trigger light detectors on potential targets. For example, in a known IFF system described in the European patent No. 254,197, a laser signal and a radio signal are simultaneously transmitted towards a potential target. Upon receiving these two signals by detectors in a responder unit mounted on the target, the responder generates a radio signal response confirming its identity.

However, in general, wave-beams (such as, for example, light wave-beams, radio-frequency wave-beams, or acoustic wave-beams) diverge as they propagate: the wave-beam's lateral extent increases with the distance from the wave-beam's source (e.g. due to diffraction). Typical wave-beams such as electromagnetic and/or acoustic beams (e.g. laser beams) can be conveniently modeled in the para-axial approximation as a Gaussian wave-beam. This serves as a good model for the basic propagation mode of a wave-beam (TM 00). The following considers this basic mode, which, if needed, can be expanded to include higher order modes utilizing Gaussian, Hermite-Gaussian, Laguerre-Gaussian functions and/or combination thereof.

Gaussian beams maintain a nearly constant width with substantially no beam divergence near the beam "waist" (e.g. near the focal region) at which the wavefronts are planar, and normal to the direction of propagation. However, as the distance from the beam waist grows, a Gaussian beam asymptotically approaches a constant divergence (similar to that described by geometric ray optics).

Therefore, standard wave-beams with a Gaussian beam form are typically not used in cases where constant beam width is required along an extended range along the propagation axis of the beam. An extended range of constant beam-width may be achieved with Bessel beams whose amplitude distribution is described by a Bessel function of the first kind. However, although such beams do not diverge, ideal Bessel beams are difficult to generate in practice (as they require an unbounded/infinite illumination source). To this end, in applications requiring substantially constant beam-width along the propagation axis, Pseudo Bessel beams are typically used, formed in practice by focusing a Gaussian beam with an axicon lens. Nevertheless Pseudo Bessel beam approximations are practical only for limited distances/ranges because the constant-width beam gradually diffracts the light away from the region of interest, thereby causing intensity loss (which is not replenished due to the use of finite light source).

General Description

Generation of wave-beams having decreased or no divergence within the desired range of distances from the source of the beams may be advantageous for various applications, for example for applications in which the area illuminated by the wave-beam serves to define a region of interest. For example such applications include friend-or-foe identification (IFF) as well as laser-based bilateral simulation and training systems, and the Multiple Integrated Laser Engagement System (MILES).

Conventional applications such as MILES and IFF, which utilize common diverging laser beams to designate/define a region of interest, may not be effective or accurate enough to simulate the ammunition's hits and/or to identify friendly forces at both short and long ranges. This is due to the laser beam's divergence causing the illumination of a small cross-sectional area at short range and a larger cross-sectional area at larger ranges. The situation is exacerbated when the illuminated area is required to be much larger than the laser beams' source diaphragm/aperture (e.g. the optical aperture of the laser's output port), since to larger divergences are needed to achieve wider illumination cross-section areas. For example, considering a MILES illumination laser device for foot-soldier's weapon, the radius of its laser exit aperture may be in the order of few millimeters (e.g. 5 mm) while it may be required to illuminate/define an area of a region of interest extending several meters (e.g. illuminate a spot diameter of 500 mm at a distance of 300 m) in order to simulate a hit. To this end, utilizing conventional techniques with a Gaussian or near-Gaussian beam, the region of interest is not properly covered as the lateral extent/diameter of the spot varies significantly with the distance from the source of the beam (e.g. in the above example the spot diameter would be approximately only 250 mm at a distance 150 m, which is considerably smaller than the desired 500 mm value).

The use of pseudo Bessel beams, which potentially offer a fixed lateral extent as they propagate, are impractical and can be achieved in practice only over limited distances. This is because generation of a pseudo Bessel beam having practically constant lateral extent over a large range requires a beam source having large lateral dimensions (physical size), as well as very large power requirements of the beam's source (e.g. laser). Additionally, larger lateral dimensions of the beam's source are needed in cases where wider constant lateral extent of the beam is required and/or where the beam should have the constant lateral extent for longer distances.

The present invention provides a technique for generating a wave-beam (such as a light beam, radio-frequency beam, acoustic beam) having a substantially constant lateral extent (cross-sectional width) over a desired range of distances from the beam's source, while overcoming the aforementioned deficiencies of the known techniques. Moreover, according to the invention, provided are systems and methods capable of generating wave-beams whose substantially constant lateral extent is substantially larger than the lateral-extent/radius of the output aperture/diaphragm of the beam's source. This enables use of a small beam generator for producing wave-beams having substantially wider and constant lateral extent over a desired range.

According to this novel technique, a plurality of wave-beams (i.e. also referred to herein as component/constituent wave-beams e.g. light beams, radio frequency beams, or acoustic beams) having different divergences are superposed in at least a partial incoherent manner. This at least partial incoherency creates a combined beam (also referred to herein as interrogation wave-beam) having substantially constant lateral extent over a desired range of distances from the beam's source. In some embodiments, the constituent wave-beams are fully incoherent. This is achieved by producing beams which differ in optical path length by more than the coherence length and/or in wavelength, and/or in polarization, and/or in temporal occurrence (as shall be clarified below). In other embodiments, the constituent wave-beams are partially incoherent (as shall be clarified below).

It should be understood that in the scope of the present disclosure the term constant lateral extent and/or constant radius/diameter of a wave-beam refers to the cross-sectional width over a desired range along the propagation axis of the wave-beam, for which the amplitude or intensity (which is proportional to the amplitude squared) of the combined interrogation wave-beam is larger than or equal to a certain threshold amplitude or intensity. In other words the terms lateral extent/radius/dimensions of the beam relate to the dimensions of a cross-sectional contour of the beam at which the beam's intensity (e.g. or an integral of the intensity over a predetermined period of time, such as a detector's integration time) substantially equals a certain detection threshold value, while within this contour the intensity/integral-intensity is higher than the detection threshold, and outside thereof it is lower than the detection threshold. In practice the constant lateral extent, may be evaluated with devices that have a intensity detection threshold, and as such introduce a tolerance on this detection threshold, due, for example to angular misalignment of a detector with the incident wave-beam. Such a detection tolerance effectively introduces two threshold values (i.e. upper-limit and lower-limit intensity thresholds being respectively higher and lower than the nominal detection threshold). In other words, in the following a wave-beam is considered to have a desired constant lateral extent at a certain operating range, when at the boundary of the desired lateral extent, the beam's intensity is in-between the upper-limit and lower-limit intensity thresholds. In this regards, in some cases the upper-limit and lower-limit intensity thresholds may be respectively higher and lower by about 10% from the nominal detection threshold, and in some cases up to ±30% from the nominal detection threshold, while the beam is still considered to have the constant lateral extent.

In this connection, it should be noted that the term intensity used herein, should also be understood, where appropriate, as relating to an integral of the intensity over a period of time associated with the integration time of a detector designated for sensing/detecting the beam. Accordingly, in forming the interrogation wave-beam the constituent wave-beams may be superposed substantially simultaneously, wherein simultaneously should be understood in the sense that the beams are projected at the same time and/or at slightly different times, such that they co-exist within a timeframe in the order of or shorter than an integration time of a designated detector by which they are to be sensed. In this connection, in cases where the constituent wave-beams are projected at the same time, they should be at least partially incoherent with respect to one another so as to reduce interferences between them. Coherent constituent wave-beams projected at different times would generally not interfere, and in cases where they are projected within a time frame shorter than a detector's integration time, they would be sensed together as simultaneous incoherent beams by the detector. In this sense, such beams are considered in the following as at least partially incoherent beams.

Also, it should be noted that the terms illuminate, illuminating and/or illumination are used herein in their broad sense to designate "illumination" and/or interrogation by any type of wave-beam, which may be for example an acoustic-, optical- and/or radio-frequency wave-beam. Accordingly, these terms should not be construed as relating solely to optical/light beams.

It is understood that in incoherent superposition of two or more wave-beams, interference does not occur at all. In a partially coherent superposition (which is also referred to as "partially incoherent superposition" in this document), interference occurs, but the quality/strength of the interference pattern typically measured by its range of intensities between maximum and minimum (visibility in the non limiting example in which the wave-beams are light beams), is reduced (e.g. no portion of the interference pattern is completely dark). In some embodiments, this partial coherence between beams is sufficient for generating a combined wave-beam having substantially constant lateral extent over a desired range. Partial/full incoherence may be obtained by superposition of wave-beams whose optical path lengths differ to various extents (e.g. greater than a coherence length of the beams), and/or wave-beams of different wavelengths, and/or different polarizations (e.g. a combination of linearly-polarized and circularly-polarized wave-beams may provide partial incoherence), and/or beams having different temporal occurrences (which may be perceived as simultaneous by a designated detection module as clarified above). While small differences in such properties may be insufficient to render two wave-beams completely incoherent, it may be sufficient to ensure their partial incoherence necessary for the applications in this disclosure. Specifically, as long as the minimal fringe intensity is larger than, for example, twice the intensity threshold used to define the lateral extent of the wave-beam (as further clarified below), the partially coherent superposition between wave-beams is suitable for some applications of the disclosed invention.

An advantage of the present invention lies in its implementation of readily available wave-beam forms, such as Gaussian, or near Gaussian beams. Furthermore, contrary to pseudo Bessel beams, which can also offer a limited range of constant beam width, the present invention provides for a wave-beam having a constant lateral extent over extended distances and which can be significantly larger than the aperture of the wave-beam's source. Optionally, the lateral extent of the combined beam and/or the range at which the lateral extent of the beam remains substantially constant is adjustable, by adjusting the divergences and/or intensities of one or more of its constituent wave-beams, and/or by emitting and combining only part of the plurality of the constituent wave-beams.

To this end, according to the present invention there is also provided a novel IFF system and method having improved accuracy and reliability as well as providing for interrogation capability in near line-of-sight. This is achieved according to the invention by utilizing an interrogation system capable of generating an interrogation wave-beam (e.g. optical, radio frequency and/or acoustical) having an essentially constant lateral extent over a specified range. The interrogation beam provides for a well-defined interrogation region which is defined by the substantially constant lateral cross-section over the specified range. The interrogation region may have a relatively sharp illumination boundary, having suppressed or no side-lobes, and within which the interrogation beam's intensity (e.g. integral intensity) is higher than a certain predetermined detection threshold and out of which it is lower than that threshold.

In some cases, the IFF system includes a responder system (e.g. transponder) that is adapted to detect the interrogation beam, determine its intensity and transmit same back to the interrogation system. This allows the interrogation system to assess the quality of the responder's interrogation signal, providing for additional information as to the responder's location within the interrogating beam, and alerting the operator should repeated interrogations with realignment of the interrogation beam be needed. In this manner the IFF of the current invention offers reliability of determining that a responder is located within the prescribed interrogation region or not.

In some cases, an identification friend-or-foe (IFF) system according to the invention may utilize an interrogation wave-beam that maintains a substantially constant lateral extent over a working range of between 200 and 4,000 meters. Such an interrogation wave-beam may be, for example, constructed by a combination of three constituent wave-beams, each with a divergence and intensity selected so as to effect a combined wave-beam that covers an interrogation region/range with good approximation to the desired lateral extent.

In addition to the above, specific configurations of the present invention provide for several additional innovative features that improve the accuracy and reliability of the IFF. Specifically the invention provides for scanning for the responder's location by utilizing several interrogation wave-beams for covering different interrogation regions. For example, in order to refine the interrogation process, the interrogation may be implemented by utilizing two or more interrogation wave-beams sequentially to provide information as to where the responder is situated.

Many of the conventional IFF systems, which utilize optical wave-beams for interrogation, are prone to providing inaccurate and/or unreliable identification and high rates of mis-identifications and/or false alarms. This is due to various factors including the divergence of the interrogation wave-beam, as well as due to varying orientation of the receiving/detector module with respect to the interrogation wave beam (which affects the intensity of the interrogation wave-beam sensed by the receiving module). As a result of the above deficiencies, known IFF systems suffer from relatively deficient reliability.

To this end, the present invention provides various techniques for alleviating these deficiencies. More specifically, except from the use of the interrogation beam having a substantially constant lateral extent, as described above, the present invention also provides improved collection optics which is used, in some embodiments, by the responder system for collecting interrogation wave-beams from various directions.

Yet additionally, according to some embodiments, a novel interrogation protocol or method is provided which is implemented by the IFF system for improving its performance and reducing its energy consumption (specifically at the responder side which is typically battery operated). The interrogation protocol also allows for utilizing low-power and low-cost modules for measuring the intensity/amplitude of the interrogation wave-beam received by the responder. This intensity/amplitude information enables the interrogation system to determine the location of a responder with respect to the interrogation beam with improved accuracy, and indicate the quality of the interrogation response. The interrogation protocol also provides for avoiding interference and jamming of the response signals transmitted by the responder (e.g. by utilizing a frequency hopping technique as well as random delay transmission). The interrogation wave-beam may also be modulated to transmit a code (e.g. identification code) of the interrogator, which is communicated back to the interrogator together with a code/identification of the responder. This protocol allows the interrogator to authenticate the responder and ensure that the response it receives is related to the specific interrogation generated by it (and not to an interrogation of another interrogator). In addition, the code received from the interrogator ensures the responder that the interrogation is a legitimate one (and not a system that has been lost or has fallen into the hands of the enemy for which the codes are not up to date).

Furthermore, state of the art IFF systems are based on direct line-of-sight between the interrogator and the potential target. This limits the application of such systems when a target has been identified briefly but may be hidden from direct sight when an interrogator is activated. This is solved in some variants of the present invention, utilizing an optical wave-beam for interrogation and a radio frequency (RF) for acknowledgement response. The technique of the invention for producing an optical interrogation beam with narrow and well-defined lateral-extent/spot (which may be in the range of 2-3 meters) and with small divergence (e.g. in the range 1 to 6 mrad) allows the operation of the system in near-line-of-sight of the suspect target/responder (e.g. in an urban environment). This is because sufficient energy or power of such narrow and low-divergence interrogation wave-beams can reach the responder via scattering and/or reflection, even if the responder is located behind obstacles such as walls or vegetation obstructing direct line-of-sight between the interrogation system and the responder system. Also, the RF response, which is not directional, can also operate in such a near-line-of-sight condition.

Thus, according to a broad aspect of the present invention there is provided a method for producing a wave-beam having substantially constant lateral extent over a desired range of distances. The method includes generating a plurality of at least partially incoherent constituent wave-beams having different divergences and directing the plurality constituent wave-beams to propagate along substantially parallel propagation axes such that the constituent wave-beams at least partially overlap and superpose to form a combined wave-beam. The divergences and intensities of the constituent wave-beams are selected such that the combined wave-beam has a desired substantially constant lateral extent over a desired range of distances along said propagation axes.

In some embodiments the constituent wave-beams are emitted from one or more output apertures of dimensions significantly smaller than said desired substantially constant lateral extent. In case there are more than one output apertures, the output apertures are arranged such that a distance between propagation axes of any two of said constituent wave-beams is significantly smaller than said constant lateral extent of the desired combined wave-beam.

According to some embodiments of the present invention the plurality of the constituent wave-beams are generated substantially simultaneously, either concurrently or sequentially within a time frame not exceeding a response time of a certain intensity detector. The beams may be continuous wave beams (CW) or pulsed beams, and may be beams of electromagnetic radiation and/or acoustic insonification beams.

Also the cross-sectional shape of the combined wave-beam may take various shapes and may be for example circular and/or elliptic and/or substantially rectangular. According to some embodiments the method further includes adjusting the lateral extent of the desired combined wave-beam by controllably varying at least one of the divergence or intensity of at least one of the constituent wave-beams.

According to another broad aspect of the present invention there is provided a wave-beam generator including: at least one beam source adapted for providing at least one primary wave-beam, and wave directing and focusing module having at least one input port coupled to the at least one beam source and one or more output ports. The wave directing and focusing module includes an arrangement of one or more wave-affecting elements arranged to define a plurality of paths of different focusing powers in between the at least one input port and the one or more output ports and is configured and operable for producing from the at least one primary wave-beam a plurality of at least partially incoherent constituent wave-beams having different divergences. The wave directing and focusing module is also configured and operable for directing the plurality of constituent wave-beams to output from the one or more output ports and propagate along one or more substantially parallel axes of propagation such that the constituent wave-beams at least partially overlap and superpose to form a combined wave-beam. The at least one beam source and wave directing and focusing module are configured and operable for affecting the respective divergences and intensities of said constituent beams such that the combined wave-beam has a desired substantially constant lateral extent over a selected range of distances along the beam propagation axes.

In some embodiments of the present invention the one or more output ports of the wave-beam generator have apertures of dimensions significantly smaller than said desired substantially constant lateral extent, and are arranged such that distances between the propagation axes of the constituent wave-beams are significantly smaller than the desired substantially constant lateral extent of the combined wave-beam.

According to some embodiments of the present invention the wave beam generator is configured for producing one or more groups of constituent wave beams such that each group includes up to four wave-beams having respective linear polarization along desired orientations, each orientation being at least at a 45 degree angle with a preceding orientation and a subsequent orientation. In cases where two more such groups are produced, the different groups may differ from one another in at least one of the following parameters: wavelength, polarization, and path length of their constituent wave-beams.

According to some embodiments of the present invention, the properties of the at least one beam source and/or of one or more of the optical modules are controllable thereby enabling to controllably vary at least one of the following: intensity, divergence, of at least one of the constituent wave-beams. This provides for controlling over the lateral extent of the combined wave-beam.

According to another broad aspect of the present invention there is provided an interrogation system comprising a wave beam generator configured as described above and further described in more details below. In some embodiments the interrogation system also includes a wave-beam generation controller adapted for selectively operating the wave-beam generator module for causing the generation of a desired interrogation wave-beam having a desired substantially constant lateral extent over a selected range of distances along a general direction of propagation of the interrogation wave-beam. This is achieved by operating the wave-beam generator module for substantially simultaneously producing respective constituent wave-beams of a selected combination of wave-beams selected such that superposition of the respective constituent wave-beams forms the desired interrogation wave-beam with the desired lateral extent over the selected range.

In some embodiments of the present invention the interrogation system includes a target detection module including an interrogation wave-beam scanning module. The wave-beam scanning module is adapted for sequentially operating the wave-beam generation controller for sequentially generating two or more interrogation wave-beams associated with at least one of different ranges and different lateral extents thereby enabling determination of a position of a responder system interrogated by one or more of the interrogation beams. In some cases the target detection module is configured and operable for receiving from a responder system an acknowledgment signal encoding intensity data indicative of an intensity of the interrogation wave-beam received by the responder, and processing the intensity data to estimate the location of said responder relative to the interrogating wave-beam.

According to some embodiments of the present invention the interrogation system includes target detection module that is adapted to determine a distance to an interrogated responder utilizing a collective time-of-flight of the interrogation wave-beam and an acknowledgment signal obtained from the interrogated responder in response. The collective time-of-flight may be determined by measuring a time delay between a transmission of the interrogation wave-beam and receipt of the acknowledgment signal and subtracting time delays associated with at least one of the following: internal time delays of the interrogation system, internal time delays of the responder system, and a random time delay by which the acknowledgment signal may have being delayed by the responder.

According to some embodiments the interrogation system includes an interrogation control module adapted for operating said wave-beam generator to encode and/or encrypt data in the interrogating wave-beam. For example, the coding may be in the form of a modulation/pulse sequence of the interrogating wave-beam. In some cases the encoded data may include an initialization sequence including series of initialization segments in said interrogating wave-beam extending over time duration greater than a predetermined standby time duration of a responder system to be interrogated. The responder system may be configured to identify at least one of said initialization segments after recovering from a standby mode of duration not exceeding said standby time duration. In some cases the encoded data includes synchronization data including data indicative of one or more of the following data fields: (i) end-of-initialization data field marking the end of an initialization sequence; (ii) authentication data field indicative of at least one of a type and identity of the interrogating system; and (iii) at least one communication data field indicative of a communication parameter to be used by the target responder system for communication of an acknowledgment response to said interrogation.

According to some embodiments of the present invention the interrogation system further includes a responder system. The responder system includes an interrogation beam receiving module configured and operable for detecting the interrogation wave-beam, and a transmission module, configured and operable for transmitting an acknowledgment communication in response to detection of said interrogation wave-beam. In some embodiments the interrogation beam receiving module includes an optical detector and one or more wave-guiding modules coupled to the optical detector and configured for enabling detection of the interrogation wave-beam by at least two light sensitive faces of the optical detector (e.g. opposite surfaces thereof).

According to some embodiments the interrogation beam receiving module of the responder includes at least three detection modules that are arranged for detecting an interrogation wave-beam propagating towards the responder system from within a horizontal collection angle of at least 180°. For example a detection module may include a detection surface coupled to a collection element having a collection aperture adapted for collecting the interrogation wave-beam propagating thereto from within a certain solid angle and directing the collected interrogation wave-beam to said detection surface. In some cases the collection elements of the at least three detection modules are configured with at least partially overlapping solid collection angles and are arranged such that a total solid angle of collection of the interrogation beam by the interrogation beam receiving module covers at least the solid angle of a hemisphere.

According to another broad aspect of the present invention there is provided an interrogation and response system including an interrogation system and a responder system. The interrogation system includes: a wave-beam generator module configured and operable for producing a plurality of wave-beams having different divergences and substantially parallel axes of propagation, and capable of generating two or more combinations of the wave-beams, such that each combination comprises concurrent production of two or more at least partially incoherent and at least partially overlapping constituent wave-beams of said plurality of wave-beams such a superposition of the respective constituent wave-beams forms an interrogation wave-beam having a desired substantially constant lateral extent over the certain range of distances; and a target detection module comprising a receiver for receiving acknowledgment communication from a responder system detecting said interrogation wave-beam. The responder system includes: an interrogation beam receiving module configured and operable for detecting said interrogation wave-beam, and a transmission module, configured and operable for transmitting an acknowledgment communication in response to detection of said interrogation wave-beam.

According to yet another broad aspect of the present invention there is provided a method for interrogating a responding system. The method includes: generating an interrogation wave-beam by an interrogation system such that the wave-beam is directed towards a responding system being located behind an obstacle along the line-of-sight between said interrogation and responding systems; and detecting a scatter of the interrogation wave-beam from surfaces in the vicinity of the responding system and generating, in response to the detection, an acknowledgement signal capable of bypassing the obstacle. In some embodiments the interrogation wave-beam is characterized by at least one of the following: a substantially constant lateral extent not exceeding 3 meters over a desired interrogation range and relatively small beam divergence not exceeding 6 mrad.

Thus, the present invention provides novel beam generation technique and a novel IFF systems and methods allowing efficient IFF interrogation and response with improved accuracy and reliability. Further aspects and embodiments of the present invention are described in more detail in the detailed description. It will be evident to those skilled in the art that the invention is not limited to the details of the following illustrated embodiments and that the present invention may be embodied in other specific forms without departing from the scope of the attached claims. The present embodiments are therefore to be considered in all respects as illustrative and not restrictive to the scope of the invention, and all changes which come within the meaning and range of equivalency of the claims are therefore intended to be embraced therein.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 3A to 3C are plots $P_{10}$, $P_{11}$, $P_{12}$ of quantitative simulations of the intensity distribution of three constituent wave-beams B10-B12 being Gaussian wave-beams.

FIGS. 12A to 12D are schematic illustrations of two configurations for pairs of interrogation wave-beam detection modules coupled to opposite faces of a single detector element and their implementation for two arrangements of six detection modules configured according to embodiments of the present invention for detection of an interrogation wave-beam arriving from within a hemisphere solid angle;

DETAILED DESCRIPTION OF EMBODIMENTS

Figure 1:
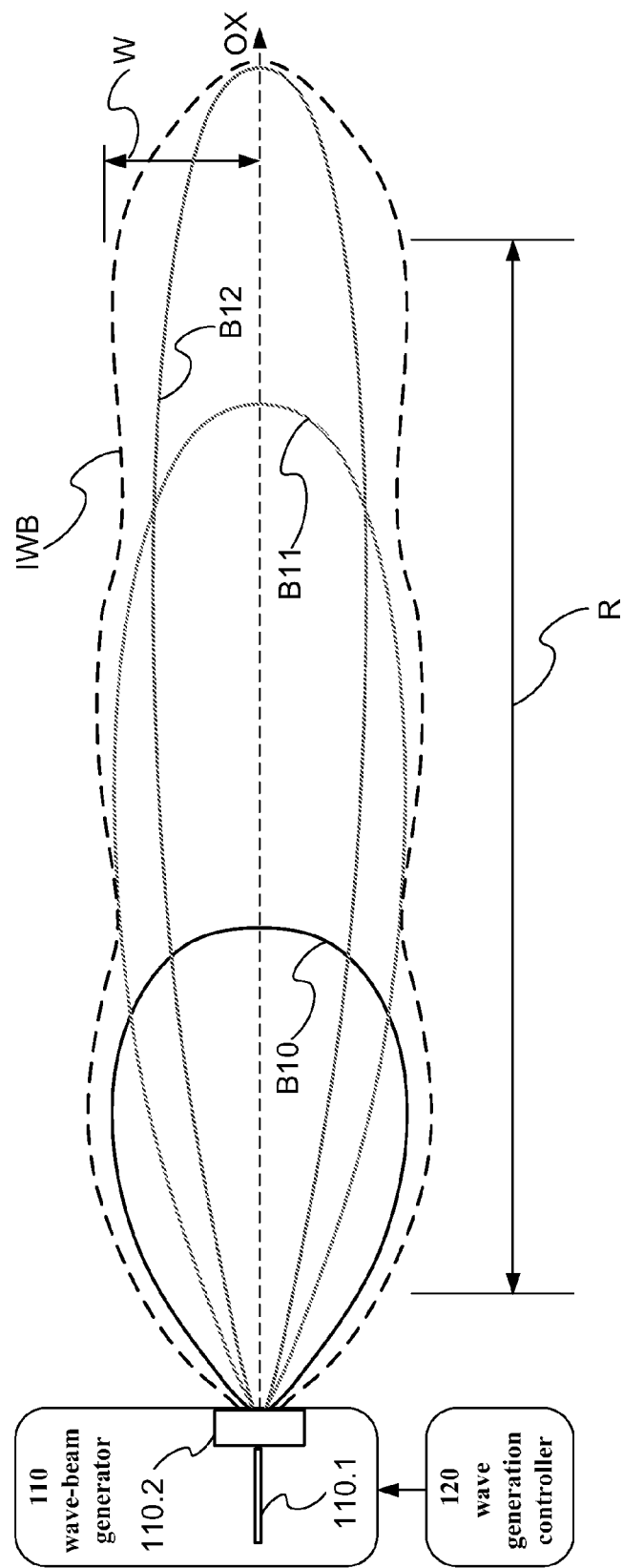
FIG. 1 is a schematic illustration of a technique according to the invention for generating a wave-beam having a substantially constant lateral extent over the desired operating range.

Reference is made to FIG. 1, schematically illustrating a technique of generating a wave-beam IWB having a substantially constant lateral extent W over the desired operating range R. The wave-beam IWB is generated by combining a number of two or more wave-beams (e.g. optical wave-beams), each having different intensity and/or divergence. System 100 for generating the wave-beam IWB generally includes a wave-beam generator 110 and possibly also a wave-generation controller 120. The latter serves operates to select the properties of the constituent wave-beams, e.g. in this example three constituent wave-beams B10, B11 and B12, which are combined to form a superposed wave-beam IWB having the nearly constant lateral extent W over the desired operating range R.

It should be noted that in the scope of the present disclosure the terms lateral extent and range of a wave-beam respectively refer to the width and the length of a designated region within which the amplitude or intensity (which is proportional to the amplitude squared) of the wave-beam is larger than, or equal to, a certain threshold intensity or power per unit area. The term lateral extent is used as a more general description of the lateral dimensions of the wave-beam, describing circularly symmetrical wave-beams with a width, or diameter, as well as asymmetrical wave beams with elliptical, or essentially rectangular or even irregularly-shaped cross-sections.

To this end, the plurality of wave-beams (at least two wave-beams B10 to B12 in the present example) having the different divergences (at least partially incoherent with respect to one another) are superimposed to produce the combined wave-beam IWB having the desired lateral extent W within the working range R. In instances in which the constituent wave-beams B10 to B12 are incoherent with respect to each other, the intensity of the combined wave-beam IWB at any location is the arithmetic sum of the intensities of the constituent wave-beams, while in instances of partial coherence, the intensity of the combined wave-beam IWB at any location is a fraction of the sum of the intensities of the constituent wave-beams. Nevertheless, although partially incoherent beams may result in reduced overall intensity close to the center of the combined wave-beam IWB, near the edges of the combined beam IWB (where the intensity is more critical), the partial coherence decreases by virtue of the different divergences of the constituent beams (namely the combined intensity approaches that of the incoherent case).

In the present example, the wave-beam generator 110 includes a source wave-beam 110.1 that is manipulated by a wave-directing-and-focusing module 110.2 (e.g. optical device) into the three constituent wave-beams, B10, B11 and B12, having different divergences and possibly different intensities. The wave-beams B10, B11 and B12 are depicted in the figure by respective contours presenting equal intensity (power per unit area) of the wave-beams (e.g. contours associated with a certain predetermined intensity threshold). The equal intensity contour of the combined wave-beam IWB, shown by a dashed line in FIG. 1, effects an illumination extent that approximately meets the design value for the lateral extent W of the combined wave-beam, over the specified operation range R.

The divergence of each of the wave-beams B10, B11 and B12, can be defined and/or controlled by wave elements with different focusing power, such as lenses, mirrors or diffraction gratings. The intensities of the wave-beams B10, B11 and B12 can be controlled by suitable beam splitters. Various implementations of the wave-beam generator 110 according to the invention are described in more detail below with reference to FIGS. 5A to 5I. Optionally, in some embodiments of the present invention a wave-generation controller 120 is connected to the wave-beam generator 110 and is configured and operable for operating the wave-beam generator 110 to generate a desired/suitable disparity between the divergences of the constituent wave-beams (e.g. B10-B12), and optionally to the suitable disparity between the intensities of the constituent wave-beams. The wave-generation controller 120 may be facilitated with information (e.g. in the form of a lookup table, LUT, stored in a memory) that is indicative of the properties of various wave-beams and combinations thereof which may be generated by the wave-beam generator 110. The wave-generation controller 120 may be adapted to receive instructions indicating the desired region (e.g. substantially constant width W and range R) to be covered with the combined beam, select the most suitable wave-beam constituents for generating suitable wave beam IWB, and operate the wave-beam generator 110 for generating those wave-beam constituents concurrently.

Figure 2A:
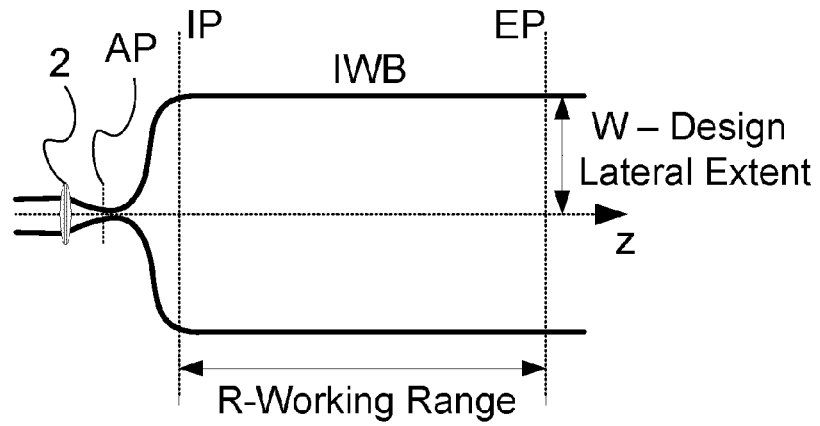
FIGS. 2A to 2C are schematic illustration illustrating the generation a wave-beam having a substantially constant lateral extent over the desired operating range utilizing combination of beams having different divergences.
Figure 2B:
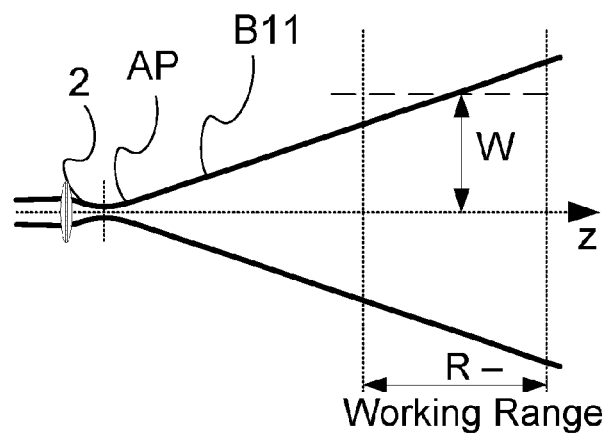
Figure 2C:
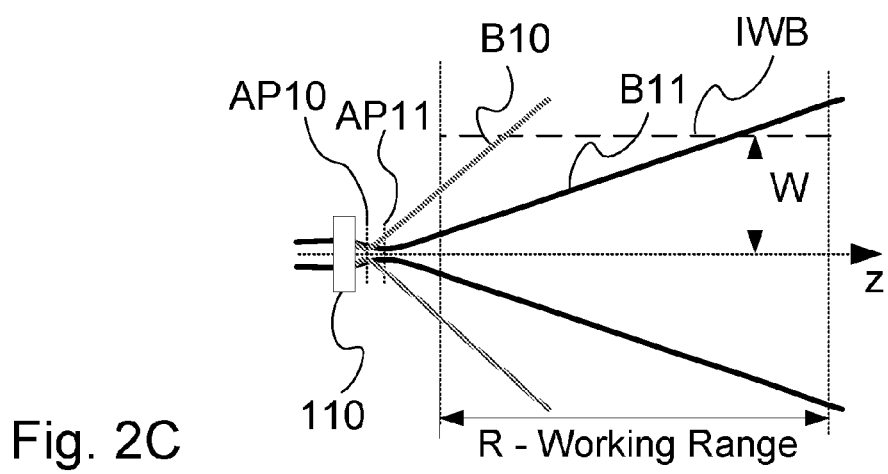

Referring now to the figures, FIGS. 2A through 2C illustrate the concept underlying the technique for generating wave-beams having constant lateral extent W over a desired range R according to the present invention. The idealized design goal is graphically depicted in FIG. 2A: generation of a wave-beam IWB which exits or is emitted from a relatively small source aperture(s) AP and expands thereafter to attain a desired lateral extent W over a desired working range R, maintaining the specified design cross-sectional lateral extent W throughout this range R from an initial-point/plane IP to an end point/plane EP which are located at certain distances from the source aperture AP and thus define the working range R).

A typical divergence profile of a standard (Gaussian) wave-beam is illustrated graphically in FIG. 2B. In this figure, a Gaussian source beam B11 focused by wave element 2 to a focal point, or Gaussian beam waists at aperture AP which results with the a wave-beam B11 having a certain divergence. To this end, starting with the small exit/wave emitting aperture (smaller than the desired lateral extent W), the idealized wave-beam shape shown in FIG. 2A having the substantially constant lateral extent W, cannot be generated or even approximated by the standard (Gaussian) wave-beam. Manipulating the wave element 2 for changing the beam's divergence will only allow the generation of the desired lateral extent over a small a section of the working range R while other regions closer and/or more distant would be illuminated by narrower or wider beams.

To achieve the desired constant lateral extent wave-beam, referring to FIG. 2C, according to an aspect of the present invention, wave-beam generator 110 generates a plurality of wave-beams (at least two wave-beams) with different divergences (e.g. wave-beam B10 and wave-beam B11 which are respectively focused at different locations/apertures AP10 and AP11) are superimposed in a partially or completely incoherent manner. This produces a combined wave-beam IWB which approximates the idealized constant lateral extent in the desired working range R. The combined wave-beam approximates the specified design lateral extent W over most of the desired working range. To form the combined beam IWB having a desired constant lateral extent W in a desired working range R, a suitable disparity between the divergences of the constituent beams B10 and B11, and optionally a disparity between their intensities and their relative coherence are selected. Indeed, in some embodiments of the present invention, the lateral extent W of the combined beam IWB and/or the range R at which its lateral extent is constant and matching the desired value W are adjustable by controlling/varying the divergence and/or optionally the intensity of at least one constituent beam (e.g. B10 and/or B11).

It is important to note that the wave-beams described above may be electromagnetic radiation beams (such as light beams), radio frequency (RF or microwave), or acoustic insonifying beams.

Figure 3C:
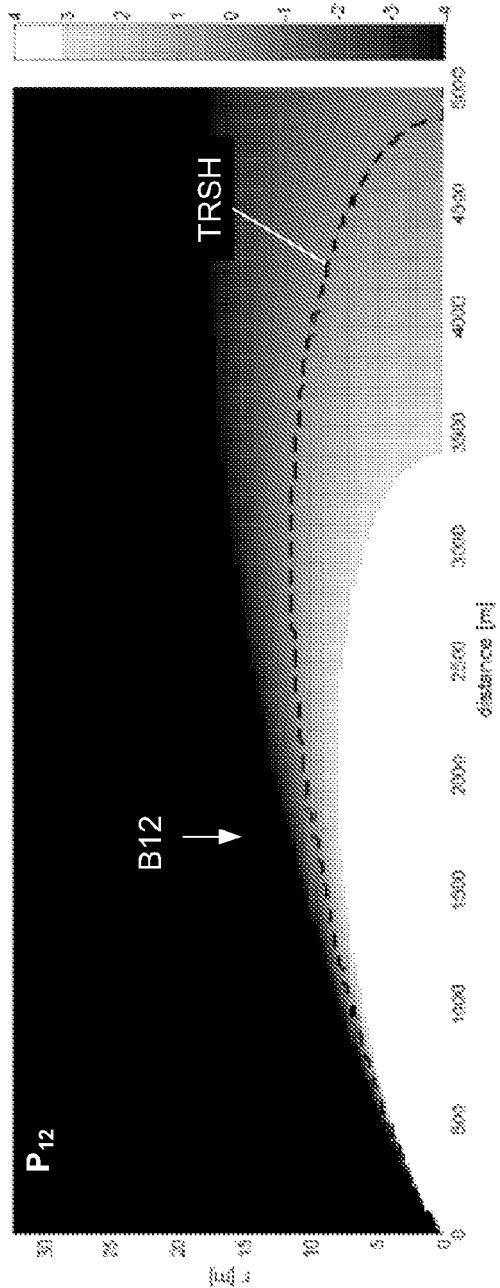
Figure 3D:
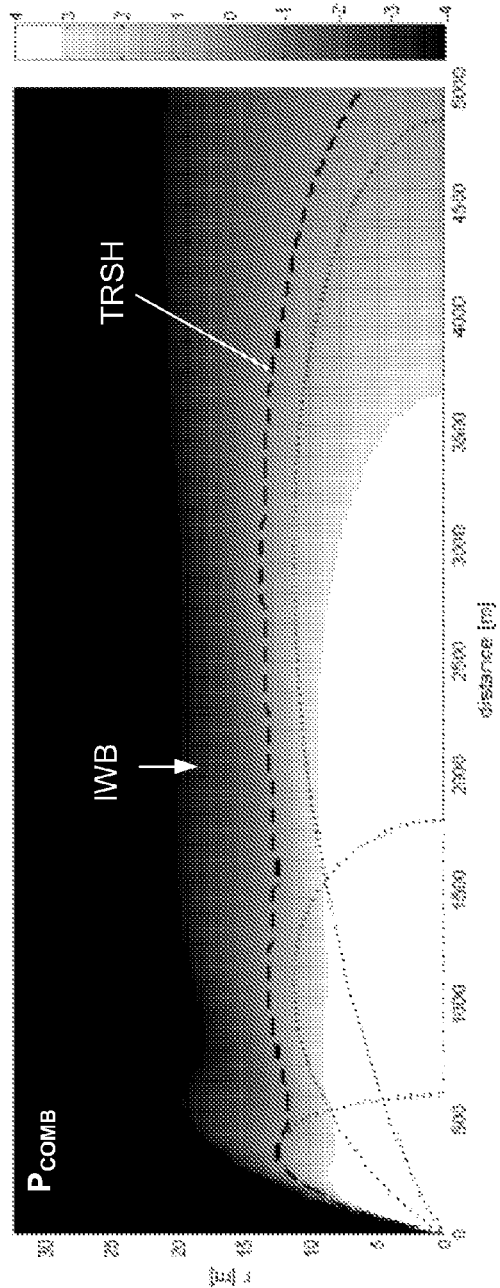
FIGS. 3D and 3E show plots illustrating quantitative simulations of several combined wave-beams formed by incoherent superposition of the constituent wave-beams shown in FIGS. 3A to 3C.

A numerical example of the technique of the present invention for generating a wave beam having substantially constant lateral extent over a desired range will now be illustrated, with reference to FIGS. 3A to 3E. More specifically, FIGS. 3A to 3C are plots $P_{10}$, $P_{11}$, $P_{12}$ of quantitative simulations of the intensity distribution of three constituent wave-beams B10-B12 being Gaussian wave-beams emerging from a source with substantially Gaussian intensity/cross-sections and different divergences. FIG. 3D shows plot $P_{COMB}$ illustrating quantitative simulation of a combined wave-beam IWB formed by the incoherent superposition of the constituent wave-beams B10-B12, shown in graphs $P_{10}$, $P_{11}$, $P_{12}$. The wave beams B10-B12 and the resulting IWB are presented in these plots by their intensity as a function of the distance and lateral offset with respect to the beam's source, the wave-beam generator 110. The plots show half of the beam above the beam's propagation axis OX and are gray-scale coded. In the present example, wave-beam B10, illustrated in FIG. 3A, is a Gaussian beam formed with a divergence angle of 95 mrad and total power of 260 W. Wave-beam B11, illustrated in FIG. 3B, is a Gaussian beam with a divergence angle of 31 mrad and total power of 220 W. Wave-beam B12, illustrated in FIG. 3C, is a Gaussian beam with a divergence angle of 11 mrad and total power of 220 W. The intensity threshold, defining the width of each beam, is set at 0.1 W/m$^2$, and marked on each graph with a boundary line referenced TRSH. The 95 mrad beam (B10) approximately achieves the desired beam lateral extent W of 12 m in the range 200 to 600 m (FIG. 3A); the 31 mrad beam (B11) approximately achieves the desired beam lateral extent of 12 m in the range 800 to 1,400 m (FIG. 3B), whereas the 11 mrad beam (B12) approximately achieves this target lateral W in the range 1,900 m to 4,000 m (FIG. 3C). The combined wave-beam IWB obtained by the incoherent superposition of the 95 mrad, the 31 mrad and the 11 mrad beams approximately maintains the desired beam lateral extent W over the full range (e.g. 200 to 4,000 m, as shown in FIG. 3D).

The plots of FIG. 3D thus demonstrate that the use of incoherent superposition of diverging beams of different divergences can be used according to the invention to generate a combined interrogation wave-beam having an approximately fixed lateral extent W over a defined working range R. The superposition of the multiple beams (i.e. B10-B12) yields an unexpected result, whereby the fixed lateral extent W may be substantially wider than the aperture of the beam's source(s) (e.g. the aperture(s) of the (last) wave element(s) of the source(s) from which the beams emerge). Specifically in the example a desired lateral extent W of about 12 meters is achieved utilizing a beam source with output port/aperture of radius of a few millimeters. Another unexpected result making the use of the combined wave-beam superior to sequential use of the constituent beams, is the extended and gapless range R of coverage (with the lateral extent W), which may be obtained by the combined beam as compared to that achievable by sequential projection of the constituent beams. In fact, in this example, if the 95 mrad beam defines the desired lateral extent in the shorter ranges (200-600 m), the 31 mrad beam defines the desired lateral extent in the middle ranges (800-1,400 m), and then the 11 mrad beam defines the width at the larger ranges (1,900-4,000 m), there would remain two gaps: between 600 and 800 m and between 1,400 and 1,900 m, where the effective lateral extent is much smaller than the desired lateral extent W. The incoherent superposition of the three beams yields a combined beam in which these gaps are eliminated, and the desired lateral extent W is approximately maintained over the full working range R.

The concept demonstrated in the example of FIGS. 3A to 3D, can be expanded in several manners. The extent of the operating range R can be expanded/reduced, and the maximal deviation of the actual lateral extent of the combined beam IWB from the desired lateral-width W can be reduced, for example by introducing additional constituent beams. Combined beams with two, three, four and five constituent beams were successfully simulated by the inventors to confirm such improvements.

In some embodiments of the present invention, the wave-generation controller 120 illustrated in FIG. 1 may be configured and operable for adjusting the lateral extent W of the combined beam, and/or the range R thereof wherein that lateral extent is substantially fixed. The wave-generation controller 120 may be configured and operable for controlling the properties (i.e. intensity and/or divergence) of at least one constituent beam and/or number of constituent beams generated/emitted by the wave-beam generator 110, to provide a desired range R and lateral extent W.

Figure 3E:
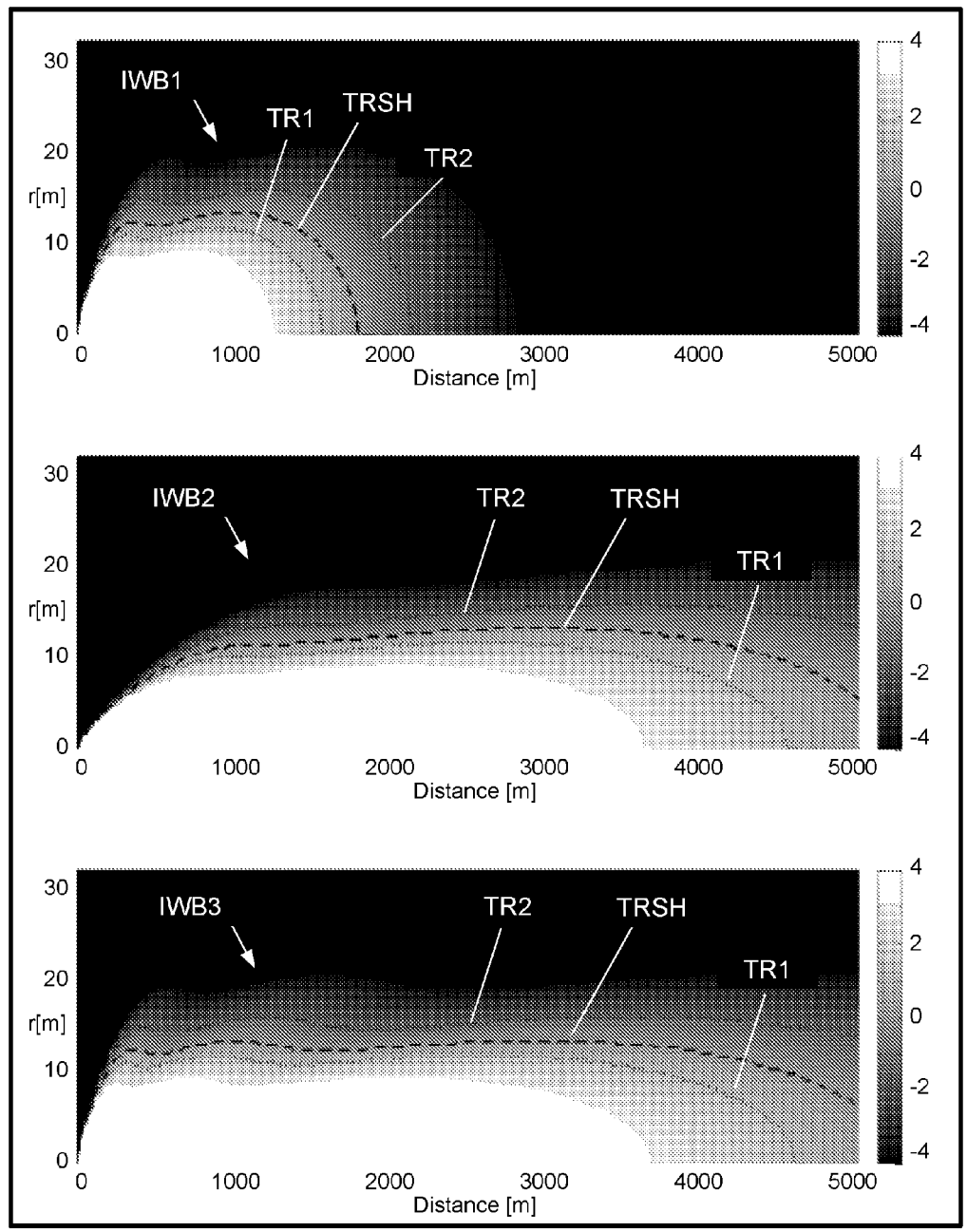

For example, FIG. 3E illustrates three intensity plots of three wave-beams IWB1, IWB2, and IWB3 formed by wave-beam generator 110 utilizing three different combinations of the constituent wave-beams B10 to B12, which were illustrated in FIGS. 3A to 3C. Similarly to FIG. 3A to 3D, these plots are gray-scale coded representing the beams' intensity as function of the distance and lateral offset with respect to the wave-beam generator 110 and presenting only half of the beam located above the beam's propagation axis OX. The intensity threshold, defining the width of each beam, is set at 0.1 W/m$^2$, and is marked on each plot with a line referenced TRSH. Wave-beam IWB1 is a superposition of the two constituent wave-beams B10 and B11. IWB1 achieves the design lateral extent W of radius 12m over the range 200 to 1,600 m without the gap predicted when each wave-beam is used independently as discussed above. Also the use of two superposed wave-beams B10 and B11 to form the combined beam IWB1, also extends the maximum range of the IWB1 beam at which the lateral extent W is achieved as compared to the range at which that lateral extent is achieved when utilizing each of the constituent wave-beams B10 and B11 separately. In this case a maximal range of 1,600 m is obtained as compared to a maximal range of 1,400 m (see FIG. 3B) with the single beam. Similarly, IWB2 is formed by superposition of the constituent wave-beams B11 and B12 and provides a second desired lateral extent over the range 1,400 m through 4,000 m while without any gap in the range 1,400-1,900 m, as would occur if the constituent wave-beams B11 and B12 were used sequentially (i.e. not concurrently). The plot IWB3 is formed by the superposition of beams B10 to B12 and is essentially similar to the plot illustrated in FIG. 3D.

As noted above, the lateral extent of a combined wave-beam is considered as the cross-sectional width of the beam, at which the amplitude or intensity of the combined wave beam thereof is larger than or equal to a certain nominal threshold amplitude or intensity threshold, marked in FIG. 3E by TRSH (also referred to herein below as detection threshold). Nevertheless, it should be understood that it may be impractical to generate a combined beam, having a precisely constant lateral extent W over the working range R, even if incoherently combining large number of constituent beams. To this end, the term constant lateral extent W should be considered in relation to two additional minimal and maximal intensity/amplitude thresholds (i.e. detection threshold tolerances; e.g. TR1 and TR2 in FIG. 3E), and interpreted such that a beam has the constant lateral extent W within the desired range in cases where along the entire range R, at a distance of the desired nominal lateral extent W from the beam's propagation axis OX, the beam's intensity/amplitude is respectively above and below certain predetermined detection threshold tolerances TR1 and TR2. In practice, the tolerances TR1 and TR2 depend on the tolerances of the constituent wave-beam parameters (divergence and intensity) as well as the tolerances of the detection threshold; tolerances ranging between ±10 and 30% of the nominal detection threshold TRSH are achievable in practice.

Some examples of a wave-beam generator (emitter) 110 configured according to the present invention will now be described with reference to FIGS. 4A and 4B. The wave-beam generator 110 is capable of emitting two or more constituent wave beams, such as B10 to B12 described above, and may be used or preconfigured for producing the at least partially incoherently combined beam having a desired lateral extent W over a defined range R. In some embodiments the wave-beam generator (emitter) 110 may be connectable to a wave-generation controller 120 capable of operating the wave-beam generator (emitter) 110 for controlling the resulting constant lateral extent W and range R of the combined beam IWB.

Figure 4A:
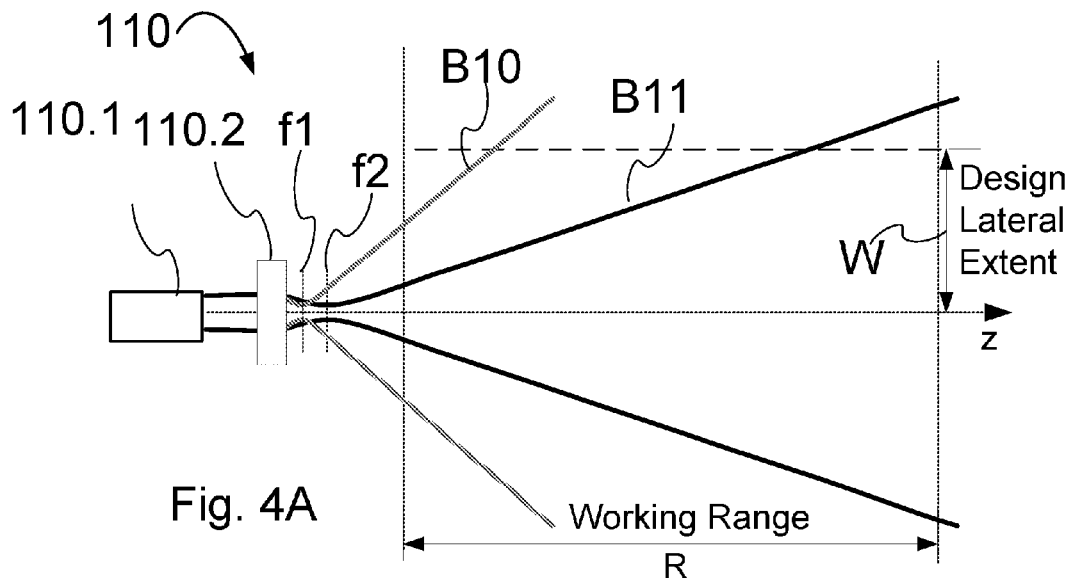
FIGS. 4A and 4B are schematic illustrations of the wave-beam generator 110 of according to two embodiments of the present invention.
Figure 4B:
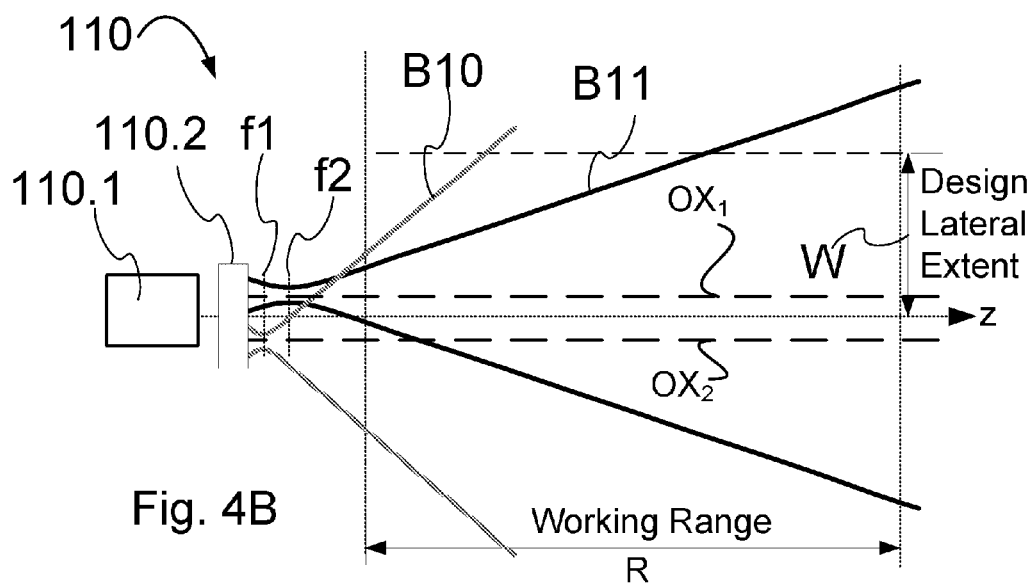

FIGS. 4A and 4B, illustrate two families of embodiments of the wave-beam generator 110 according to the present invention. In the first family of embodiments illustrated in FIG. 4A, the wave-beam generator 110 is configured for emitting multiple (two or more) coaxial (i.e. propagating along a common axis) constituent wave-beams B10, B11 having different divergences. In the second family of embodiments, illustrated in FIG. 4B, the wave-beam generator 110 is configured for emitting a plurality of constituent wave-beams B10 and B11, at least some of which propagate along different propagation axes (namely are not coaxial beams), but are distributed laterally to travel along different parallel propagation axes (e.g. $OX_1$ and $OX_2$). Such embodiments are preferably configured such that the furthest separation between the different propagation axes is significantly smaller than the lateral extent W of the desired combined wave-beam (interrogation wave-beam) IWB. It should be understood that although only two constituent wave-beams are illustrated in these figures, it is understood that more than two constituent wave-beams can be used and that the resulting constant-width W may better approximated as the number of output wave-beam constituents increases.

The wave-beam generator 110 includes one or more wave-beam sources/input-ports 110.1 emitting one or more primary wave-beams and one beam source and wave-guiding module 110.2 coupled to the input port(s) and having one or more output ports. The wave-directing-and-focusing module comprises an arrangement of one or more wave-affecting elements (e.g. optical, or RF, or acoustical elements such as modulators/deflectors/concentrators) arranged to define a plurality of paths of different focusing powers in between the input port(s) and the one or more output ports for producing the at least one input primary wave-beam entering the input port(s), a plurality of at least partially incoherent constituent wave-beams having different divergences which exit the output port(s) and propagate along substantially parallel axes of propagation.

For example, in cases the beams are optical, the wave-directing-and-focusing module 110.2 may be an optical device which focuses the constituent wave-beams B10, B11 of those primary beams to different focal points (f1 and f2, respectively) thereby yielding their different divergences. For clarity, in the following description, the wave-guiding module 110.2 may also be referred to as an optical device and the wave-beams as light beams. It should be however noted that these specific terms are only used for convenience and should be construed generally as relating to any suitable type of waves (e.g. EM beams in general such as RF, and/or acoustic beams). Also, wherein terms relating to specific optical elements and their functions are described in the following, such terms should be understood generally where applicable while considering also equivalent elements in the acoustic or general electromagnetic wave domains (e.g. RF) having similar functionality.

Also, the wave-directing-and-focusing module 110.2 may split a single/primary wave-beam (e.g. from a single beam source/port 110.1) into several constituent wave-beams B10, B11 having different divergences (e.g. focused at different distances). Alternatively, a plurality of light sources/ports 110.1 may provide a plurality of primary wave-beams, in which some of them may be manipulated/focused to have desired divergences (thus producing constituent wave-beams B10 and B11). In some variants of the invention, wave-beams are produced/emitted by a plurality of wave-beam sources/ports (such as lasers, antennas, wave/light guides acoustic transducers, etc.). Alternatively or additionally at least one source/port may be used to generate at least two constituent wave-beams having different divergences.

In various embodiments, wave beams from multiple sources/ports may be spatially combined coaxially, (e.g. utilizing suitable configuration of beam splitters/combiners) such that the plurality of constituent wave-beams (e.g. B10 and B11) propagate along a common general propagation axis to form a combined wave-beam IWB having a substantially constant lateral extent W over a desired working range R (e.g. as exemplified in FIG. 4A). Additionally or alternatively, as illustrated in FIG. 4B, in some embodiments a primary wave-beam from one/single source/port or from multiple sources/ports, may be spatially split (e.g. utilizing suitable configuration of beam splitters/combiners), such that the constituent wave-beams (e.g. B10 and B11) propagate along different parallel axes. This may be achieved either by splitting a single source/port of wave-beams into different constituents, by using separate independent sources/ports, or a by a combination of the above techniques. The wave-directing-and-focusing module 110.2 is configured to laterally distribute the source beam(s) such that the distance between the two propagation axes of the farthest constituent wave-beams (e.g. B10 and B11), or the average distance between the propagation axes of any two constituent wave-beams) is maintained to be significantly small (e.g. in the order of few millimeters or even within sub-millimeter spacing) as compared to the lateral extent W of the resulting combined wave beam IWB (which may extend over several or even tens of meters), so that the effect of the lateral distribution of the constituent beams is negligible.

It should be understood that the wave-beam generator 110 may or may not include the actual wave-beam generating source and that the beam source 110.1 may be an actual generator/emitter of wave-beams or a port connected (optically/acoustically or otherwise) to an actual source of wave-beams. The source/port 110.1 may be configured to emit a primary beam which is a continuous wave (CW) beam and/or a pulsed beam. Alternatively or additionally, wave-directing-and-focusing module 110.2 may include controllable modulators or shutters (e.g. mechanical or electro-optical) operable for switching the CW beam signal to pulses.

The constituent wave-beams may have different intensities and/or different wavelengths and/or polarizations, and may be pulsed/CW beams. This may be achieved utilizing suitable beam sources/ports 110.1 and/or suitable configuration of the wave-directing-and-focusing module 110.2 including appropriate arrangement of one or more modules of the following: beam splitter/combiners (e.g. dichotic mirrors), attenuating/filtering elements and/or modulators and/or switches and/or apertures and/or shutters. These modules may be configured with predefined operation or may be controllable. More specifically, in some embodiments, control over the intensities of the constituent wave-beams and possibly also on their wavelengths and/or polarization and/or pulse repetition-rate/sequence is achieved utilizing such electro-optical or electro-mechanical modules/elements in the wave-directing-and-focusing module 110.2. For example, control of the intensity of the constituent wave-beams can be achieved by controlling the operational properties (e.g. power) of the wave-beam source(s) 110.1 associated therewith (e.g. by changing the voltage supply thereto) and/or by utilizing proper operation of the controllable modules/elements (e.g. optical/electro-optical elements) in the wave-directing-and-focusing module 110.2. In cases where a single source beam is used and split into different constituent wave-beams, an opto-electrical arrangement and/or an optical switch arrangement may be used to control the intensities of the constituent wave-beams independently. For example the wave-directing-and-focusing module 110.2 includes one or more electro-optical beam splitters (e.g. including non-linear crystals), for which the transmission degree/level can be controlled by application thereto of an electric field, a voltage, or a current. This allows control over the relative intensities of the component beams.

As noted above, in some cases the component beams are focused to different focal points to adjust their divergences. To this end, wave-guiding module 110.2 includes an arrangement of focusing modules/elements with focusing power, arranged along the path of the component beams (specifically shown in FIGS. 4A and 4B). These may include optical, RF, acoustical or other type elements depending on the beams' type. For example, for optical wave-beams, lenses and/or mirrors (i.e. generally beam deflectors) with optical power may be used. The focusing elements/modules may have positive focusing/optical power (i.e. associated with a real focal point) or an effective negative optical power (a virtual focal point) to avoid high-power concentration (e.g., avoid breakdown of the atmosphere-medium molecules at the "real" focus by high wave-beam intensities). The focusing elements/modules may have fixed or variable optical powers and may optionally be adjustable to provide control over the divergences of the constituent beams.

In some embodiments of the present invention, the wave-beam generator 110 is also configured for varying the wavelength of one or more of the constituent wave-beams. For this purpose, in some variants, the wave-guiding module 110.2 includes one or more bandpass filters within the optical path of one or more constituent wave-beams. In other variants, different sources/ports 110.1 emitting beams, of different wavelengths are used and/or one or more sources of controllable wavelengths are used to emit the wave-beams. For example, a suitable wavelength controllable wave-beam source 110.1 for optical radiation which may be used, is a vertical-cavity surface-emitting laser (VCSEL).

Thus, in some embodiments the intensity and/or divergence of one or more constituent wave-beams (e.g. B10 and B11) may be controlled and varied. This allows to adjust the lateral extent W of the combined beam IWB and/or the range R at which the lateral extent is constant. In some embodiments the wave-generation controller 120 may be connected to the wave-beam source(s) 110.1 and/or to the wave-directing-and-focusing module 110.2 for controlling the intensities and/or divergences of the constituent wave-beams in accordance with a desired lateral extent W and range R to be obtained in the output combined beam IWB. To achieve this goal, the wave-generation controller 120 may be configured as a computerized or electronic controller. The wave-generation controller 120 may be adapted to select the appropriate state of operation for the wave-beam generator 110 from a set of preconfigured operations respectively associated with predefined values of lateral extents W and ranges R (e.g. stored in memory in a lookup table). Alternatively or additionally, the wave-beam generator 110 may utilize any suitable wave/ray tracing algorithms and diffractive/interference analysis algorithms to determine a suitable combination of operational parameters for approximating the desired lateral extent W and range R based on the properties/configuration of the beams source 110.2 and wave-directing-and-focusing module 110.2. Possibly, in order to control the relative incoherence between the beams, the wave-generation controller 120 may also be adapted to controlling at least one of the wavelengths, the optical path length and/or the timings and/or polarizations of the beams. This may also be achieved by utilizing predetermined data stored in a memory, or by real time processing.

Figure 5A:
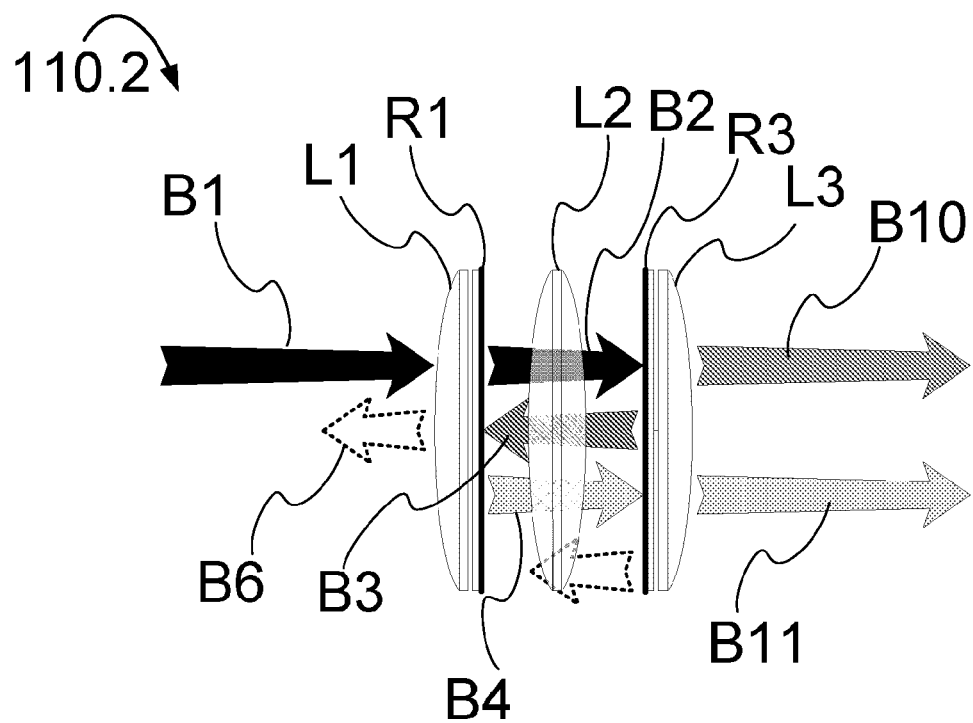
FIGS. 5A to 5I, are block diagrams of the wave-beam generator according to several embodiments of the present invention, each configured and operable for providing at least partially incoherent superposition of several constituent wave-beams having different divergences, and optionally different intensities.
Figure 5B:
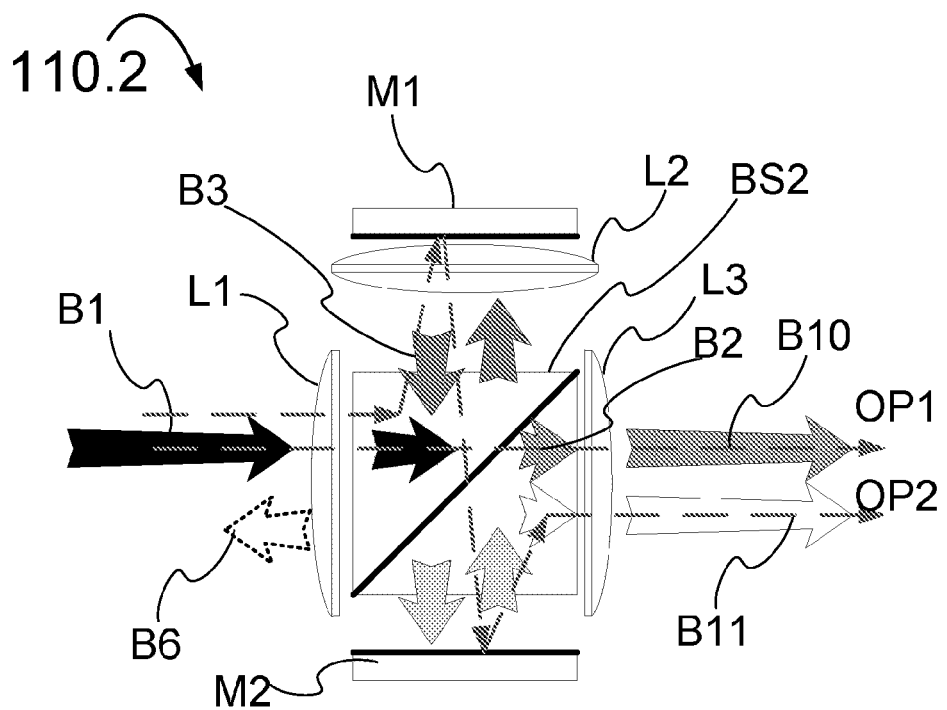
Figure 5C:
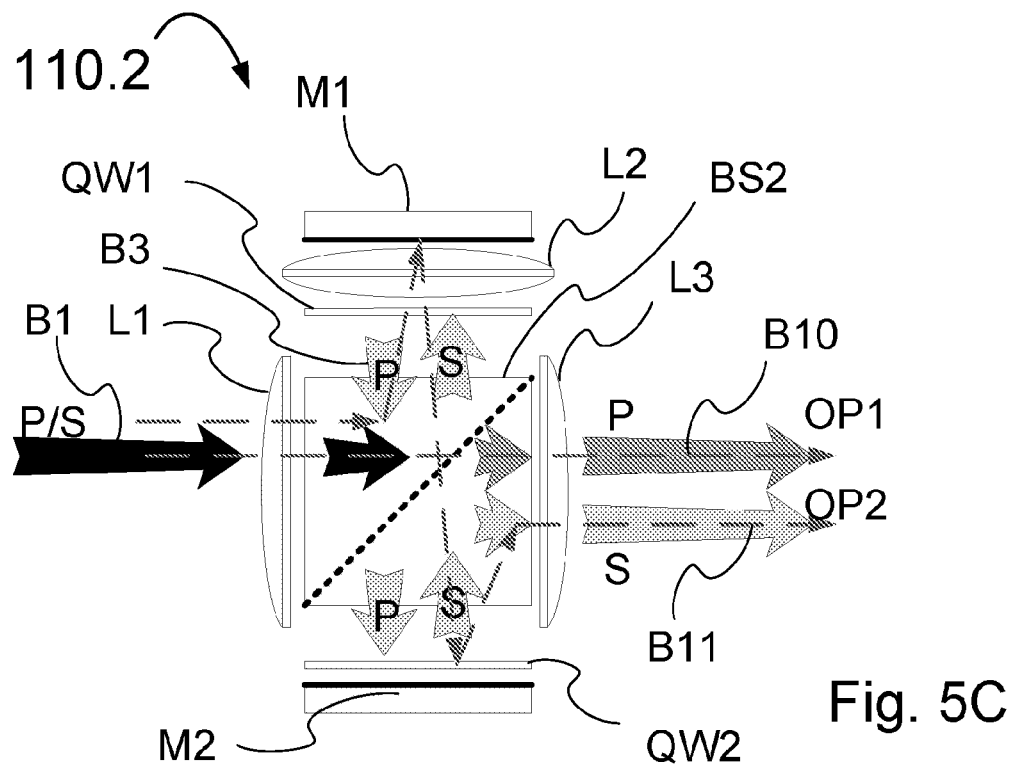
Figure 5D:
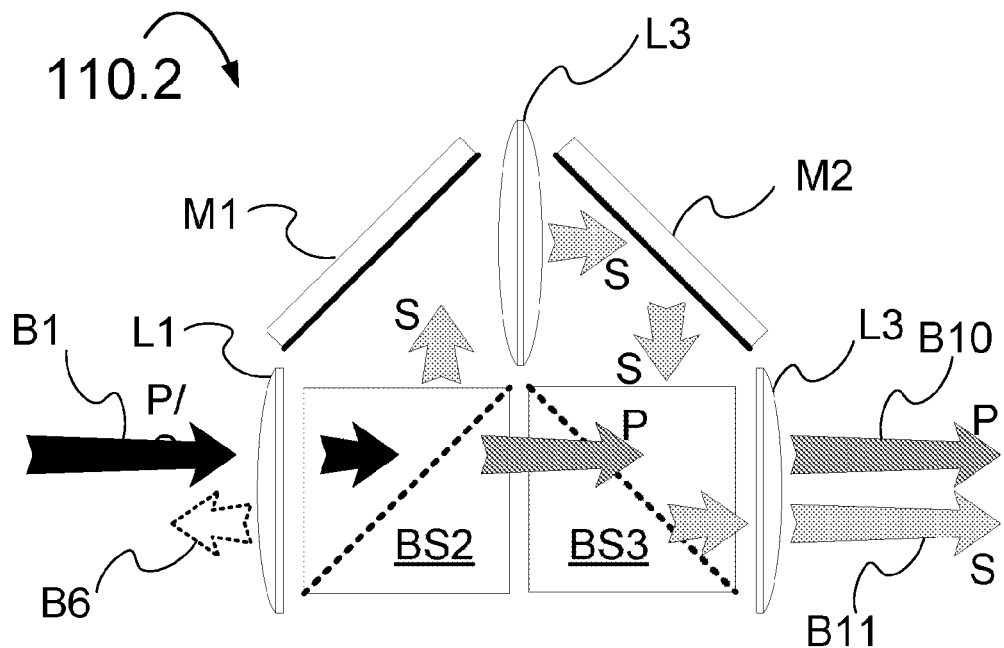
Figure 5E:
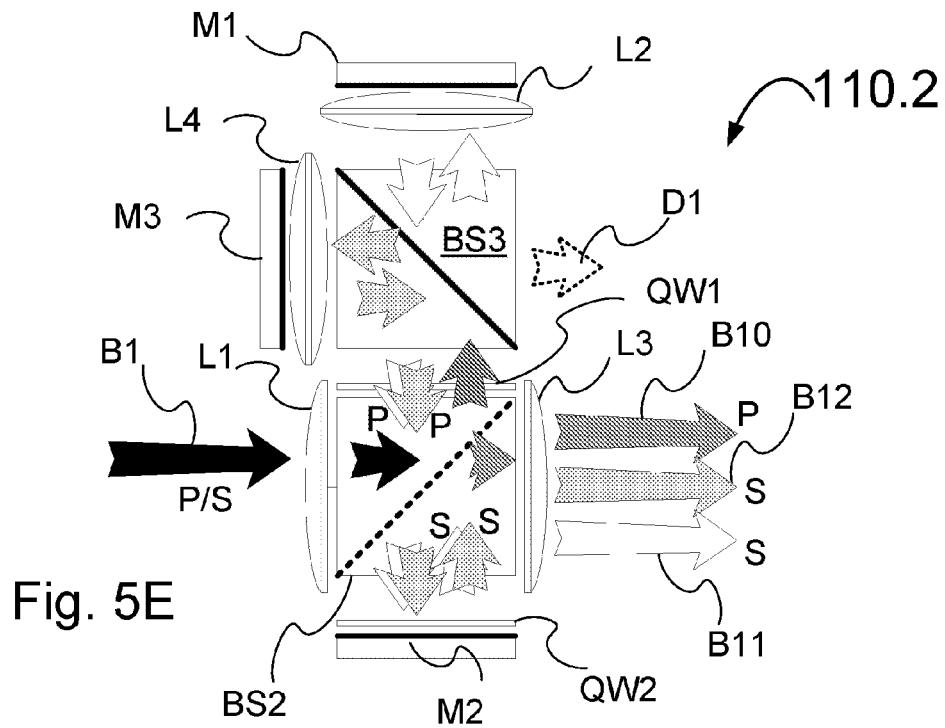
Figure 5F:
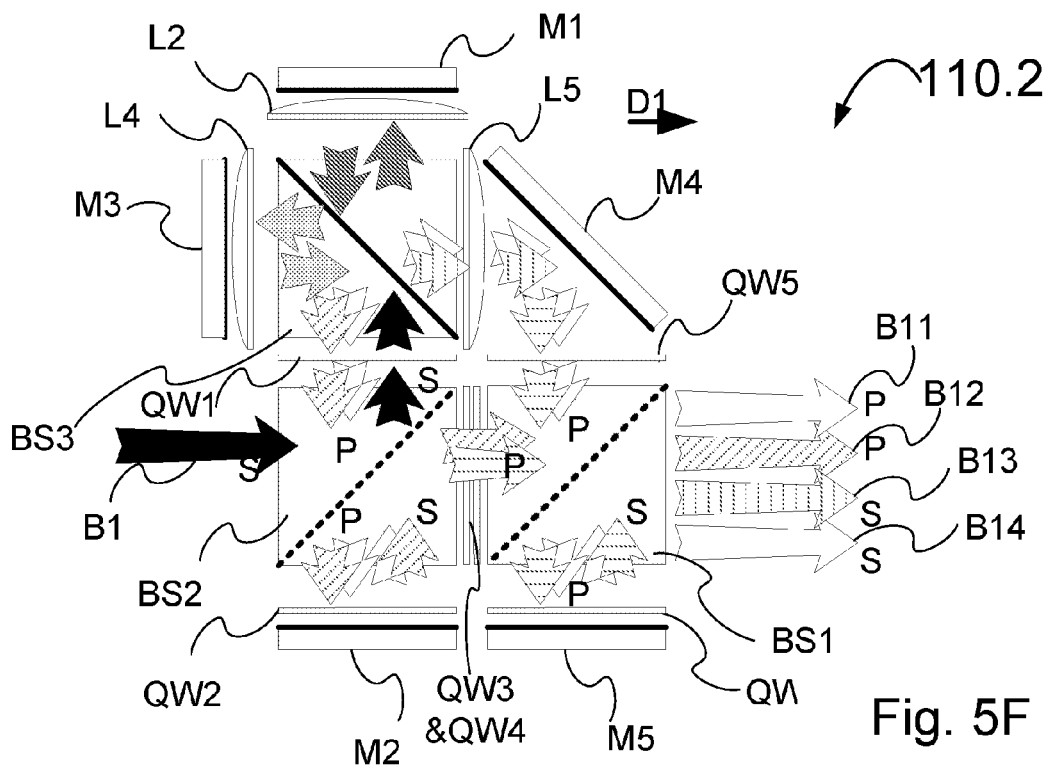
Figure 5G:
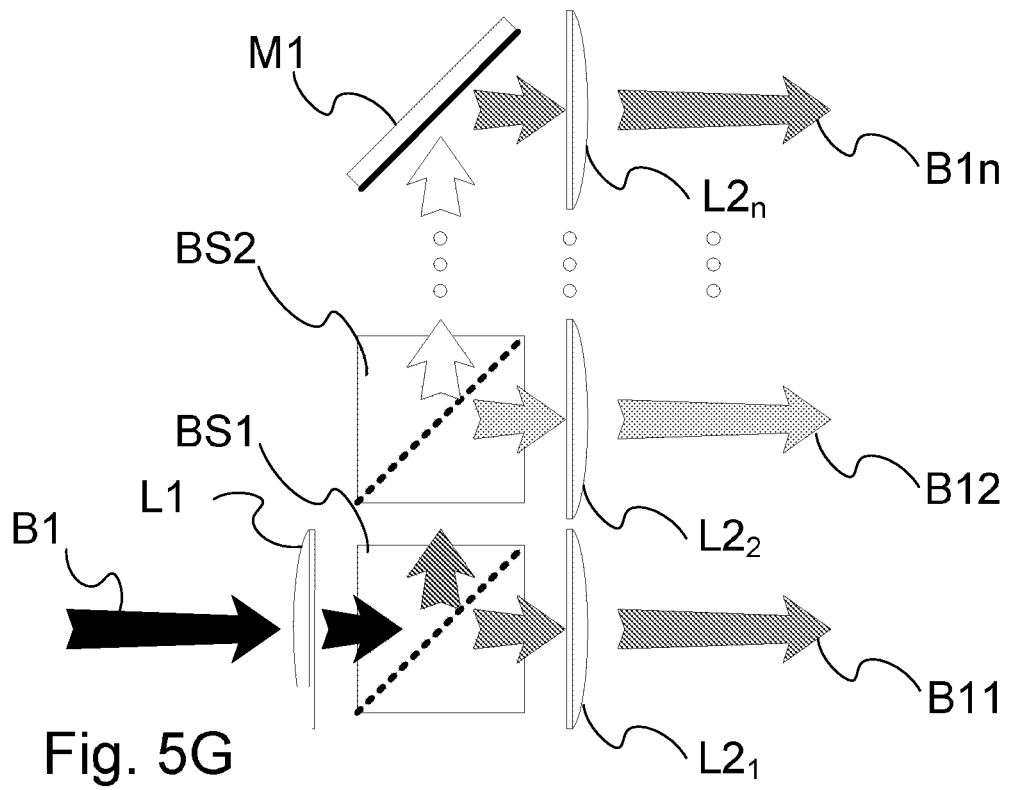
Figure 5H:
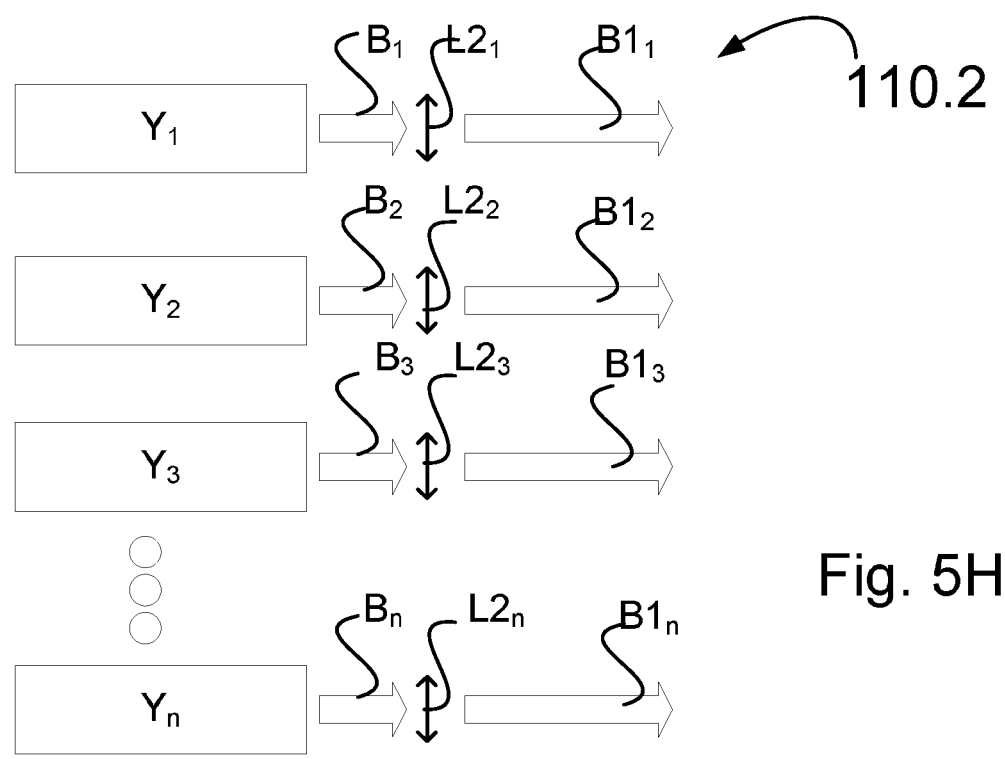
Figure 5I:
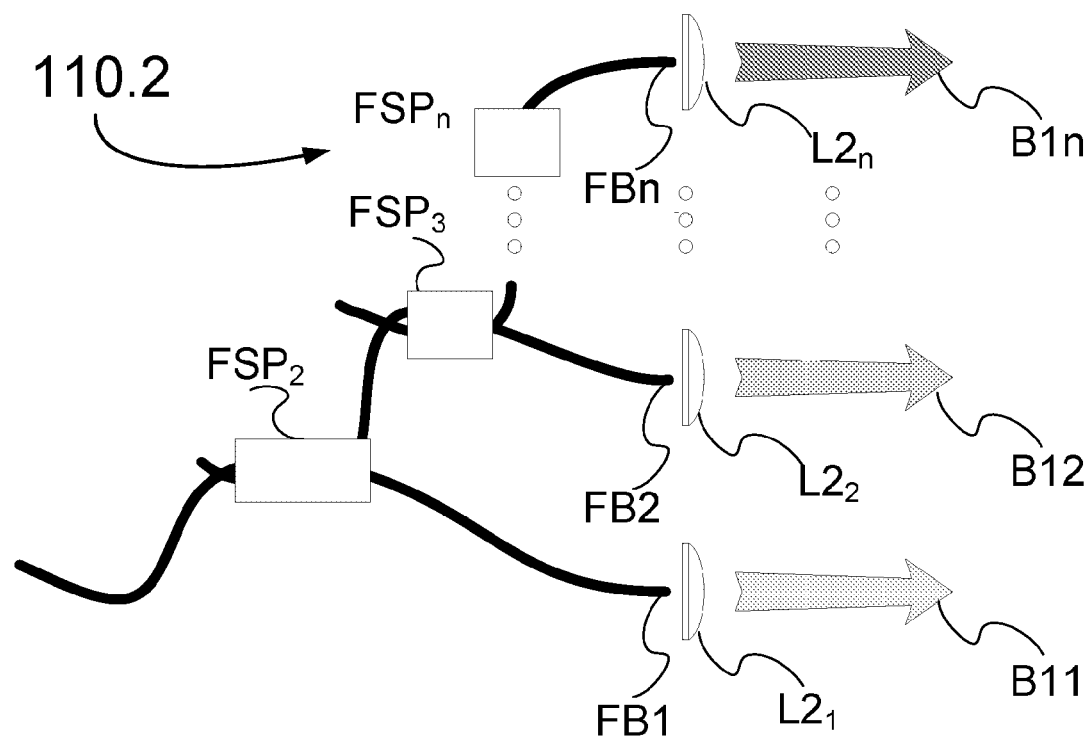

Reference is now made to FIGS. 5A to 5I, showing block diagrams of several different embodiments of the wave-beam generator 110 providing an incoherent superposition, or in some cases at least partially incoherent superposition, of several constituent wave-beams having different divergences, and optionally different intensities, whereby the number of the constituent beams, their divergences and intensities are selected, such that the combined beam approximates the desired constant lateral extent W over a desired working range R. In some cases the constant lateral extent W the working range R are predefined while in other cases they may be controlled by varying the operational properties of the wave-beam generator 110. FIGS. 5A to 5F illustrate examples in which the constituent wave-beams travel coaxially (along the same propagation axis) and FIGS. 5G to 5I illustrate examples in which the constituent wave-beams are laterally distributed (travel along propagation axes parallel to each other).

In some examples (FIGS. 5A-5C) only two-constituent wave-beams (e.g. B10 and B11) are generated and incoherently combined to generate the combined beam IWB roughly approximating the desired lateral extent W in the working range R while being sufficiently close within a threshold (e.g. detection threshold) suitable for some applications. Yet in some examples (FIGS. 5D-5I) the desired constant lateral width W is more closely approximated utilizing combinations of more than two wave-beam constituents.

In the cases where three or more constituent wave-beams are combined, additional care is taken to ensure that the combined wave-beam constituents are at least partially incoherent, with respect to each other. In this connection, in a two-constituent case the incoherent combination of the two constituent wave-beams can rely on orthogonal polarization of the beams. However, in cases having a larger number of constituent wave-beams, additional measures may be used to ensure relative incoherence between the superposed wave-beams. For example such measures may include: creating a difference between the optical paths of the different constituent wave-beams beyond their coherence length, or introducing vibrations (phase noise) to some of the constituent wave-beams to average out potential interference patterns, or where possible, using different wavelengths for different constituent wave-beams. Optionally, coherence between constituent wave-beams can be decreased by utilizing relatively broad line/spectral width of the some of the constituent wave-beams. Yet additionally, at least partial incoherence of the beams may be achieved by temporal separation of the beams while still maintaining the beams appear simultaneous to a detection module by which they are to be detected. To this end, for example in case where two or more coherent component beams (e.g. of the same wavelength polarization and relative phase) are pulsed at different time slots, they do not interfere with one another, while appear to be simultaneous to a detector detecting them as long as their pulses are sensed by the detector within a time frame shorter or equal to the detector's integration time. In this case, although the beams are strictly speaking coherent and not simultaneous, they are perceived by a detection module as incoherent simultaneous beams, and in this sense are considered by the present application as incoherent/partially incoherent simultaneous beams. In other words, terms or phrases relating to the formation of a combined wave-beam IWB by superposition of at least partially incoherent and simultaneous constituent wave-beams, should be understood while considering the perception of the combined wave-beam IWB by a designated detection module.

Thus, incoherent superposition of the constituent wave-beams may be achieved by pulsed light, where all constituent wave-beams are pulsed simultaneously, provided that the temporal response of a detection arrangement is matched to said pulses. Alternatively or additionally, in some embodiments, incoherent superposition of the constituent wave-beams may also be achieved by successively emitting pulsed constituent wave-beams at different time slots which are within the response time (integration time) of the threshold designated detector. For example, two pulsed constituent wave-beams, which are emitted with a time delay between their pulses that is shorter than the detector's response/integration time, will be perceived and integrated together by the detector. As the lateral extent of the combined wave beam IWB is based on the region wherein the combined intensity is above a certain intensity threshold, as long as the beams/pulses are sensed and integrated together they appear simultaneous and not coherent to the detector (as generally, during the integration time, the detector measures/integrates the intensities of all the waves reaching thereto) and outputs a signal indicative of the sum of their intensities during the integration time). Thus, in some embodiments the constituent wave-beams are emitted intermittently (e.g. such that pulses of any two coherent beams are temporally separated), the intensity measured by the detector is the same as the incoherent sum of the intensities of simultaneously emitted incoherent constituent wave-beams. In this connection, in some embodiments of the present invention, the requirement for concurrent superposition can be somewhat relaxed to require that the pulsed illumination of the different constituent wave-beams be circulated through all the constituent wave-beams within the response time of an intensity threshold detector. Utilizing this approach, the wave properties of the constituent wave-beams may not be manipulated, while their incoherence and simultaneous perception is obtained by their time separation relative to the integration time of the detector.

It should be understood that, in some embodiments of the present invention, partial incoherence between constituent wave-beams may be sufficient. At least partial incoherence may be achieved for example by wave-beams having different polarizations which are not-orthogonal and/or utilizing a difference in the path length of the beams being in the order of greater than the coherence length and/or utilizing somewhat different wavelengths and/or by different temporal occurrence of the constituent wave-beams (their pulses as explained above), which may in some cases have some temporal overlap.

By way of example, consider a four-constituent wave-beam, each wave-beam constituent with a different polarization state. Of the four wave-beams, two are in orthogonal linear polarizations and two in orthogonal circular polarizations. Each of the pairs, the two linear and the two circular, are completely incoherent with respect to each other. Therefore superposition of two linearly polarized or two circularly polarized beams would be perfectly incoherent. It remains to show that the partial coherence for superposition of a linear and circular polarization, present in some embodiments of the present invention, is sufficient to allow the formation of a combined wave-beam with fixed lateral extent over the design range, for certain applications. Consider a two-constituent wave-beam, with different, non-orthogonal polarization states. The interference between two one linearly and the other circularly polarized beams may be considered separately in the vicinity of the optical axis and at a distance from the axis. In the vicinity of the axis of propagation, the lateral variation in the relative phase between the two wave-beams is small, and relatively large fringes are formed in the interference pattern. Nevertheless, the visibility of the interference pattern is limited, so that the pattern has no completely dark regions. Specifically the residual intensity in the interference of a linear and a circular polarization always exceeds $$\frac{1}{\sqrt{2}}$$

of the incoherent superposition of the two beams (this minimal interference intensity level occurs for a circularly polarized beam intensity being $$\frac{1}{\sqrt{2}}$$

of the intensity of the linearly polarized beam). In other words the residual intensity of the combined beam due to the partially coherent interference would always exceed some 70% of the intensity possible if the beams were absolutely incoherent. Now, in some applications a threshold intensity that defines the extent of the wave-beam is chosen well below 50% (typically a level between $1/e=37\%$ and $1/e^2=14\%$) of the peak intensity of the wave-beam, a drop in the intensity of the combined wave beam to 70% of the peak in the vicinity of the axis, will have no effect on its detected width in practice for these applications.

Furthermore, off-axis, due to the difference in divergences of the two beams, the phase difference between the two wavefronts grows super-linearly with the distance from the axis, and consequently the interference patterns form fringes with increasing density. Sufficiently away from the axis the fringe spacing is smaller than the size of the detector, and any reduction in the overall intensity due to the interference is confined to small lateral areas, so the effect of interference is reduced. Thus, as typically the threshold intensity of the combined beam is selected below half the maximal intensity mark of the combined beam, the potential "dip" in intensity at the center of the beam does not compromise the detected width of the beam. Any interference at the outer portions of the beam would be less significant.

It is noted that, similarly to the example above in which the constituent wave-beams include two linearly polarized orthogonal beams and two circularly polarized orthogonal beams, a combined beam yielded by the combination of four linearly polarized constituent wave-beams, would provide a similar partially incoherent superposition, as long as the polarization of each constituent wave-beam is rotated by 45 degrees with respect to a previous constituent wave-beam. For example, referring to a two-dimensional (x,y) Cartesian reference system, the first constituent wave-beam is linearly polarized along the horizontal (x) axis, the second constituent wave-beam is linearly polarized along the y=x line, the third constituent is linearly polarized along the vertical (y) axis, and the fourth constituent is linearly polarized along the y=−x line. The first and third constituent wave-beams are orthogonal to each other. Similarly, the second and fourth constituent wave-beams are orthogonal to each other. Although the first constituent wave-beam is partially coherent with the second and fourth constituent wave-beams, and the second constituent wave-beam is partially coherent with the first and third constituent wave-beams, the interference of these constituent wave-beams offers a sufficient intensity for the purposes of the present invention. Similar to the case of interference between the circular and linear constituents described above, the linear polarization states at 45 deg with respect to each other necessarily provide interference visibility with a least 70% illumination near the axis of the beams. In addition at distances off-axis the different divergence of the two beams introduce smaller and smaller fringes, which eventually become smaller than the detector and provide for the required intensity distribution of the current invention.

According to some embodiments of the present invention, more than one group of four beams is used in order to yield the combined wave-beam. In some embodiments, in each group of four, the polarization of the wave-beams is controlled in order to ensure, at most, a partial incoherence, as described above. In order to ensure that the wave beams of the different groups are not coherent with each other, one or more parameters of wave beams of different groups are controlled in order to yield a difference in at least one of: optical path length larger than a coherence length, wavelength, and temporal occurrence.

As described below, each of the examples of the optical device 110.2 are designed to generate several outputs, superposed wave-beams, each with a different divergence and optionally, each with a different intensity. In each of the following examples, different constituent wave-beams are generated by the interaction between the source beam and a different number of optical elements within the optical device 110.2. By choosing the appropriate optical elements within the optical device 9, the total focal power on each constituent wave-beam can be controlled. Additionally, the choice of the optical elements within the optical device 9 may enable control of the intensity of each output constituent wave-beam.

FIG. 5A illustrates an example of optical device 110.2 of the wave-beam generator 110 which is configured to receive an input beam B1 and produce/output two constituent wave-beams B10 and B11 propagating along the same axis and having different divergences. In this example, the optical device 110.2 includes one or more beam splitters (here two beam splitters are used and implemented as partial reflectors R1 and R3) and at least one optical element (represented by lens L2 in the figure) having optical/focusing power. The beam splitters (R1 and R3) and the optical element (L2) are arranged along the optical path of an input beam B1 such that the beam is split into two output constituent wave-beams (B10 and B11), which are reflected a different number of times by the partial reflectors R1 and R3 thus interacting a different number of times with the optical element L2, which yields different divergences of these beams outputted from the optical device 110.2 (due to the optical power of element L2).

More specifically, as shown in the figure, the optical device 110.2 includes a first/proximal partial reflector R1 located closer to the source/port of (not shown in the figure) of the input beam (primary beam) B1 along the optical path of the beam B1, a second/distal partial reflector R3 located farther from the source of the beam B1, and a middle optical element L2 located between the proximal and distal partial reflectors and having optical power. The partial reflectors are configured for reflecting a portion/fraction of a wave-beam interacting therewith and transmitting another portion of such wave-beam.

In some cases, at least partial incoherence of the output beams is achieved by configuring the distance between the partial reflectors R1 and R3 to be in the order of, or greater than the coherence length of the input beam B1. As the output constituent wave-beams B10 and B11 are reflected a different number of times by the partial reflector, a difference between the length of their optical paths within the optical device 110.2 is at least in the order of that distance between the partial reflectors R1 and R3 (twice that distance in the present example) and accordingly, setting that distance to be on the order of the coherence length, provides that the output constituent wave-beams B10 and B11 are at least partially incoherent with respect to one another. Alternatively or additionally, at least a partial incoherence of the B10 and B11 may be achieved by arranging a polarization rotator in between the reflector (with which the different constituent wave-beams B10 and B11 interact a different number of times (as they do with element L2). Thus, suitable selection of the polarization rotation of the rotator, allows for output constituent wave-beams B10 and B11 having different polarizations (possibly orthogonal polarizations), which may facilitate their at least partially incoherent superposition.

More specifically, in the present non-limiting example, in operation, the source beam B1 illuminates the proximal partial reflector R1. A portion B2 (first beam) of the source beam B1 is transmitted therethrough, traverses the middle optical element L2 to and is incident on the second partial reflector R3. A portion of the first beam B2 is transmitted through the second partial reflector R3, and is output as a first constituent wave-beam B10. Another portion (beam B3) of the first beam B2 is reflected by the second partial reflector and again traverses the middle optical element. The beam B3 is incident on the first partial reflector R1 and a portion thereof (beam B4) is reflected back and traverses the middle optical element L2 a third time before it is incident on the second partial reflector R3. Then, part of the beam B4 is transmitted through the second partial reflector R4 and is output as a second constituent wave-beam B11.

Therefore, while the constituent wave-beams B10 and B11 that are output from the optical device 110.2 originate from the same source beam B1 (thus initially having the same divergence) each beam traverses optical element L2 a different number of times, they are output with different divergences corresponding to the optical power of element L2 and the number of times they had interacted therewith.

More specifically, in this example also existing are proximal and distal optical elements (lenses), L1 and L3 respectively. Accordingly, the first constituent wave-beam B10 is affected only once by each of the optical elements L1-L3. In contrast, the second constituent wave-beam B11 is affected once by optical elements L1 and L3, and three times by optical element L2. Optionally, as shown in the figure, the partial reflectors R1 and R3 may be formed with partially reflecting coatings applied to a surface of elements L1 and L3 respectively.

It should be noted that considering an input beam B1 of certain intensity and divergence, the intensities and divergences of the output constituent wave-beams B10 and B11 may be tuned, a-priori or in real time, by proper selection/adjustment of the percentile reflections of the partial reflectors R1 and R3 and the optical powers of the optical elements L1-L3. The percentile reflections of the partial reflectors R1 and R3 control the relation between the reflected and transmitted portions of a beam thus determining the relative intensities of the two output constituent wave-beams B10 and B11. The optical power of optical elements L1-L3 enables control of the divergences of the constituent wave-beams B10 and B11. These parameters may in some cases be a priority selected by the configuration of the lenses and/or reflectors. Alternatively or additionally, in some cases some of the lenses and/or reflectors are controllable (e.g. comprising controllable electro-optical elements and/or opto-mechanical modules) thus allowing real time control and adjustment of at least some of these parameters in real time (e.g. by the wave-generation controller 120) to thereby influence the characteristics of the combined beam formed by the constituent wave-beams B10 and B11.

It should further be noted that due to the percentile reflections/transmissions of the reflectors/beam splitters (R1 and R3), in addition to the desired output constituent wave-beams B10 and B11, some additional light components are also emitted from the optical device 210.1 including retro-reflected components (such as the beam portions B6) and possibly also transmitted and retro-reflected components which were not accounted for above and which result the derivatives of the beams that are reflected back and forth between the partial reflectors R1 and R3. In general in some cases the retro-reflected beam portions are addressed, for example, by providing absorbers or deflectors in the design to ensure they do not introduce undesired effects such as unwanted stray light. Due to the percentile reflection of the reflectors R1 and R3, the intensity of the transmitted components decays logarithmically, thus in some cases the effect of the transmitted beams (except that of B10 and B11) on the combined wave beam IWB may either be neglected or taken into account when determining the parameters/configuration of the device operation.

The optical device 110.2 exemplified in FIG. 5A, may be constructed utilizing only three optical modules/elements R1, L2 and R3 (possibly also including lenses L1 and L3 optically coupled to the reflectors R1 and R3). Evidently, this embodiment offers a simple and low-cost implementation of the technique according to the present invention.

Reference is now made together to FIGS. 5B and 5C, which schematically illustrate other examples of the optical device 110.2 according to some embodiments of the present invention. In these embodiments, a beam-splitter BS2 is used to specially split an input beam B1 into two intermediate wave-beams propagating along spatially distinct intermediate optical paths (OP1 and OP2) within the device 110.2 and then superpose the intermediate wave-beams to be output coaxially as constituent wave-beams B10 and B11. An optical element (e.g. lens/reflector) L2 having an optical power is placed in at least one of the optical paths (e.g. at OP2) of the intermediate beams, such that they interact therewith a different number of times and yielding output consistent wave-beams B10 and B11 with different divergences. Also, similarly to the configuration of the device in FIG. 5A, a polarization rotator may be arranged in at least one of the intermediate optical paths OP1 and OP2, or a difference in the optical length of the intermediate optical paths OP1 and OP2 may be in the order or greater than a coherence length of the input beam, to yield at least partial incoherence of the output beams B10 and B11.

Thus more specifically, in the non-limiting example of FIG. 5B, the beam splitter BS2 is an intensity beam splitter, located between input and output optical ports of the device 110.2 (e.g. manifested here by optical elements L1 and L3 respectively), and arranged (e.g. in 45° to the general light propagation axis of the device) to split an input beam B1 from the input port to two intermediate optical paths OP1 and OP2. Optical element L2 is located along the intermediate optical path OP2 to interact with light propagating therealong to affect the divergence of at least one of the output constituent wave-beams. The intermediate optical path OP2 is defined/confined by two mirrors M1 and M2 (i.e. substantially fully reflective) and the optical element L2 is located therebetween.

Optionally a polarization rotator may be located along the intermediate optical path OP2 to affect the polarization of light propagating therealong. Also optionally, two additional, proximal and distal optical elements L1 and L3 may be located-at/define the input and output ports through which the input beam B1 enters the device and the output beams B10 and B11 exit.

In operation, the source beam B1 is split by beam splitter BS2 into a portion B2 that traverses the beam splitter on axis (along path OP1), and is output at the output port to form the constituent wave-beam B10. A portion B3 is reflected by the beam splitter BS2 to propagate along path OP2 at which it interacts with optical element L2 and is reflected by mirrors M1 and M2 back onto the beam splitter BS2, at which at least a portion thereof is directed to propagate along the intermediate path OP1 and to form the output constituent wave-beam B11 at the output port.

Thus, also in this example the output constituent wave-beams B10 and B11 interact a different number of times with the optical element L2 (none for B10 and twice for B11) hence their different divergences. Optional optical elements L1 and L3 have a similar effect on beams B10 and B11.

Incoherency of the output constituent wave-beams B10 and B11 may be introduced by locating an optional polarization rotator at path OP2 and/or setting a sufficient difference between the lengths of OP1 and OP2 Furthermore, also here the relative intensities of the beams B10 and B11 may be adjusted by the percentile reflection of the beam splitter BS2 and the difference in their divergences by the optical power of optical element L2. For example, to achieve equal intensities of two output wave-beams B10 and B11, the transmission of beam splitter BS1 can be 1%. In this manner, each of the constituent wave-beams B10 and B11 has 1% of the intensity of the source beam B1 (constituting a major loss, some 98%, of the available optical power). For a 50% transmission of beam splitter BS2 the constituent wave-beam B10 has 50% of the intensity of the source beam B1, and the constituent wave-beam B11 has 12.5% of the intensity of the source beam (and the overall loss is reduced to some 37.5%).

It should also be noted that also here, that there might be undesired retro-reflections of beam components/stray-light which may be addressed/absorbed utilizing a similar technique described above with reference to FIG. 5A to ensure they do not introduce undesired effects. Moreover, it should be noted that in this figure the output beams and intermediate beams are illustrated propagating along parallel axes only for the clarity of the figure and that in various configurations the beams (in particular the output beams) may propagate coaxially along common axes and/or along parallel distinct axes.

Referring particularly to FIG. 5C, here the optical device applies different manipulations to differently polarized portions/components of the source beam B1. To this end, the beam splitter BS2 used in this embodiment is a polarizing beam-splitter (PBS), The advantage of this arrangement is the reduction of un-utilized reflections In addition, the optical device 110.2 also includes a first quarter-wave plate QW1 located near the third optical element L2, and a second quarter wave plate QW2 located near the second mirror M2.

In the configuration of FIG. 5C, the source beam B1 includes two polarization components, an s-polarized one and a p-polarized one incident on PBS BS2. The PBS BS2 transmits the p-polarized portion and reflects the s-polarized portion. Therefore, the p-polarized portion that traverses the PBS on axis is output as the first constituent wave-beam B10. The s-polarized portion is reflected by the PBS BS2 redirected towards path OP2 where it interacts twice with the optical element L2 and twice with the quarter wave-plate QW1 (before and after being reflected by mirror M1). The quarter wave-plate QW1 first converts/rotates its s-polarization into circular polarization and secondly converts/rotates the circular polarization into p-polarization. Consequently the p-polarized light traverses through the PBS BS2 and again interacts twice with a second quarter wave-plate QW2 (before and after being reflected by mirror M2). This in the same manner converts the beams polarization from p back to s, such that when the s-polarized light is incident on PBS BS2, it is fully reflected towards the intermediate optical path OP2, and output as the second constituent wave-beam B11. In contrast to the arrangement of FIG. 5B where an intensity beam-splitter is used, here the polarizing beam splitter is used to provide high power efficiency. Consequently, here substantially all of the incident power (of the input beam B1) is available at the output and only marginal/negligible intensity is lost (e.g. due to reflections in undesired directions, Fresnel reflection and/or scatter from various optical interfaces).

The arrangement of FIG. 5C allows the selection/control of the relative intensities of the output constituent wave-beams B10 and B11 by properly adjusting the relative portion of each polarization component in the source beam B1. For example, in case the incident beam is polarized at 45° (has equal intensities in the p- and s-polarized components), the constituent wave-beams will also be of equal intensity, each with approximately 50% of the source beam's intensity (demonstrating the low power loss of this arrangement). A further advantage of the arrangement of FIG. 5C is that the output wave-beam constituents are in orthogonal polarizations states, ensuring the two output beams are superposed incoherently (without the need to ensure sufficient path-length differences between the constituent wave-beams B10 and B11).

FIG. 5D exemplifies, in a self explanatory manner an optical device 110.2, configured according to another embodiment of the present invention. Here the optical device 110.2 includes two PBS's BS2 and BS3 and is configured for differently manipulating two polarization components of an input beam B1 to generate two superposed on-axis constituent wave-beams B10 and B13. An advantage of the configuration illustrated in this figure is that it does not require use of quarter wave-plates yet still provides a high output power efficiency similar to that achievable by the configuration of FIG. 5C.

More specifically, here the p-polarized portion of the input beam B1 traverses both PBS's BS2 and BS3 on axis, and is output as the constituent wave-beam B10. The s-polarized portion is reflected by the first PBS BS2, redirected, by mirror M1 through the optical element L2, and redirected by the mirror M2 into the second PBS BS3, by which it is reflected towards the output to form the second constituent wave-beam B11.

Also this embodiment, similarly to that of FIG. 5C, provides high power efficiency (essentially all the input power is available at the output) and generates two output constituent wave-beams in orthogonal polarizations states, ensuring their incoherent superposition.

Turning now to FIG. 5E, there is illustrated schematically an example of the optical device 110.2 which is configured to split the source beam 1 into three output constituent wave-beams B10, B11 and B12, superposed on the same general propagation axis. The arrangement of FIG. 5E includes two beam splitters, a PBS BS2, and an intensity beam splitter BS3, a quarter wave plate QW1 arranged therebetween, and an additional quarter wave plate QW2 arranged at the other side of the PBS BS2. Optionally, in case power efficient requirements are relaxed, this arrangement can also be implemented with two intensity beam splitters, but as such will suffer significant inefficient intensity transfer to the output. The optical elements, reflective elements, and beams splitters have the same characteristics as described above.

In operation, a source beam B1, comprising p- and s-polarized portions, enters through input port (e.g. through optical element L1) is incident on the PBS BS2. The p-polarized portion traverses the PBS BS2 on its axis, towards the output port (e.g. optical element L3) and is output as the first constituent wave-beam B10. The s-polarized portion is reflected by PBS BS2 towards the intensity beam splitter BS3 thus traversing the quarter wave-plate QW1 (where its polarization is converted to circular polarization) and is split by intensity beam splitter BS3. One part of the split beam is transmitted through beam splitter BS2 to pass through optical element L2 and is redirected by mirror M1 back through optical element L2 towards the beam splitter BS3. From the beam portion that is redirected back through optical element L2, one is reflected away in direction D1. Another part of this beam is transmitted through the beam splitter BS3, traverses quarter wave-plate QW1 (where its polarization is converted to p-polarization), traverses PBS BS2 and is retro-reflected by mirror M2, thus traversing quarter-wave plate QW2 twice to revert to s-polarization and then reflect by PBS BS2 to form the second output wave-beam constituent B11. Similarly a second portion of the s-polarization incident on intensity beam splitter BS3, is directed towards optical element L4, and is redirected by a mirror M3 back to the beam splitter BS3, at which a portion of the beam is directed to direction D1 (e.g. it is lost, dissipated by an absorption plate arranged along its path to prevent stray light output), while the to remaining intensity is directed back towards PBS BS2, converted to p-polarization on transmission through quarter wave-plate QW1, and similarly to the previous output constituent, is eventually reflected through output port to form the third desired constituent wave-beam B12. Apart from the portions of light that are directed away from the system in the direction D1, the remaining light is output in the combination of the desired constituent wave-beams, with marginal intensity lost.

Here the divergences of the three constituent wave-beams are determined as follows: the divergence of the first constituent wave-beam is not affected by any optical element (except for optional optical elements L1 and L3 which may optionally be located-at/define the input and output ports and have similar effect on all the beam constituent wave-beams B10-B12). The second constituent wave-beam B11 is affected twice by the optical element L2; and the third constituent wave-beam B12 is affected twice by the optical element L4. The intensities of the three output constituent wave-beams are determined by a combination of the portion of each polarization in the incident beam, and the percentile reflectivity of intensity beam splitter BS3.

For example, in case the incident light has 20% p-polarization, and intensity beam splitter BS3 transmits 50% of the incident light and reflects 50% of the incident light, all three output constituent wave-beams will have an intensity that is equal to 20% of the intensity of the source beam B1 (40% are lost in the direction D1). The arrangement of FIG. 5E is configured for the generation of three on-axis constituent wave-beams, and a choice of the parameters of the optical elements L2 and L4 and beam splitters (and possibly also those of the optical elements L1 and L3) enables control over the beam divergences and relative intensities of the constituent wave-beams B10-B12.

Referring now to FIG. 5F, an example of the present invention is shown, in which the optical device 110.2 is configured to split the source beam B1 into four on-axis constituent wave-beams B10-B13. Here the optical device 110.2 includes an arrangement of three beam splitters including two polarizing beam splitters and one intensity beam splitter. It is however noted that a similar arrangement can be implemented with three intensity beam splitters (providing reduced efficiency and higher/more significant intensity loss towards undesired directions).

The arrangement of the optical elements/modules of the optical device 110.2, and the beam propagation therethrough are illustrated in a self-explanatory manner in to FIG. 5F and will now be described more specifically in the following. The arrangement and operation of the optical elements enclosed in the dashed line box are similar to those of FIG. 5E. However, here an additional optical arrangement is set along the optical path between the PBS BS2 and the output port (e.g. optical elements L3, L1 and L3 are not specifically shown in this figure). The additional arrangement is configured to collect the s-polarized light components which are directed in direction D1 (and which are lost/dissipated in the configuration of FIG. 5E) and further manipulate their wave-properties and direct them to the output. The additional arrangement includes another PBS BS1, mirrors M4 and M5, lens L5 and polarization rotators (e.g. quarter wave plates) QW3-QW6 as illustrated in the figure.

In operation, a source beam B1 having an s-polarization component is directed to be incident on PBS BS1. This s-polarization component is manipulated similarly as in FIG. 5E to form the similar beam constituent wave-beams B11 and B12. In the present case, before exiting, the beam constituent wave-beams B11 and B12 traverse a polarization rotator (e.g. the two quarter wave plates QW3 and QW4 or alternatively a half-wave plate) and the PBS BS1. The polarization rotators QW3 and QW4 convert the polarization of beams B11 and B12 from S to P and thus they unaffectedly traverse PBS BS1 towards the output.

Here, the circularly-polarized portions of the beams returning from the optical elements L2 and L4, which are directed by the intensity beam splitter BS3 to direction D1, are not dissipated/lost as in FIG. 5E, but rather interact with lens L5 which changes their divergence, redirected by the mirror M4 to be transmitted through the quarter wave-plate QW5 (where they are converted to p-polarization), and transmitted through the PBS BS1, after which they pass twice through quarter wave-plate QW6 (thereby converted into s-polarization), and reflected by the mirror M5 to return to PBS BS1 which reflects them towards the output, to from output constituent wave-beams B13 and B14. Thus, also in this example substantially all of the power of the source light beam (except for some marginal intensity losses) is output in the combination of the desired four constituent wave-beams B11-B14.

The divergence of each of the four constituent wave-beams is determined by the optical elements in the arrangement as follows (not considering the optional optical elements L1 and L3 in the in/out ports): constituent wave-beam B11 is affected twice by optical element L2; constituent wave-beam B12 is affected twice by optical element L4; constituent wave-beam B13 is affected twice by the optical element L2 and once by optical element L5; constituent wave-beam B14 is affected twice by the optical element L4 and once by the optical element L5. Choice of the appropriate parameters of the optical elements L2, L4 and L5 enables control over the divergence of the constituent wave-beams, with a restriction that the ratios between the divergences of B11 to that of B12 and B13 to B14 is the same.

The intensities of the four output constituent wave-beams are determined by the percentile reflectivity of the intensity beam splitter BS3. For example if beam splitter BS3 splits the light 50% transmission 50% reflection, all four output constituent wave-beams will have an intensity that is equal to 25% of the input intensity (with essentially no loss of incident power). Selecting beam splitter BS3 with 40% transmission 60% reflection generates intensities of 36%, 16%, 24%, and 24% for elements B11-B14, respectively (without loss of incident power). The arrangement of FIG. 5F enables the generation of four on-axis/coaxial constituent wave-beams, as well as the capability to design the desired beam divergences (with some constraints) and control their relative intensities (with some constraints). In terms of the incoherent superposition of the different wave-beam constituents, the constituent wave-beams B11 and B13 are orthogonally polarized with respect to each other, as are the wave-beams B12 and B14, so these beams are mutually incoherent. The beams B11 and B12 follow different path lengths in traversing beam splitter BS3. Similarly, the beams B13 and B14 follow different path lengths in traversing beam splitter BS3. This difference in the optical length can be made larger than the coherence length of the input light beam B1, and therefore, the four wave-beam constituents can be generated incoherent with each other.

Referring now to FIG. 5G, there is illustrated another embodiment of the optical device 110.2 of the present invention, which includes several beam splitters and which is configured to split the source beam B1, into a plurality of laterally distributed constituent wave-beams. The lateral distribution of the constituent wave-beams can be significantly small (in the orders of a few millimeters) as compared to the lateral extent of the resulting beam (which may be in the order of a few meters or more), so the effect of the off-axis distribution is negligible.

The source beam B1 is successively split to a predetermined number of n output constituent wave-beams (e.g. $B1_1$-$B1_n$) utilizing a series of beam splitters (e.g. n−1 to beam splitters, BS1, BS2 are illustrated in the figure). A portion of the incident beam on each beam splitter is output to form the respective output constituent wave-beam. Each constituent wave-beam $B1_1$-$B1_n$ is output through a respective optical element, $L2_1$-$L2_n$ configured to adjust its divergence to a desired value. The optical elements differ in optical power from each other, so that each constituent wave-beam is assigned a different divergence. Optionally, a common optical element L1 is included (e.g. located at the input port/path to affect the source beam B1 before the source beam interacts with the first beam splitter BS1. Here, the beam splitters are arranged laterally, (e.g. perpendicular to the general input and output directions), and the last output wave-beam B11 is reflected towards its corresponding optical element L4 by a mirror M1. The relative intensities of the output wave-beams $B1_1$-$B1_n$ are determined by the transmission percentage of each beam splitter.

For example, in order to yield three constituent wave-beams having equal intensities (each being about ⅓ of the input beam's intensity), the optical device 110.2 may be set as follows: the first beam splitter BS1 transmits one-third (33.3%) of the incident intensity, and the second splitter BS2 transmits half (50%) of the incident intensity. In this manner, each of the three constituent wave-beams has one third of the intensity of the source beam 1. In another example, in order to yield four constituent wave-beams having equal intensity (each with 25% of the source beam's intensity), the first beam splitter, BS1 should transmit one-quarter of the incident intensity, the second splitter BS2 transmits ⅔ of the incident intensity, and the third beam splitter (not shown in the figure) should transmit 50% of the incident intensity.

Regarding the relative coherence of the output beams, the path lengths of the beams are different and can be designed to ensure sufficient incoherence between the beams. Alternatively or additionally the polarization states of each output beam can be controlled by adding quarter or half waveplates as required to each beam. For example, a four-constituent wave-beam can include two orthogonal linearly polarized beams and two orthogonal circularly polarized beams as described above. Alternatively a four-constituent wave-beam can include four linearly polarized beams, each shifted by 45 degrees relative to the former, as described above.

Turning now to FIG. 5I1 which illustrates another embodiment of laterally distributed constituent wave-beams, in which the wave-beam source 110.1 of wave-beam generator 110 includes a plurality of laterally distributed wave-beam emitters/ports $Y_1$ to $Y_n$ emitting respective wave-beams (source beams) $B_1$, $B_2$, ..., $B_n$.

The wave-beam sources may be, for example, semiconductor lasers, which are physically small and can be mounted in a closely spaced, laterally distributed array. Optionally, each wave-beam emitter is associated with a respective optical element/module ($L2_1$ through $L2_n$) of the optical device 110.2, so that the source beams $B_1$, $B_2$, ..., $B_n$ interact with their corresponding optical elements and yield constituent wave-beams $B1_1$, $B1_2$, ..., $B1_n$ having the desired divergences. The lateral separations between the wave-beam sources are significantly smaller than the extent of the combined wave-beam. For example, the separation between semiconductor lasers can be in the sub-millimeter range, which introduces a negligible error when the diameter of the combined beam is in the order of several meters. This arrangement allows independent choice of the relative intensities by suitable choice of the power emitted by each wave-beam source. The divergences of the constituent wave-beams are controlled by selecting suitable optical elements within the optical devices to be placed in front of each source. The optical elements may be refractive, diffractive, and/or reflective, as mentioned above. Here the wave-beam constituents can be made incoherent with each other by ensuring that the sources are incoherent with each other (for example, differing in their optical path length and/or wavelength, and/or polarization, and/or temporal occurrence, or combinations thereof as explained above).

In another embodiment of the present invention, illustrated by FIG. 5I, a single light source is split into a plurality of a predetermined number n of output constituent wave-beams. The optical device 110.2 includes optical fibers (FB1-$FB_n$) and fiber splitters ($FSP_2$ ... $FSP_n$). A source beam B1 is guided in an optical fiber FB1, and is successively split (with fiber splitters $FSP_2$ to $FSP_n$). The split light travels through the fibers, and splits between them until reaching the fiber ends. The fiber ends are laterally distributed and are associated with a corresponding optical element $L2_1$, ... $L2_n$. which interacts with the light emitted from the fibers to form the output constituent wave-beams $B1_1$ $B1_n$ with the desired divergences. This arrangement allows independent choice of the relative intensities of the constituent wave-beams, by suitable choice of the percentile transmission of the fiber splitters ($FSP_2$ to $FSP_n$), and the divergences by selecting appropriate optical power of elements $L2_1$, ... $L2_n$, etc. The constituent wave-beams can be made incoherent with each other by ensuring that the path length difference between each two constituent wave-beams is larger than the coherence length of the source, or alternatively by generating different polarization states in each constituent as described above.

The capability of the wave beam generator 110 to generate a wave beam having substantially constant lateral extent that is wider than the system's output port is especially advantageous when used in an interrogation system of an IFF associated with firing equipment and/or surveillance equipment (e.g. a telescope, binoculars or camera). For example, wave beam generator 110 may be used to generate a pre-defined/tunable wave-beam corresponding to a damage zone (lateral extent of damage) of the firing equipment's ammunition. In this manner a gunner may "interrogate" the damage zone before firing and thereby determine the presence or absence of friendly forces in the damage zone, based on reception of the identifying acknowledgment/RF signals received from a responder of the friendly forces, in response to the interrogating wave-beam. Optionally, in some embodiments the lateral extent of the interrogating beam is adjustable, and may be controlled and tuned to match different damage zones of different kinds of ammunition. This may be achieved for example by configuring the wave-beam generator 110 with optical modules (e.g. optical element sets above) whose optical powers can be adjusted. Also utilizing proper configuration of the wave-beam source 110.1 and or the wave-splitter 110.2, the interrogating beam spot/cross-section may be formed with a circular elliptical or nearly rectangular cross-section, to conform to different operational requirements. Such operational requirements may vary in accordance with the damage zones of different ammunition and/or may satisfy a need for finer interrogation separation along a certain dimension. An example of the latter case relates to use of elliptical or rectangular beam to independently and separately interrogate individual building floors/stories (of which the horizontal extent is larger than height) to identify friendly forces.

It should be noted that although in various of the above FIGS. 5A-5I, focusing elements are rendered as optical elements (e.g. particularly as lenses), such elements/modules may be implemented as optical modules for manipulating optical beams or as other modules manipulating acoustic and or general EM beams. Also, in the optical case, a similar modules having the same function (e.g. focusing powers) may be used and may be implemented in various techniques, for example utilizing combinations of one or more refractive/diffractive lenses and/or a graded index lens(s), reflective surfaces (such as a mirrors or deflectors), diffractive modules (such as a gratings or holograms), or any combination of these technologies suitable for producing an optical element having the required focusing/optical power. Also, in some embodiments some or all of the modules/elements presented in FIGS. 5A-5I, may be configured as electro-optical and/or opto-mechanical modules, whose optical powers and/or percentile transmissions/reflections are adjustable and/or may be controlled by the wave-generation controller 120.

Additionally, in some of the above examples of FIGS. 5A-5I, a single input beam B1 is illustrated. In general, some embodiments use two or more input beam sources (e.g. having different initial divergences and possibly being respectively incoherent, for example having different wavelengths and/or different polarizations) fed into the wave-splitter 110.2 to multiply the number of at least partially incoherent output constituent wave-beams with respectively different divergences. The two or more input beams may be coaxial beams propagating along a common axis and/or arranged laterally with substantially parallel axes.

Figure 6A:
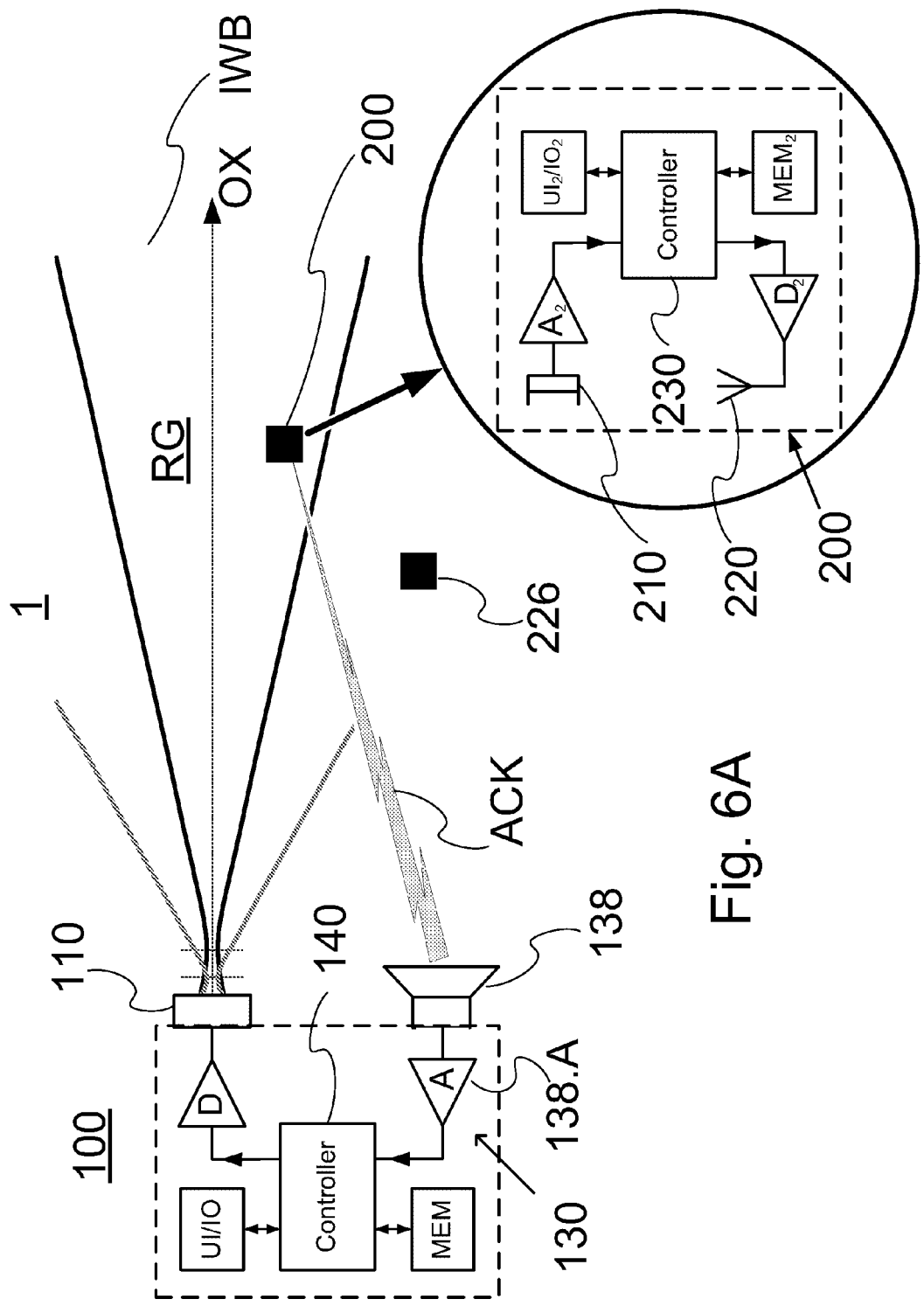
FIGS. 6A and 6B are block diagrams illustrating schematically two embodiments of an IFF system according to some embodiments of the present invention.
Figure 6B:
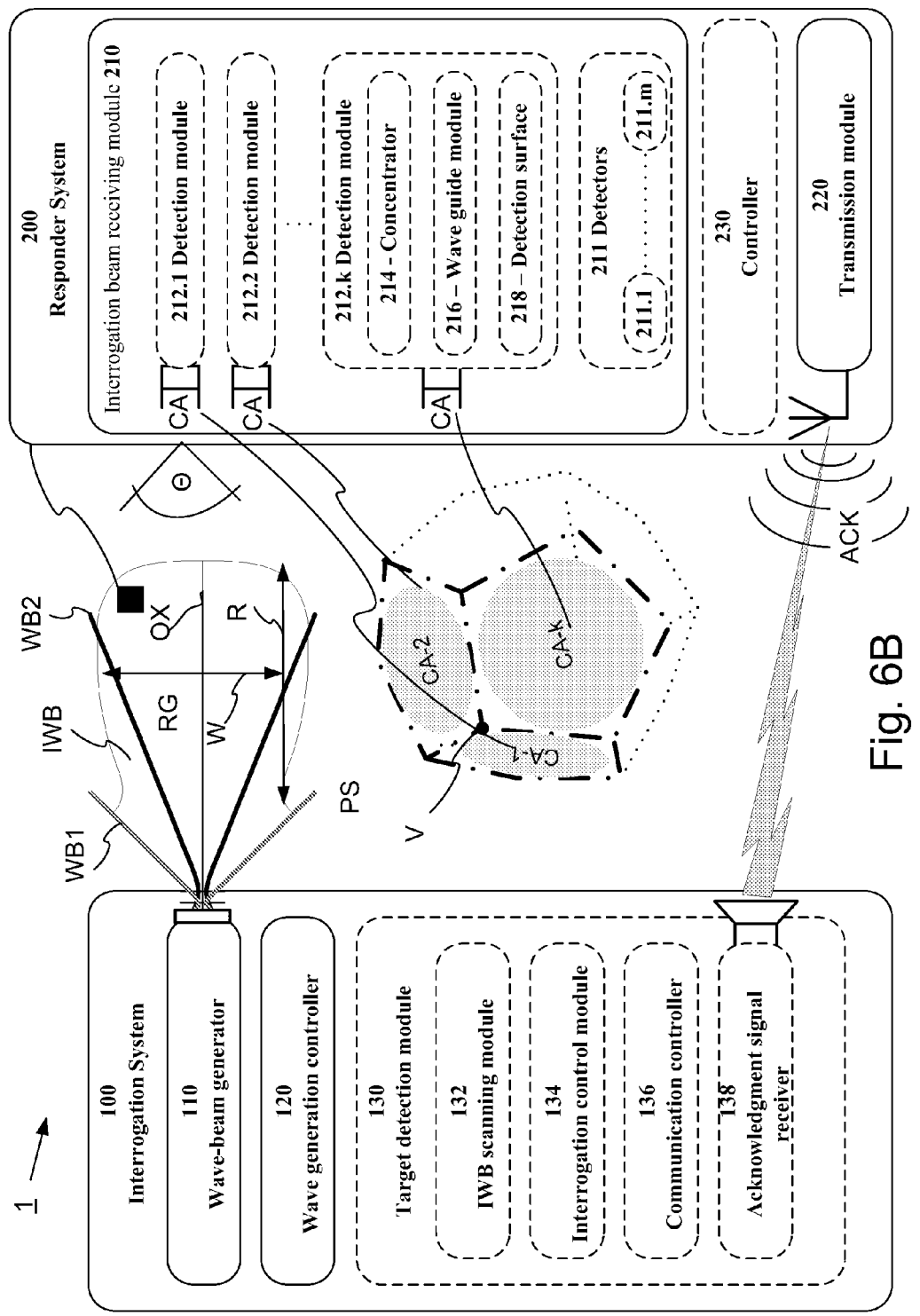

Reference is now made together to FIGS. 6A and 6B illustrating schematic block diagrams of two embodiments of an IFF system 1 according to some embodiments of the present invention. IFF system 1 includes an interrogation system 100 and a responder system 200. The interrogation system 100 is adapted for generating an interrogating wave-beam IWB towards a direction defined by the interrogation beam propagation axis OX, and having a certain substantially constant lateral extent W at a selected range R along the propagation axis OX (i.e. the spot size of the interrogation wave beam remains approximately fixed within the range R). The responder system 200 is adapted for detecting the interrogating wave-beam IWB (in cases it is located within the boundaries of the interrogation region RG of the beam, in which the intensity is higher than a predetermined detection threshold) and generating an acknowledgment signal ACK in response. The acknowledgment signal ACK is transmitted back to the interrogation system 100. The interrogation system 100 is adapted for detecting such an acknowledgment response signal ACK and to thereby obtain an indication that the responder system 200 is located within and/or in close vicinity of the illuminated interrogation region RG. To this end, personnel, equipment, vehicles or posts that are equipped with a suitable/authentic responder, respond to the interrogation and are thereby identified as "Friendly Forces", whereas those that are not equipped with a such to a responder remain suspect as "Foes".

The interrogator module 100 generally includes a wave-beam generator module 110, a target detection module 130, and a control unit 140 connectable to the wave-beam generator 110 and the target detection module 130. The responder 200 includes an interrogation beam receiving module 210 (e.g. detector adapted for detecting the interrogation beam IWB and possibly also an amplification device $A_2$ configured to amplify the detected signal), a transmission module 220 (e.g. RF antenna and driver(s) $D_2$ to drive them) capable of transmitting acknowledgment signals), and a controller 230 connectable to the interrogation beam receiving and transmission modules 210 and 220.

The wave-beam generator module 110 is configured and operable as described above, for producing at least one interrogation wave beam IWB having a certain substantially fixed/constant lateral extent W over a certain working range R. The interrogation wave beam IWB is produced by generating the plurality of at least partially incoherent and at least partially overlapping constituent wave-beams having different divergences and substantially parallel axes of propagation. In this connection, the plurality constituent wave-beams used for forming the interrogation wave beam IWB are generated simultaneously in the sense that they are produced at the same time to propagate concurrently and/or generated within a time frame being in the order of or shorter than the integration time (e.g. time resolution) of the interrogation beam detection module 210 of the responder system 200 (i.e. such that they are perceived by the detection module 210 as if they propagate concurrently as a single beam).

The control unit 140 may be a computerized module including one or more processing units and suitable hard-coded instructions and/or software instructions stored in associated memory MEM. In some embodiments, the control unit 140 includes a wave generation control module 120 that is configured and operable for controllably and selectively operating the wave-beam generator module 110 for causing the generation of a desired interrogation wave-beam IWB for covering a desired interrogation region RG defined by a certain substantially constant lateral extent W extending over a selected range R along the general direction of propagation OX of the wave-beam IWB.

The control unit 140 is also connected to/associated with the target detection module 130. The target detection module 130 typically includes an Acknowledgment signal receiver 138 (e.g. suitable antenna and/or sensor/transducer) and possibly also amplifier 138.A for receiving/detecting ACK signals transmitted by the responder system 200 and possibly amplifying the received ACK signals. The control unit 140 is configured to process signals received by the Acknowledgment signal receiver 138 to verify whether they originated from a friendly responder 200 and if so, to generate a "friend-identified" control signal/trigger. Optionally, "friend-identified" control signal may be sent to an appropriate output device (such as a display, or a speaker) to warn the operator that friendly forces are illuminated by the interrogation wave beam, and/or to another device associated with the weapon/surveillance system (e.g. to instruct the device to prevent/activate performance of certain action(s) (e.g. preventing the weapon from firing, or activating a surveillance camera(s) to capture the specific region in which the friendly forces are identified).

It should be noted that, in general, the interrogating wave beam IWB may be generated according to the technique of the invention by an at least partially incoherent combination of constituent wave-beams of any suitable type (including and not limited to electromagnetic waves such as infra-red light or radio frequency, and/or an acoustic waves, such as ultrasound). Accordingly, the wave-beam generator module 110 of system 100 may include any one or more of the following: optical/light modules include acoustic transducers, and/or electro-magnetic (EM) transmission modules and antennas. The interrogation beam receiving module 210 may include appropriate respective optical sensors, EM/RF receivers/antennas and/or acoustical sensors (e.g. acoustic transducer(s) and possibly appropriate acoustic wave collectors) capable of sensing the interrogation wave-beam IWB. It should also be noted that in various implementations of the system 1 the acknowledgment signal ACK may include or be constituted by various wave types, such as optical, EM/RF and/or acoustic waves and/or with various wavelength bands. Accordingly and respectively, the transmission module 220 of system 200 may include any optical/light sources/modules and/or EM/RF transmission modules and/or acoustic transducers (e.g. it may be formed by arrays/phased arrays of any of the above). In turn, the target detection module 130 of system 100 may include light/EM and/or acoustical detection modules (e.g. light-sensors/antennas/microphones). Considering the above optional possibilities, a person skilled in the art, aware of the technique of the present invention, would readily appreciate how to implement the principles of the present invention, using any of the above suggested types of possible interrogation wave-beams and acknowledgment signals.

Notwithstanding the above, a preferred embodiment of the IFF system of the present invention includes an optical interrogation wave-beam and an RF acknowledgement signal. Specifically, according to some embodiments of the present invention, the interrogation wave-beam IWB is formed as a substantially directional beam directed to cover a region of interest RG along the interrogation axis OX. Also preferably, according to some embodiments of the present invention, the responder system 200 may be configured for generation of an essentially omni-directional (or at least in the half-space from which it can be interrogated) acknowledgment signal ACK that may be detected by the target detection module 130 (e.g. sensor/antenna 138) of the interrogation system 100, irrespective of the relative orientation of the responder system 200 with respect to the interrogation axis OX, or equivalently with respect to the detection apparatus. A person of ordinary skill in the art will readily appreciate how to generate such a substantially omni-directional (e.g. in at least the half-space), utilizing suitable signal emitters/antennas/transducers.

The control unit 140 may also include, or be associated with, a non-volatile memory (MEM), and/or a user interface (UI), and/or input/output (IO) elements. Optionally, the memory MEM stores functional logic of the interrogator (e.g. encoded in computer readable form), and/or pre-assigned codes/encryption keys for identification and/or authentication of communication with friendly responders. Optionally the memory MEM or a part thereof may be implemented as a removable memory device connectable to the system 1 to facilitate code or key update/verification in the field. The user interface UI and/or input/output elements may include devices such as speakers and/or display) to inform the operator that a suitable ACK RF signal has been received in response to the interrogation, and may optionally include user operation buttons and a light indicator, as well as connection interfaces for programming the interrogator and updating its identification codes, modulation codes and encryptions keys. In some embodiments the wave-beam generator 110, may be physically attached to a weapon or camera, while the target detection module 130 and the control unit 140 or some parts thereof may possibly be located remotely from the wave-beam generator 110 and in communication therewith via wired/wireless transmissions.

The controller 230 of responder 200 is generally connected to or in communication with the interrogation beam receiving module 210 and the transmission module 220 of the responder 200. The controller 230 may be a computerized module including one or more processing units and suitable hardcoded instructions and/or software instructions stored in non-volatile memory $MEM_2$ associated therewith. Memory $MEM_2$ may store functional logic and programs, timing sequences or other modulation coding representing identification/codes and/or encryption keys). The memory $MEM_2$ may optionally be at least partially implemented as a removable memory device facilitating code and/or key update in the field). In some embodiments, the responder 200 may also include a user interface ($UI_2$) (e.g. input/output elements ($IO_2$) such as user operation buttons, displays and indications), as well as connecting interfaces for programming the responder and updating its functional logic and codes. When the interrogation beam detection module 210 of the responder 200 is illuminated by a interrogation wave-beam IWB, a detection signal generated by the interrogation beam detection module 210 is processed by the controller 230 to verify whether the beam IWB originates from a friendly interrogator module 100. Accordingly controller 230 determines whether an RF ACK signal should be generated and transmitted (e.g. omni-directionally) and operates the transmission module 220 accordingly. The controller 230 may utilize interrogator identification codes stored in memory $MEM_2$, for comparing the interrogator's identification code as received via the interrogator beam modulation in order to determine whether the interrogator is friendly. Upon identifying interrogation by friendly interrogator 100, controller 230 operates the transmission module 210 to transmit an ACK RF signal and possibly utilizes the driver $D_2$ to modulate the ACK signal, according to a desired sequence corresponding to a modulation code and/or encryption key stored in the memory $MEM_2$.

When the firing/surveillance equipment that is associated with the interrogator module 100 points at a region of interest, a directional wave-beam having the constant lateral extent is generated by generator 110 and illuminates the region of interest RG. The interrogation system 100 may be configured for different applications, for mounting on different carriers. The interrogation/working ranges and lateral extents of the interrogation wave-beam may vary in the different implementations. For example, interrogator module 100 may be mountable on carriers ranging from handheld devices (e.g. binoculars) and having short-range interrogation (e.g. up to 1,000 m), and/or configured for mounting on terrestrial vehicles providing larger interrogation ranges of 4,000-5,000 m or a variety of air-borne platforms with even larger interrogation ranges. While the form of the interrogator, its size, environmental protection and peripheral equipment may differ in different implementations, the technique for generating the interrogation wave-beam with substantially constant lateral extent remains similar. Furthermore, the same responder 200 may be used with all the different interrogators, allowing IFF operation throughout different scenarios and ranges. Vice versa, the same interrogation system 100 may be responsive to acknowledge signals from various responder implementations.

In various embodiments of the present invention, the responder 200 may be configured for marking vehicles, trails, positions, or areas as friendly, by affixing them to a vehicle or position. The responder 200 is designed in some cases to be a compact device and/or portable/handheld/wearable-device and may be battery operated. As the responders ACK signals may be coded, tracking the location of a specific responder may assist in the location of personnel (e.g. for located friendly forces and/or missing or injured personnel displaced in action).

In some embodiments, in order to avoid misuse of the system and improve its reliability, the interrogation signal and/or the acknowledgement signal are coded with pre-assigned code and optionally also encrypted (e.g. utilizing said predetermined encryption keys stored in memory MEM). Coding and/or encryption may be performed by applying specific modulation pattern (e.g. time modulation pattern and/or pulse sequences). The memory MEM may store the pre-assigned codes/keys. Such pre-assigned codes may for example include pre-assigned identification codes of one or more responders of friendly forces, and/or pre-assigned modulation code(s) such as, interrogation identification codes and/or encryption keys. Controller 140 (e.g. wave-generation controller 120) may be used to operate a driver D of the wave-beam generator module 110 to modulate the interrogation wave-beam IWB, according to a desired modulation sequence corresponding to the pre-assigned modulation code(s). This allows friendly responders to identify the interrogator 100 and/or authenticate its communication. In other words controller 230 of the interrogator may be adapted to decode information encoded in the interrogating wave-beam IWB and possibly decipher it utilizing with pre-assigned codes/encryption-keys stored in memory $MEM_2$. The decoded information including pre-assigned identification code of the interrogator may be used to authenticate the interrogator 100 and verify that it is a friendly interrogator. This may be achieved by comparing the received interrogator's identification code, with pre-assigned codes stored in memory $MEM_2$ (e.g. with a list of pre-assigned interrogator's identification codes), or by identifying other features unique to the interrogator's identification code. If a positive match is found, the responder 202 emits acknowledging response RF ACK. In some cases, in response to interrogation by the interrogator 100, the responder 200 (e.g. controller 230) is adapted to operate transmission module 220 to encode the responder's and/or interrogator's identification codes in the acknowledgment signal ACK. The encoded responder's identification code allows the interrogator 100 to authenticate the responder 200, while the interrogator's identification codes encoded in the ACK ensure that the acknowledgement signal is a response to an interrogation by the same interrogator. Authenticating the responder 200 may be performed by comparison of its identification code, transmitted in the ACK, to a list of codes stored in the interrogator's memory MEM, or by identifying other features unique to the transmitted identification code. Verifying that a received ACK signal is indeed a response to the interrogator's own interrogation and not due to interrogation by another interrogator, may provide significant improvement to the reliability of the IFF system 1 and reduce the rate of false alarms.

In some embodiments, the controller 140 may be adapted to utilize logic and timing/modulation sequences stored in its memory and to accordingly operate the wave beam generator 210 for performing repeated interrogations with varying timing sequences/modulations, and/or to operate/analyze the signals received by the receiving sensor 238 to scan different possible frequencies by which the responder's ACK signal may be transmitted. This provides for improving the probability of detection and reduction of false detection rates.

The responder module may include a power-saving (e.g. standby mode) in which at least the detector (receiving unit) 210 is powered down. In such power saving mode, the responder module periodically powers itself and operates the detector 210 to detect the presence of an activation signal (e.g. also referred to below as initialization sequence). Therefore the responder module is active (in detection mode) for a certain duration within a predetermined time period (e.g. active for 5 milliseconds every 100 milliseconds). Such an operation mode requires that the interrogator beam data transmission be preceded by an activation signal in the form of a transmission sequence, either in successive pulses or as a continuous wave-beam. The purpose of the activation signal is to activate the responder, and the activation signal's transmission sequence extends over a time interval that is larger than the time period during which the responder is inactive, to ensure that the interrogation beam's data sequence is not missed by the responder module's detector. Once the activation sequence is received by the responder module's detector, the responder module's detector is primed to receive the desired wave-beam generated by the interrogator module (and any data included within) and remains active sufficiently long to receive the transmission of the desired wave-beam.

For example in case the responder module is active for a duration of 5 milliseconds in every period of 100 milliseconds, an activation signal generated by the interrogator module should span a little over 95 milliseconds to ensure its detection, (i.e. irrespective of the responder's power-down cycle timing). Optionally, the activation signal is an initialization sequence encoded in the interrogation wave-beam. Alternatively, the interrogator module includes a dedicated transmitter (e.g. an RF emitter) configured for emitting the activation signal. In the latter case, the responder 200 may include a receiver (not specifically shown in the figures) configured for detecting the activation signal while other modules of the responder may remain in a powered down mode until such an activating signal is received.

Turning now to FIG. 6B a more specific example of the IFF system 1 according to an embodiment of the present invention is illustrated. Here the interrogation system 100 includes a wave-beam generator module 110 that is configured and operable for generating two or more combinations of the wave-beams, such that each combination includes the substantially concurrent/simultaneous production of two or more at least partially incoherent and at least partially overlapping constituent wave-beams.

Here, the controller (140 of FIG. 6A) is depicted as several controller modules including a wave generation controller 120 and additional modules 132, 134 and 136, which are associated with the target detection module 130 and which are described in more detail below. The wave generation controller 120 is configured and operable for controllably and selectively operating the wave-beam generator module 110 for causing the generation of a desired interrogation wave-beam IWB for covering a desired interrogation region RG defined by a certain substantially constant lateral extent W extending over a selected range R along the general direction of propagation OX of the wave-beam IWB. The wave generation controller 120 selects a combination of constituent wave-beams (e.g. WB1 and WB2), whose superposition produces the desired interrogation wave-beam IWB having at least a certain minimal intensity within the interrogation region RG and a lower intensity outside that region RG. Thus, when the responder system 200 is located within the interrogation region RG, it can detect the interrogation wave-beam and respond with an ACK signal.

In the following, in order to simplify the description of following figures, and without loss of generality, generation and reception of optical interrogation wave-beam IWB (such as infra-red light) by systems 100 and 200 respectively are in some cases considered. To this end, the interrogation wave-beam generator module 110 may include for example laser(s) serving as the wave-beam source 110.1 and optical elements arranged to form the optical device 110.2, and the interrogation beam receiving module 210 includes optical detection modules (e.g. light detector(s)/sensor(s) and appropriate optics). Also for clarity, in the following description, the acknowledgment signal ACK is considered to be an EM signal (e.g. radio frequency (RF) signal) which is respectively generated and received by transmission module 220 of responder 200 (e.g. including an RF transmitter) and target detection module 130 (including RF receiver 138) of the interrogation system 100.

In the present example, the interrogation beam receiving module 210 may include one or more detection modules 212.1 to 212.$k$ which may be arranged to detect an interrogation beam IWB incident on the responder system 200 at different angles. Typically the detection modules 212.1 to 212.$k$ are arranged to allow detection of an interrogation wave-beam incident from anywhere within a solid angle of at least $2\pi$ steradians (a hemisphere), enabling the responder system 200 to respond to an interrogation wave-beam IWB originating from anywhere in space within a solid angle θ, typically subtending an angle of at least ±90° with respect to its primary orientation. Although geometrically even a single detection module is possible, practically, to cover the solid detection angle of a hemisphere with sufficient sensitivity, three or more detection modules 212.1 to 212.$k$ are preferable. Specifically, each of the detection modules 212.1 to 212.$k$ are associated with, or include, collection apertures CA for collecting portions of the interrogation wave-beam IWB when it is incident within a portion of the half-sphere. The configuration and operation of the interrogation beam receiving module 210 and detection modules 212.1 to 212.$k$ are described in more detail below with reference to FIGS. 11A-12D.

The collection apertures CA of the at least three detection modules 212.1 to 212.$k$ are typically configured with at least partially overlapping solid collection angles. This overlapping ensures in practice that no blind spots/angles occur. As indicated above, in some embodiments, collection apertures CA of the at least three detection modules 212.1 to 212.$k$ are arranged and configured to collect portions of an interrogation wave-beam IWB incident from anywhere within at least the solid angle of a hemisphere ($2\pi$ steradians).

To this end, in some embodiments the collection apertures CA of the at least three detection modules may be respectively arranged on (e.g. co-planarly-with/parallel-to) at least three faces of a regular convex polyhedron PS. As illustrated for example in FIG. 6B, collection apertures CA-1 to CA-k respectively associated with detection modules 212.1 to 212.$k$ are arranged on/are parallel to three faces of Platonic Solid PS surrounding at least one vertex V of the Platonic Solid PS and the angular extent of collection of each collection aperture fully covers all points within each face. This arrangement provides uninterrupted angular coverage over a desired total solid angle (e.g. of a hemisphere). In some cases the detection modules 212.1 to 212.$k$ are configured such that the collection angles are bound by a cone such that the base of the cone is a circle circumscribing the vertices of said face and the collection apertures CA-1 to CA-k are circles bound by these cones, each parallel to said face of the Platonic Solid. In some implementations the apex angle of these collection cones is made larger than the angle formed with the circle circumscribing the vertices of the Platonic Solids to reduce and/or eliminate blind spots from the total solid angle at which interrogation wave-beam coverage is desired. It should be understood that the apertures CA-1 to CA-k may be arranged parallel to the faces of various Platonic Solids and that the specific Platonic Solid PS in FIG. 6B does not form part of module 210 and is only illustrated to exemplify one possible arrangement of the collection apertures CA-k according to an embodiment of the present invention.

As noted above, according to some embodiments, the interrogation wave-beam receiving module 210 and/or the entire responder system 200 may be configured as a wearable device to be worn by personnel. The interrogation wave-beam receiving module 210 and or the entire responder may be attached to head-gear, or mounted on body-worn equipment/uniform, such as back-packs or equipment vests. In some cases, two responder systems 200 (e.g. and/or a single responder system configured as distributed system having two or more interrogation beam receiving module(s) 210), each with coverage of half a sphere for detecting interrogation wave-beams, may be used mounted/worn by each person (e.g. on the front and back of a head-gear, and/or left right sides of the uniform), so as to complement the area of coverage of each other. For example, as the upper arms of professional personnel are typically free of equipment, in some embodiments the interrogation beam receiving module(s) 210 and/or the entire responder system 200 may be configured for mounting thereat and oriented to detect an interrogation wave-beam from the left and right sides. Such location of the responder's receiving module(s) 210 is both convenient for the person/wearer and remain unobstructed. In some embodiments, the responder 200 includes a mount element (e.g. a fixture; not specifically shown in the figure) for mounting at least an interrogation beam receiving module 210 thereof on the upper portion of the arm (e.g. on the shoulder or a shoulder strap). For example the responder 200 may be secured to the arm utilizing a Velcro strap of adjustable length or a suitable sleeve/shoulder fixture. Two such upper arm mounted responders, each with an angular coverage of half a sphere, may provide a complete coverage of $4\pi$ steradians (solid angle of a sphere).

As noted above, in response to detection of an authentic interrogation wave-beam IWB, responder system transmits an acknowledgment signal ACK. In turn, the acknowledgment signal receiver 138 (e.g. RF receiver) of interrogator 100 receives the acknowledgment signal ACK and the target detection module 130 processes it to identify whether an authentic responder is within the interrogated region RG (range R and lateral extent W) of the interrogating beam.

In this example, the target detection module 130 optionally also includes a communication controller 136, that is connectable to the receiver 138. The communication controller 136 is adapted for monitoring one or more communication channels (e.g. RF channels) and selecting (e.g.

based on a level of interference in the channels) a certain communication channel for receiving the acknowledgement signal ACK from the responder system 200. The communication controller 136 may be adapted to encode the identification code of the selected channel in the interrogation wave-beam and thereby communicate it to the responder system 200. This provides for optimizing the communication over the certain communication channel.

To this end, as further described in the following, the interrogation wave-beam IWB may be a pulsed beam and may be coded with information/data to be conveyed to the responder 200. In some cases the absence or presence of pulses in a sequence of pulses of the interrogation wave-beam IWB encodes data to be transmitted to the responder 200. Similarly, the acknowledgement signal of the responder system 200 is designed to encode data. Together, the coding of the interrogation wave-beam and the coding of the acknowledgement signal effect bi-lateral communication between the interrogator and responder. This communication allows transmission of the preferred acknowledgement channel (as well as other data, such as an identification code) from the interrogator system 100 to the responder system 200. It is clarified that other forms of data encoding may alternatively be used for encoding data onto the interrogation wave-beam IWB and/or in the acknowledgment signal ACK utilizing other suitable communication methods (e.g. by utilizing pulse position and/or amplitude modulation and/or sequence frequency modulation), or optionally and alternatively adding an additional RF channel to transmit data from the interrogator to the receiver.

In some embodiments of the present invention the target detection module 130 includes an interrogation control module 134 that is adapted for operating the wave-beam controller 120 and/or directly operating the wave-beam generation module 110 for generating the interrogating wave-beam IWB and possibly encoding interrogation data therein in accordance with a predetermined interrogation protocol. Accordingly controller 230 of the responder system 200 is configured for processing the received interrogating wave-beams IWB, decoding the interrogation data therein, and operating the transmission module 220 to transmit appropriate acknowledgment signal ACK, which may also be encoded with acknowledgment data.

To this end, the operation of the target detection module 130 and the controller 230 are complementary and provide bi-lateral communication between the interrogator and responder in accordance with the predetermined interrogation protocol. In some cases, bi-lateral communication facilitates one or more of the following: identifying a code of the interrogator system 100 to authenticate the interrogation; identifying the code of the responder to authenticate the responder system 200; identifying the code of the interrogator in the acknowledgement response to ensure that the acknowledgment is a response to the interrogation by the same interrogator system 100; resolving a location of the responder system 200 with improved accuracy and reliability; enabling the responder system 200 to enter idle/sleep modes for predetermined time intervals/durations so as to save power and prolong its operation for a given battery capacity; and reducing the probability of interference between the acknowledgment signal ACK of several co-interrogated responders as well as reducing the RF interference from other systems. The interrogation protocol and the operations of modules 134, 136 of the target detection module 130 and the operation of the controller 230 are described in more detail below with reference to FIGS. 8-10.

According to some embodiments of the present invention the target detection module 130 also includes a interrogation wave-beam scanning module 132 that is configured and operable for sequentially operating the wave generation controller 120 for sequential generation of two or more different interrogation wave-beams IWB (e.g. IWB1 to IWB3) covering different interrogation regions and, for example, pointing to different directions and/or having different ranges R and/or different lateral extents W. This enables improved estimation/determination of the position of a responder system 200 being interrogated ("illuminated") by one or more of the different interrogation wave-beams. Responder 200 may be configured and operable for encoding in the acknowledgment response signal(s) ACK, intensity data indicating the intensity of each interrogation beam, sensed by the responder 200 and the target detection module receiving the ACK signal may be configured to decode the intensity data encoded on the ACK and determine how strongly each interrogation wave-beam was received by the responder 200.

To this end, the interrogation wave-beam scanning module 132 is adapted for processing the intensity data, based on the ranges and lateral extents of the different respective interrogating beams (e.g. IWB1 to IWB3) and estimating the location of the responder system 200 with improved accuracy. In addition, optionally, the intensity data may be displayed to the interrogation system operator (e.g. as a quantities value/units of intensity, or as a qualitative grade representing the quality of the response), thereby enabling the operator to estimate the quality of the interrogation and response and assess whether the interrogation should be repeated (e.g. with the same or different interrogation wave-beam).

Specifically according to some embodiments of the present invention the interrogation wave-beam scanning module 132 is configured and operable for performing the following operations:

i. Operating the wave generation controller 120 for generating one of two or more possible interrogation wave-beams IWB with a desired lateral extent and range and optionally aimed in a desired direction.

ii. Determining whether an authenticated acknowledgment response signal is obtained from a responder system 200 in response to interrogation by a specific interrogation wave-beam IWB generated. The scanning module 132 may be connected to the interrogation control module 134 and/or to the receiver 138 for receiving therefrom data indicative of acknowledgment signals detected thereby and possibly also data indicative of data encoded in such acknowledgment signals (for example intensity data indicating the intensity/amplitude at which the interrogation wave-beam is received by responder system 200); and possibly, storing the intensity data.

iii. Repeating (i) and (ii) for the two or more interrogation wave-beams; and iv. Processing the intensity data obtained in (ii) for each of the two or more interrogation wave-beams in accordance with at least one of the ranges $R_n$ and lateral extents $W_n$ and optionally directions $OX_n$ of the two or more interrogation wave-beams IWB to determine with improved accuracy and reliability the possible regions/positions at which the responder system 200 may be located.

Figure 7A:
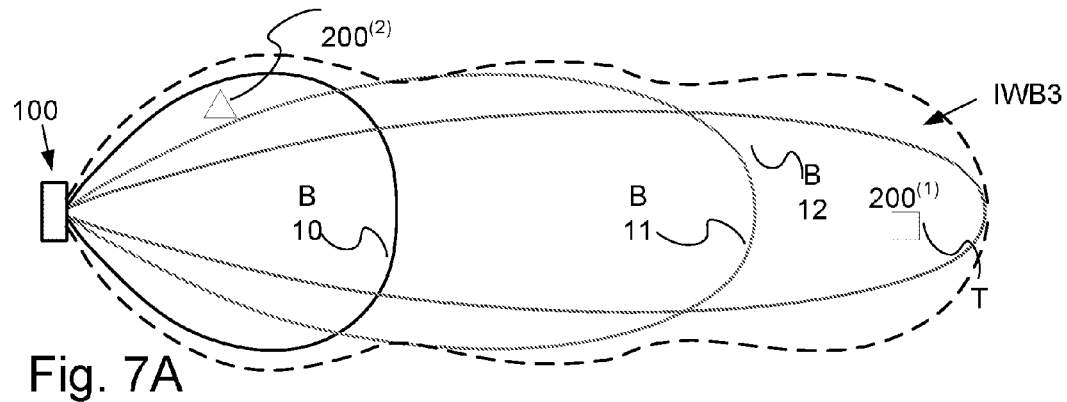
FIGS. 7A, 7B and 7C respectively illustrate schematically multiple interrogations performed by the interrogation wave-beam scanning module for detecting and possibly locating responders in a region of interest.
Figure 7B:
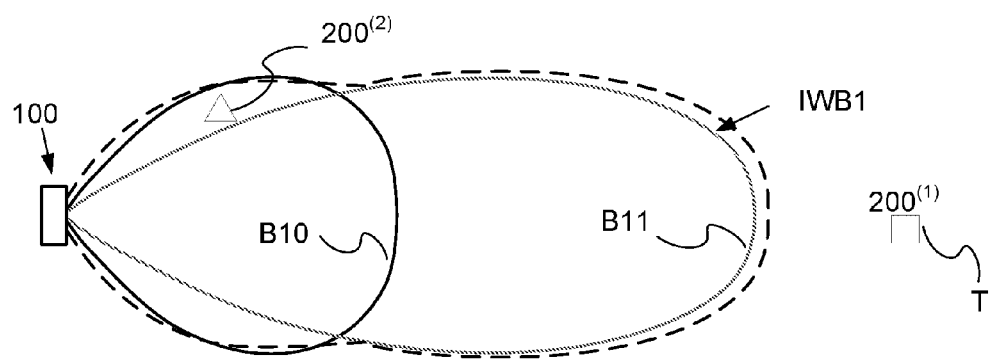
Figure 7C:
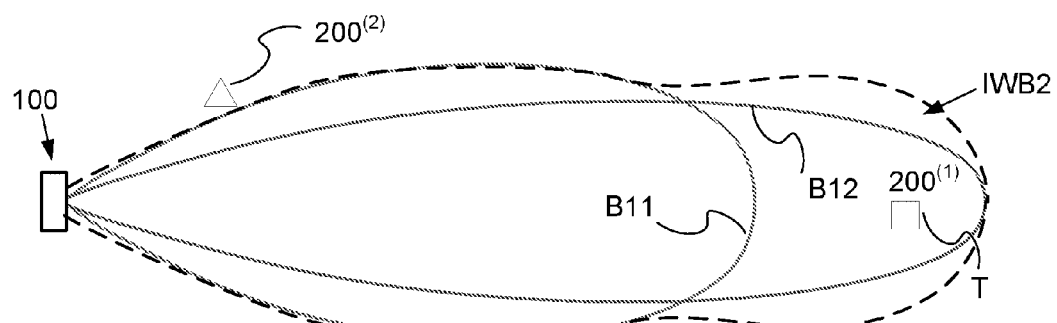

FIGS. 7A, 7B and 7C are respective illustrations of multiple interrogations performed by the interrogation wave-beam scanning module 132 for detecting the existence of responders 200[(1)] and 200[(2)] in a region of interest and possibly roughly locating them. Scanning is performed utilizing sequential interrogation by multiple interrogation wave-beams, each formed with different constituent wave-beams and having different range and/or lateral extent. In this example, an interrogation of a distant target T (marked with a square) is performed, while an inadvertent bystander with a responder 200[(2)] is located at closer range (marked with a triangle). An operator of the interrogation system 100 may not notice the bystander as his or her attention may be focused on the distant target. FIGS. 7A-7C respectively show three interrogations performed with interrogation wave-beams IWB3, IWB1 and IWB2 (similar to those described with reference to FIG. 3E). Interrogation by wave-beam IWB3 introduces an acknowledgement signal from the bystander's responder 200[(2)] irrespective of whether the target T carries a responder (and is a friend) or does not carry a responder (and is therefore suspected as a foe). Advantageously, however, this problem is resolved as the interrogation wave-beam scanning module 132 may perform repeated interrogations with additionally different interrogation wave-beam(s) in order to better resolve the location of the acknowledging responder 200[(2)]. Specifically, in this example, two additional interrogations are performed with the wave-beams IWB1 and IWB2, which have different ranges and/or lateral extents. While in this example, the wave-beam IWB3 covers interrogation ranges of about 200 to 4,000 m, interrogating wave-beams IWB1 and IWB2 correspond to two different distance ranges of about 200 to 1,600 m and 1,400 to 4,000 m respectively. Thus, as shown in the figure, a response from the bystander 200[(2)] would not be received by the interrogation with wave-beam IWB2 but would be received when utilizing with wave-beam IWB1. In this manner, the sequential generation and interrogation by the different interrogation wave-beams (e.g. each having the constant lateral extent over a different specified range), allows discrimination between the target T and the bystander which carries responder 200[(2)]. This provides a robust interrogation scanning procedure/technique for obtaining information relating to the location (e.g. distance/lateral-position) of the responder 200.

It should be noted that the interrogation at different ranges can be expanded either by adding additional wave-beam constituents to generate more ranges and lateral extent segments, or by using each wave-beam constituent separately. In the above three-beam example, one can generate six interrogation range segments by utilizing several possible combinations of constituent beams B10-B12 that can be produced by the wave-beam generator 110 namely: each of the constituent beams B10-B12 separately, and three combinations thereof IWB1-IWB3. The interrogation control module 134, and/or the interrogation wave-beam scanning module 132, may be configured and operable for applying logical processing to determine the presence or absence of responders in the designated region that is interrogated.

Figure 7D:
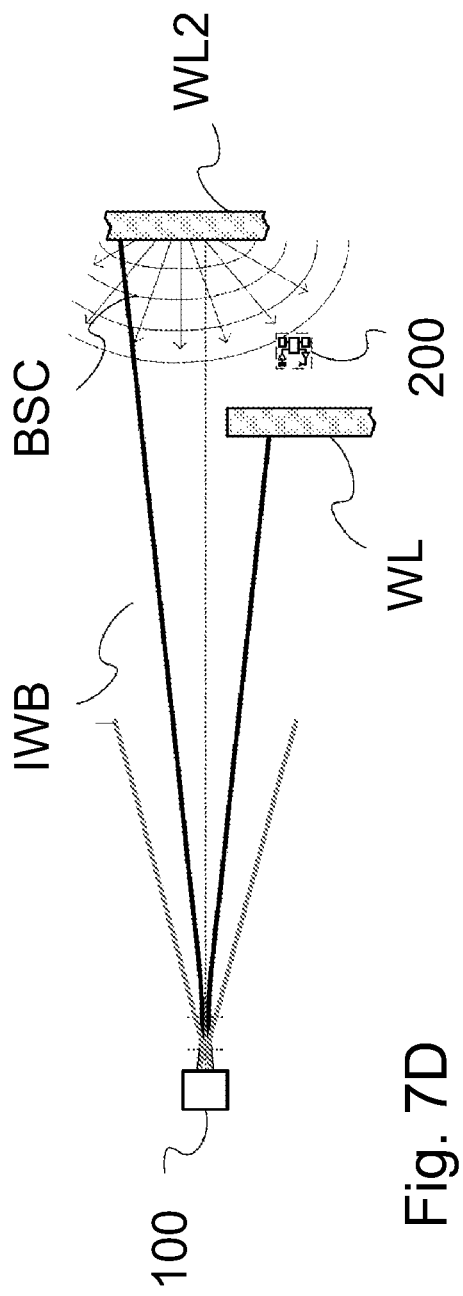
FIGS. 7D and 7E schematically illustrate two examples of near line-of-sight interrogation performed by an IFF system configured according to the present invention.
Figure 7E:
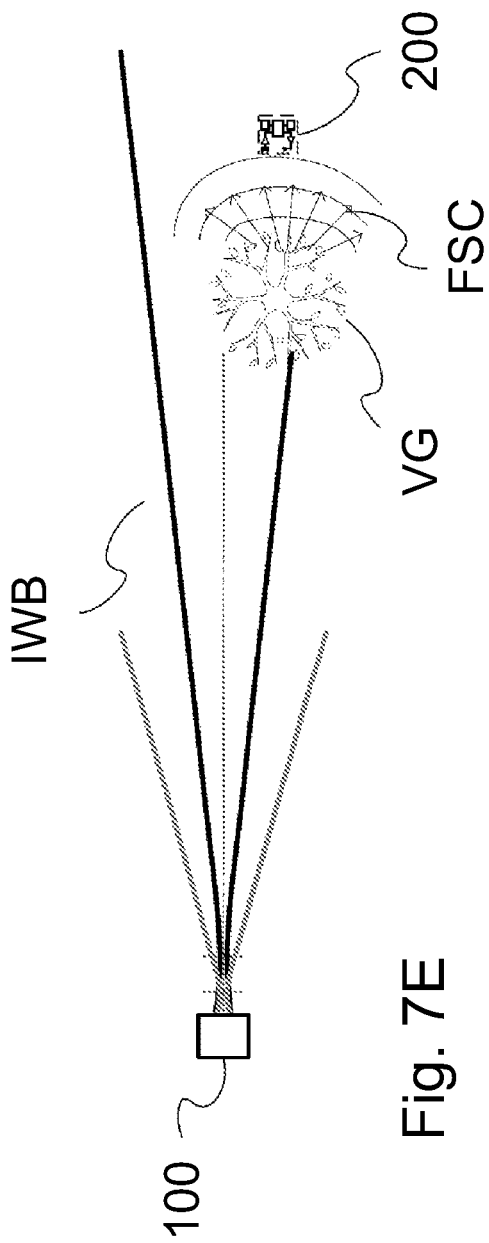

A further advantage of the IFF system 1, is its capability to interrogate in near line-of-sight scenarios. FIGS. 7D and 7E show schematically two examples of such situations. FIG. 7D depicts an IFF responder 200 located behind an opaque object, for example a wall WL, thus not being in direct line of sight of the interrogation wave-beam IWB. Nevertheless, provided there are nearby objects, such as a second wall WL2, that can back-reflect or back-scatter BSC the interrogation beam, the responder may receive a sufficiently strong signal to detect the interrogation. A similar situation occurs with responders that are located behind vegetation (FIG. 7E) or other partially blocking elements such as netting. Even when the vegetation VG is sufficiently dense to block direct illumination, portions FSC of the interrogation wave-beam IWB that is forward scattered (e.g. by small leaves or branches) retain sufficient intensity and are therefore detectable by the responder 200. This effect of scattering typically does not compromise the localization achieved by the constant lateral extent interrogating wave-beam IWB. This is because the reflected or scattered potions of an incident wave-beam (e.g. from an opaque or semi-opaque objects) is generally attenuated over relatively short distances. Accordingly the scattered/reflected portions are only detectable by responders confined at regions of dimensions approximately matching the lateral extent of the interrogation spot. For example, sufficient intensity from scattered interrogation light would generally not be obtained for distances greater than a few meters from the scatterer, and therefore will generally not exceed the lateral extent of a typical interrogation wave beam having a lateral diameter of about 10 to 30 m.

The advantages of the ability of the system of the present invention to encode the intensity data in the ACK signal and/or to perform wave-beam scanning to search/locate the responders may be better understood when considered in relation to possible variations which the practical detection threshold of the responder as compared to the nominal detection threshold. Turning back to FIG. 3E, an example of a nominal detection threshold TRSH of the responder 200 is illustrated as a solid line contour defining/enclosing an interrogation region of the beams IWB1-IWB3 at which the responder 200 should be able to detect the interrogation wave-beam, and respond accordingly. However, variations from this nominal detection threshold, may occur due to several practical factors, including deviations of the interrogation beam width from the exact lateral extent W as well as due to some factors governing the detection process. The detection threshold tolerances TR1 and TR2 (variations of about ±30% from the nominal threshold) are illustrated in the figure by dashed lines.

For example, in some embodiments, the detectors/detection modules of the responder system 200 are designed to collect light/an interrogation wave-beam from a relatively wide angular cone. Typical full-angle (i.e. apex angle) values may range from 60°, 90° and/or 108° degrees. In such situations, the interrogation wave-beam may be incident on the collection aperture/detection module at a large angle off the normal, thus reducing the effective collection area of the detection module by the cosine of the off-normal angle. For apex angles of coverage of 60°, 90° or 108°, the detection threshold increases respectively by a factor of $1/\cos(60°/2)=1/0.87=1.15$, $1/\cos(90°/2)=1/0.71=1.41$ or $1/\cos(108°/2)=1/0.59=1.7$. That is, more intensity is needed to reach the detection threshold. Consequently, for a detector having a full angle of collection (apex angle) of 108°, the detection sensitivity is reduced by about 30% for a beam incidence at 54° to the normal as compared to normal incidence, plus a little allowance for other tolerance issues. Also some additional variations in the detector's sensitivity may occur due to various causes such as manufacturing tolerances, time-degradations and/or environmental causes, losses due to Fresnel reflections, variations in the transmissivity of the detectors' collection aperture/window (e.g. due to dirt), attenuation of the interrogating wave-beam through the atmosphere, and variations in the electronic gain of the amplifiers (e.g. performance deterioration due to marginal battery power).

Such variations in the detection sensitivity/threshold may introduce uncertainty as to the robustness of an interrogation which occurs close to the interrogation region's edge. The ability of the system to indicate (e.g. in the intensity data) that the interrogation beam was detected with a relatively low intensity (e.g. closer to the predetermined minimal threshold TR1), provides important feedback as to the quality of the interrogation. Such an indication may be used by the target detection module 130, to repeat the interrogation with varied interrogation parameters, and/or to indicate the same to the system's operator. Also, in cases where there is no acknowledgement signal received at all (illumination intensity is just below the detectable value due), the use of multiple interrogations with interrogation wave-beams of different properties (e.g. interrogation wave-beam scanning) increases the chances of detection and provides a robust implementation of the IFF system.

Figure 8:
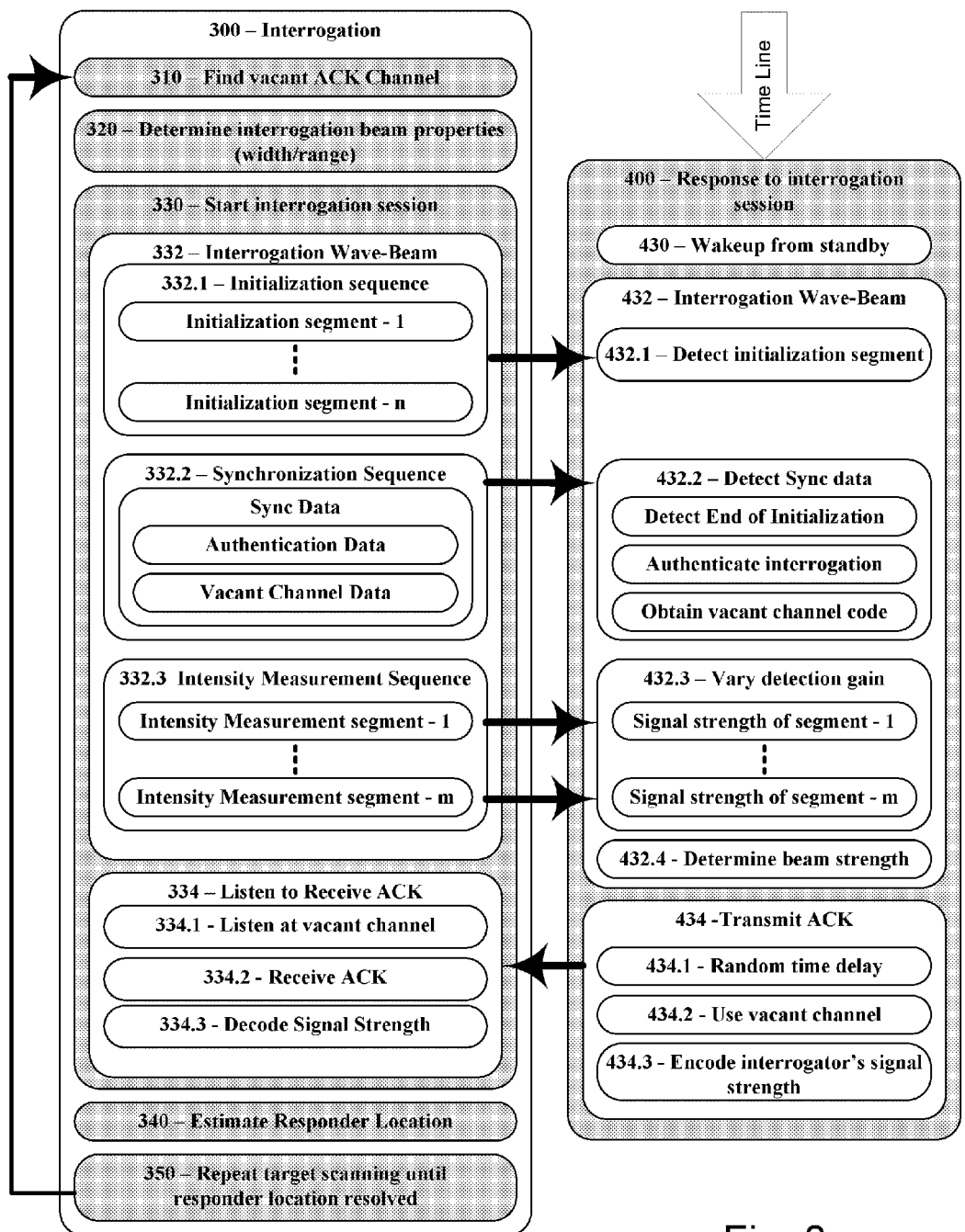
FIG. 8 is a flow chart illustrating schematically an interrogation and response method according to some embodiments of the present invention.

Reference is now made to FIG. 8 illustrating schematically an interrogation method used by the systems 100 and 200 according to some embodiments of the present invention. Specifically, method 300 illustrates the interrogation process performed by the interrogation system 100 and method 400 illustrates the complementary response process performed by responder system 200. It should be noted that some of the operations/steps of the interrogation and response methods, 300 and 400, are optional and may be superfluous in various embodiments of the present invention and/or performed in a different order. Also, in the interest of brevity, the processes of transmitting the authentication codes of each of the interrogator and responder systems are omitted from the description of these methods.

In optional operation 310, interrogation system 100 operates to determine an interference-free acknowledgment (ACK) channel/communication-parameters which are associated with reduced interference from other communication devices in the vicinity of system 100. This operation may be used for example when the acknowledgment signal receiver 138 is tunable for detecting ACK signals over several channels/frequency-bands and particularly when the ACK signal is an RF acknowledgement signal. In 310 the receiver 138, which, for example, includes an antenna and RF reception circuitry, receives signals on a certain channel to which it may be tuned and the communication controller 136 monitors (e.g. that channel) and analyses the signals received by receiver 138 (e.g. monitors the RF environment at which system 100 is deployed) and determines/identifies whether that channel is suitable for receiving a communication signal or it suffers from strong interference. Should interference be detected, the communication controller may automatically select a different channel with lower interference (i.e.e. a vacant channel). Alternatively or additionally, the communication controller 136 operates the receiver 138 to scan the one or more channels to which it is tunable and monitor any signals received at each of the channels for a certain time frame. The communication controller 136 then analyses the signals received in each channel and determines a vacant channel and/or the most vacant channel, which is preferred for use in receiving the ACK signal with low/reduced interference as compared to other channels. The data indicative of the selected vacant/relatively-vacant (e.g. channel number/RF-band) is transmitted to the responder 200 with the interrogation wave-beam as will be further described below in relation to operation 332.2. This provision ensures that the system operates in channels (RF channels) that are monitored to be free/low in interference, thus improving the robustness of the operation of systems 100 and 200.

In optional operation 320, properties of the interrogation wave-beam are determined such that the interrogation wave-beam IWB covers a desired lateral beam extent/width and a desired range. In some embodiments, system 100 is associated with a user interface through which an operator may define the desired interrogation region to be covered/interrogated by one or more interrogation wave-beams (e.g. by specifying the region's range, width and possibly direction of a certain interrogation wave-beam). Alternatively or additionally, based on the region/range/width to be covered/interrogated by system 100, the interrogation wave-beam scanning module 132 (in case interrogation wave-beam scanning is performed), and/or the interrogation control module 134, operate to determine the desired properties of the interrogation wave-beam to be generated in subsequent stages.

In operation 330 an interrogation session is performed to interrogate a certain target region and detect/determine if a responder is located in the interrogated region. Operation 300 is performed by the interrogation system 100 based on a certain interrogation protocol/method, which is implemented by both the interrogation system 100 and the responder 200 (such that they operate in complementary manners). To this end, the complementary operation/method 400 is performed by the responder 200 in response to the operation 300 performed by the interrogation system 100.

In the following, operation 330 is divided into two stages, 332 and 334, which are typically performed sequentially in time for interrogating a target region in which a responder 200 may or may not be located. In stage 332 the target region is interrogated, and in stage 334 acknowledgment is received from the responder 200 in case it is located at the interrogated target region. Accordingly, operation 400 is also divided into two complementary stages 432 and 434, at which responder 200 respectively attempts to detect and process an interrogation wave-beam from system 100, and, in case such an interrogation beam is detected, respond with an appropriate ACK signal. Some sub-steps/operations of operations 330 and 400 are optional and performed according to the interrogation protocol only in some embodiments of the present invention.

Preferably, according to some embodiments, in order to prolong the lifetime/operation-times of a battery operated the responder 200, the interrogation-beam receiving module 210, and/or the detection modules/circuits thereof, may be operated mostly in a standby mode, where most of the electronics are shut down. In some embodiments, the responder operates in standby cycles of about 100 ms, where at the end of each cycle, it automatically turns on to an active state, for example for 5 ms, and checks if interrogation wave-beam/pulses are detected. This is facilitated, according to some embodiments of the invention, by utilizing the initialization sequence 332.1 and initialization detection procedure 432.1 described in the following.

To this end, in optional operation 332.1 interrogator system 100 initializes an interrogation session, by encoding and sending an initialization sequence (e.g. a series of "wake up" pulses) in the interrogation wave-beam IWB (e.g. prior to sending the actual interrogation data/signals). Specifically the interrogation control module 134 encodes in the interrogating wave-beam IWB an initialization sequence extending over a time duration that is longer than the predetermined standby time duration of the responder system 200 to be interrogated (e.g. longer than 95 ms). Provided the wake up sequence is longer than the standby duration, the responder system 200 is always able to identify the initialization sequence on recovering to an active mode from a standby mode irrespective of these durations being a-synchronic.

Typically, in the initialization sequence, a series of initialization segments are sequentially encoded in the interrogation beam IWB. The duration of the initialization sequence is typically longer than the predetermined standby time by a duration of at least one of the initialization segments to thereby allow the responder system to identify at least one of the initialization segments upon recovering from the standby mode.

For example, the initialization sequence may include a set of pulses of the interrogating beam. The set of pulses may have a predetermined repetition rate and an initialization segment may be presented in such a set, as a sub-sequence formed by a predetermined number of repeated pulses with this repetition rate. For example, the initialization segment may include a predetermined number of two or more pulses of the interrogating beam and a predetermined time interval between them.

In operation 430, responder system 200 wakes-up from a standby mode of duration not exceeding the initialization sequence and enters an active mode of operation. Accordingly, in case the responder system 200 is interrogated when entering the active mode in operation 432, it detects and processes the coding of the interrogation wave-beam captured thereby and identifies the initialization sequence in operation 432.1. Specifically in operation 432.1, the controller 230 operates to process the received interrogation wave-beam signals to identify at least one initialization segment being part of the initialization sequence encoded therein. At the initiation of an interrogation, the interrogator 100 may for example fire a continuous set of pulses for a duration of a little over 95 ms to ensure that the responder's receiver/detection-modules detect the initiation stream at any timing that it occurs to turn on to active mode after a standby time shorter than 95 ms.

The initiation stream/sequence encoded in the interrogation wave-beam is typically followed by a synchronizing set/sequence. The synchronizing set may, for example, contain an end of initialization data field with a preset value (e.g. a sequence of typically two bytes of "0"s—i.e. no pulse, and "1"s—i.e. a pulse is present) that indicates the end of the initiation stream. Following the synchronization set, synchronous data is encoded onto the interrogation wave-beam, communicating various coded information, including, for example, a coded authenticating serial number of the interrogator 100 and other data. Thus in operation 332.2, the interrogation control module 134 encodes a synchronization data set into the interrogating wave-beam IWB based on the predetermined interrogation protocol to thereby enable synchronization of the interrogation system 100 with a target responder system 200 to be interrogated ("illuminated") thereby. In complementary operation 432.2, the controller 230 of responder system 200 operates for processing interrogation wave-beam signals received by the interrogation beam receiving module 210 for identifying the interrogation wave-beam IWB and determining interrogation data encoded therein based on the predetermined interrogation protocol. Typically the synchronization data set is encoded in a certain synchronization timeframe of the interrogation beam IWB following the initialization sequence.

According to some embodiments of the present invention the encoded synchronization data includes data fields indicative of one or more of the following:
  i. end-of-initialization data field marking the end of an initialization sequence;
  ii. authentication data field indicative of at least one of a type and identity of the interrogating system (e.g. serial number thereof); and
  iii. at least one communication data field indicative of a communication parameter to be used by said target responder system for communication of an acknowledgment response to the interrogation (e.g. acknowledgment communication channel and/or the number thereof).

Accordingly in operation 432.2, the controller 230 detects the end-of-initialization data field and further parses/processes the synchronization data to authenticate the interrogation system 100 based on the authentication data field, and determines the channel at which an ACK response should be returned.

As noted above in relation to FIG. 3E, a relatively broad tolerance in the detection threshold TRSH of the responder 200 may result from various causes (e.g. due to orientation of the detection-modules which may not be aligned with the general propagation direction OX of the interrogating beam IWB) and may, in turn, present corresponding uncertainty in the value of the lateral extent W of the interrogation beam even if the latter is accurate and nearly fixed along the range R. To compensate for the threshold uncertainty and other uncertainties, the intensity of the interrogation beam detected by the responder 200 is transmitted back to the interrogation module 100. This assists for the evaluation of the quality of the interrogation: the stronger the interrogation signal received by the responder above the detection threshold, the higher the certainty that the responder is located within the interrogation wave-beam, not near its edges. Thus, the ability to measure the intensity of the interrogation wave-beam received by the responder 200 and to communicate this intensity to the interrogation system 100 greatly improves the ability of the interrogation system 100 to determine whether the responder 200 is located within the interrogation beam and provides the interrogation wave-beam scanning module 132 with information on the quality of the interrogation. Based on this information, the scanning module 132 can determine whether it should repeat the interrogation (e.g. with different ranges and/or lateral extent).

To this end, operations to 332.3 and 432.3 may be performed in order to enable the responder 200 to efficiently determine the intensity of the interrogation wave-beam received thereby. In operation 332.3 the interrogation control module 134 of system 100 encodes an intensity measurement sequence onto the interrogating wave-beam IWB. The sequence is based on a predetermined interrogation protocol and may, for example, follow the initialization sequence and/or the synchronization sequence/timeframe that are encoded in the interrogating wave-beam IWB.

The intensity measurement sequence may, for example, include a series of intensity measurement segments (e.g. series of pulses of the interrogating wave-beam IWB). The responder 200 may be adapted for detecting the intensity measurement segments/pulses in the series while utilizing varied amplification gains. Specifically, as will be further described below with reference to FIG. 10, in 432.4 controller 230 may operate the interrogation beam receiving module 210 and/or one or more of the detection modules 212.1 to 212.k and/or their associated circuits for amplifying different intensity measurement segments/pulses with different amplification gains. As further detailed below with reference to FIG. 8, this provides for utilizing detection of the intensity measurement sequence to estimate the intensity of the interrogating wave-beam IWB.

Figure 9A:
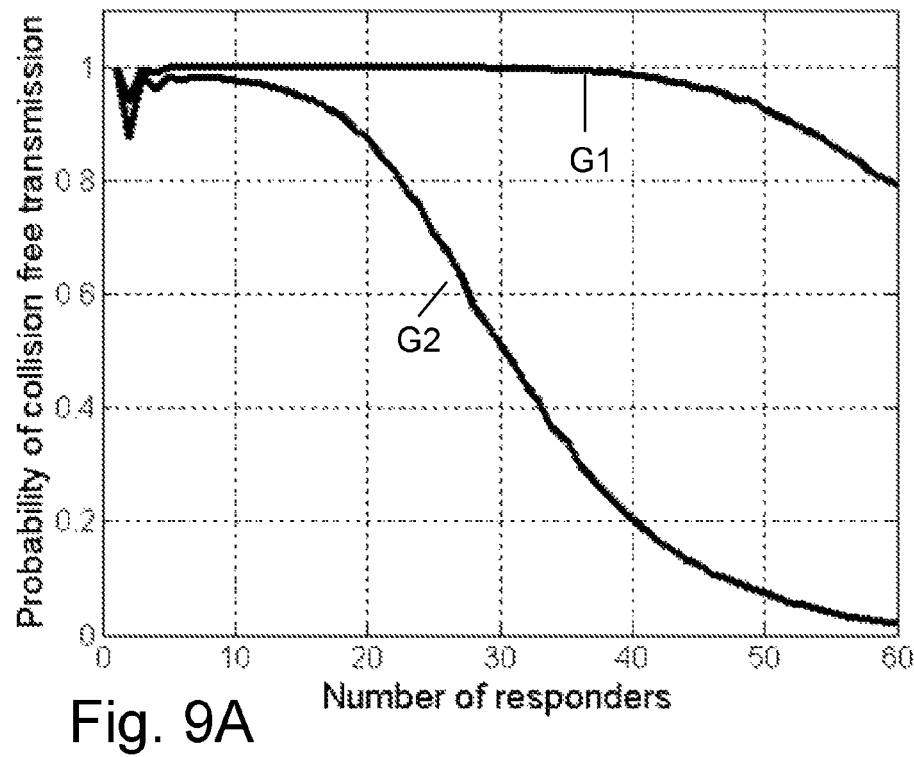
FIGS. 9A and 9B show graphically a probability of no-collision of the transmission from a number of co-interrogated responders.
Figure 9B:
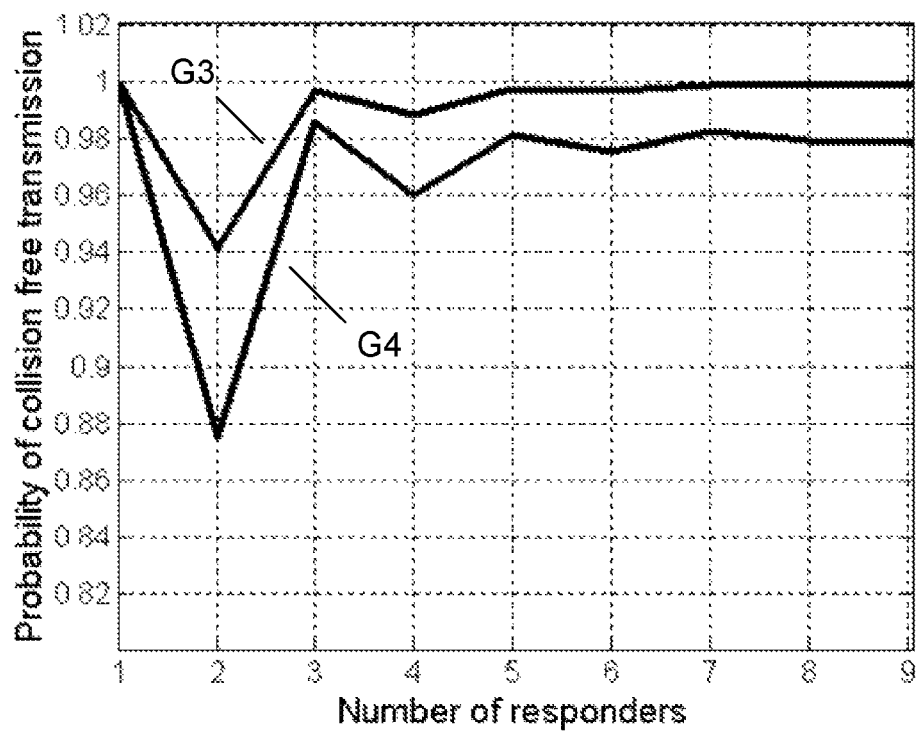

In operation 434, the responder 200 operates to transmit an acknowledgment signal in response to the detection of the interrogation wave-beam IWB. Optionally, according to some embodiments of the present invention, in operation 434.1 the controller 230 is adapted for selecting a random delay for communicating/transmitting the acknowledgment response signal ACK. As further discussed in the following, such random delay significantly reduces the probability of all acknowledgment response signals ACK of multiple, co-interrogated responder systems responding to the same interrogation simultaneously to block each other completely, preventing any acknowledgement response from reaching the interrogator 100. It is sufficient that one of the co-interrogated responders transmits an acknowledgement signal when all the other responders are not in active transmission to ensure that the acknowledgment signal will be transmitted back to the interrogating system without interference from co-interrogated responders. To accommodate the responder's 200 randomly delayed acknowledgment signal ACK transmission, the target detection module 130 of interrogation system 100 is configured and operable for processing ACK signals received by receiver 138 over a time duration that spans the largest possible responder acknowledgement transmission time delay. Specifically, the random acknowledgement transmission delay may be implemented by random selection of a delay value from a bank of several possible transmission time-slots. FIGS. 9A and 9B show the probability of no-collision of the transmission from a number of co-interrogated responders all responding to the same interrogation wave-beam IWB. FIG. 9A illustrates the probability of collision-free transmission by 1 to 60 co-interrogated responder systems responding to the same interrogation wave-beam IWB and FIG. 9B illustrates the same, with expanded scales for 1 to 9 responder systems. The lower graphs in these figures, G2 and G4, show the no-collision probability of transmission wherein the random time delay is selected from a bank of eight different time slots. The upper graphs, G1 and G3, show a case where the random time delay is selected from a bank of 16 time slots. As illustrated by graph G2 in FIG. 9A, when the transmission time/delay is selected from eight time slots, the probability of successful transmission (or probability of no-collision in the transmission) exceeds 85% for up to 20 co-interrogated responders that are interrogated and respond simultaneously. Graph G1 shows that for a bank of 16 time slots, the probability of no-collision is maintained higher than 85% for up to some 55 co-interrogated responders. Interestingly, the probability of successful transmission first drops for the case of two responders, as is seen more clearly with the expanded scales of FIG. 9B. As the number of responders increases, the probability of no-collision increases. This peculiarity is explained as follows: for eight time slots, the probability of two responders selecting the same time slot is 1 in 8, or $1/8=12.5\%$. Indeed the graphs for 2 responders show a probability for no-collision at $100-12.5\%=87.5\%$. For three responders the probability of all three selecting the same time slot is much lower, in other words there is a higher probability that at least one time slot is different so the probability for at least one responder successfully transmitting an ACK signal increases. Similarly for 16 time slots, the probability for two responders selecting the same time slot is 1 in 16 or $1/16=6.25\%$ and the value in the graphs is $100-6.25\%=93.75\%$. For additional responders the no-collision probability increases. Finally, with a probability of no-collision of about 85% in a single interrogation, the system is operated three times to obtain an overall probability of successful transmission of $1-0.15^3=99.7\%$, which is a reasonable probability for successful operation of the system in practice.

In some embodiments the IFF system 1 is configured and operable for determining the distance to the responder by determining a collective time-of-flight of the interrogation wave-beam IWB and the acknowledgment signal ACK, and thereby further improving the reliability of the interrogation process. Such measurement of the collective time-of-flight allows the interrogator to estimate the net time-of-flight for the interrogation signal one way and the acknowledgement signal on return, from which the interrogator can obtain an approximate value for the distance to the interrogated responder. For example, should the net time-of-flight be accurate to within 1 μs, the distance measured would be accurate to within 150 m (half the distance traveled by light in 1 μs, in consideration of the round trip). Such distance resolution would greatly increase the reliability of the interrogation, completely alleviating the possibility for confusing a near-by bystander within the interrogation wave-beam with an actual distant interrogated target, as discussed above. To this end, the interrogation system 100 may be adapted to measure the time delay between the transmission of the interrogation wave-beam IWB and receipt of the acknowledgment signal ACK. Any internal delays in transmission of the interrogating wave-beam IWB in the interrogating system 100 may be carefully controlled/measured in the interrogation systems 100 to allow accurate determination of the collective time-of-flight of the interrogation and acknowledgment signals. Also internal delays in the responder system 200, from the detection of the interrogating wave-beam IWB to the transmission of the acknowledgement signal ACK, are also carefully controlled/measured by the responder and provided/transmitted to the interrogation system (e.g. transmitted/encoded with the acknowledgment signal ACK) to thereby enable the interrogation system 100 to determine the collective time of flight. In cases where the responder 200 utilizes a random time delay for transmitting the acknowledgment signal ACK, the value of the time delay actually deployed for transmission of the ACK signal should also be encoded in the acknowledgment ACK to enable the interrogation system 100 to determine the net time-of-flight of the interrogation/acknowledgement signals round trip. Accordingly the interrogation system may be adapted to determine the collective time-of-flight of the interrogation and acknowledgment signals by measuring the time delay between the transmission of the interrogation wave-beam and receipt of the acknowledgment signal and subtracting therefrom any internal delays associated with the interrogation system and/or responder system and optionally also subtracting the random time delay by which the responder may have delayed the acknowledgment signal. To this end, the internal delays may be associated with predetermined values (e.g. stored in memory), and/or may be measured by the interrogation and/or responder systems.

In optional operation 434.2, controller 230 operates the transmission module 220 to transmit the ACK signal(s) over one or more low interference communication channels. This operation is performed in cases where the synchronization data set obtained in operation 432.2 includes data indicative of one or more low interference communication channels for transmitting the ACK.

In addition, optionally in operation 434.3, in cases where the intensity of the interrogation wave-beam is detected/estimated in 432.3, the controller 230 operates the transmission module 220 for encoding and communicating the intensity data indicative of the interrogation intensity as part of the transmission of the acknowledgment signal. In turn the target detection module 130 of the interrogation system 100 is configured and operable for receiving the intensity data from the responder 200 and estimating responder's relative location within the interrogating wave-beam IWB, and the quality of the interrogation.

A straightforward approach for measuring the intensity of an interrogation wave-beam IWB received in the responder 200 might utilize an analog-to-digital converter (ADC) for coding the intensity of the received interrogation wave-beam IWB in digital bits. This approach, however, requires the use of a relatively high frequency ADC, specifically in cases where the interrogation wave-beam IWB is generated by the interrogation system 100 in short pulses. For example, according to some embodiments of the present invention, the interrogation system 100 utilizes a laser-based wave-beam generator 110 for generating pulses of the interrogation wave-beam IWB with pulse widths in the order of 100 ns or less. Detecting such pulses at the responder 200 would require an analog detection bandwidth of about 10 MHz. Moreover, utilizing the conventional approach for detecting the intensity of pulses at frequencies of about 10 MHz with acceptable distortion, would require an ADC capable of sampling at 40-50 Mega-Samples-Per-Second (MSPS). ADCs with such high sampling rates, however, entail high power consumption and are more costly, thus compromising both the battery operational life-time of the responder 200 as well as its overall cost.

Consequently, according to some embodiments of the present invention, a time-sequential intensity measurement technique replaces a fast ADC for monitoring the interrogation intensity in the responder 200. In this technique, the series of pulses (referred to herein as intensity measurement sequence) of the interrogation wave-beam sent by system 100 in operation 332.3, are detected sequentially with different gain settings, which are then analyzed by the responder 200, to determine the gain required for marginal detection of the interrogation illumination as illustrated in operations 432.3 and 432.4 above, as further detailed below.

Figure 10:
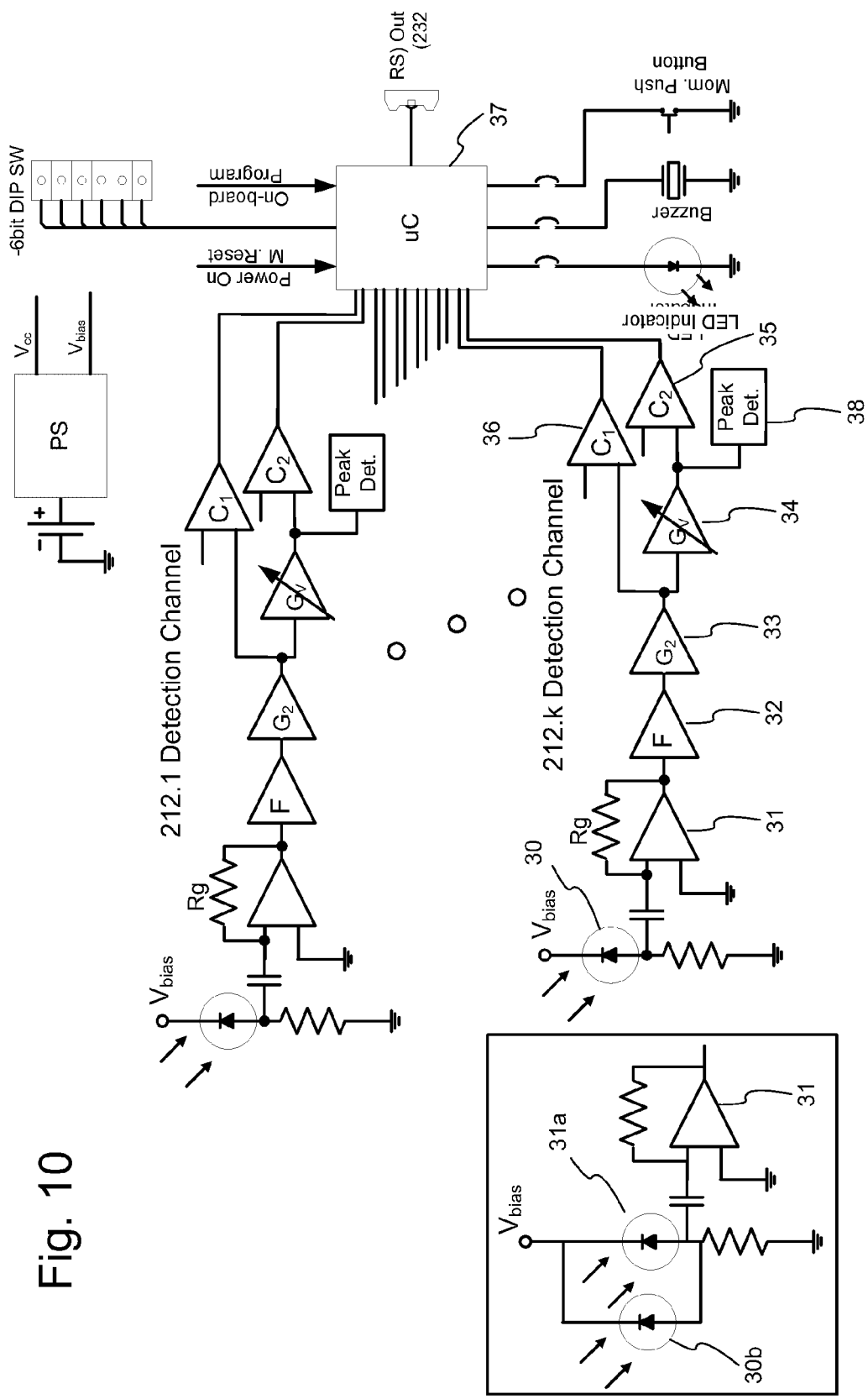
FIG. 10 is a schematic illustration of some circuit components of a responder system according to some embodiments of the present invention.

Reference is made now to FIG. 10 schematically illustrating circuit components relating to the interrogation beam receiving module 210 and the controller 230 of a responder system 200 according to some embodiments of the present invention. Here, several detection modules 212.1 through 212.k (also referred to herein as detection-channels/channels) are specifically illustrated. In practice, the number of channels may depend on the desired total collection angle/solid angle from which the responder 200 should detect the interrogation wave-beam IWB and accordingly on the number of detectors/detection-modules needed. The selected number of channels/detectors, is a tradeoff between the cost and the uncertainty in the detection threshold within the lateral extent of the interrogation wave-beam as described above. According to some embodiments of the present invention, any number of detector channels between 4, 5, or 6 are used. Other configurations are also possible with less or more channels, but implementing less than 3 channels may be challenging in terms of the dimensions of the angular light collection cones.

FIG. 10 illustrates an embodiment of a detection channel, including a photo-detector 30 which detects the interrogation wave-beam IWB (e.g. light) and converts it to an electronic current signal. This signal is first amplified in a trans-impedance amplifier 31, where it is also converted into a sizable voltage signal, filtered in filter 32, amplified by amplifier 33 and then by a voltage controlled amplifier (VCA) 34.

Here, controller 230 is implemented, at least partially, by a suitably programmed microcontroller 37. The gain of the VCA 34 is controlled by the microcontroller 37 as described further below and the output of the VCA 34 is fed to a comparator 35. The output of the comparator 35 is logic TRUE (positive voltage), if its input voltage level exceeds a reference threshold, and logic FALSE (zero volts), if it does not exceed the reference threshold. Furthermore, comparator 35 is operable to expand its output in time, so that, a short pulse (e.g. of pulse' widths of 100 nano-seconds (ns)) at its input, is expanded in time to provide an output pulse width of several tens of microseconds at the output of the comparator 35. This expanded pulse width is slow enough for direct detection by a low-power (and typically also low cost) microcontroller with a relatively low clock frequency, thus saving complexity of the electronic circuit and allowing the use of lower frequency components which also offer lower power consumption.

The gain of the VCA 34 is adjusted by the microcontroller 37 which samples the integrated voltage level on the channel with the aid of an integrating peak-detector 38 with a bandwidth much lower than that required to detect the optical interrogation wave-beam pulses (for example, 1 KHz). In this manner the integrating peak detector monitors the root-mean-square (RMS) noise level on the channel. The VCA has two purposes. Under normal operation conditions, the VCA 34 gain is adjusted (e.g. by micro-controller 37) so as to place the maximal gain possible subject to the noise level remaining well below the detection threshold level of comparator 35, for example below half the threshold of the comparator 35. In this manner, the channel's gain may always be maintained at the highest level possible before noise on the channel begins to affect the comparator's threshold level. This mechanism allows for optimal detection of the interrogation wave-beam IWB under varied operational circumstances. For example, when the detector 30 is illuminated by direct sunlight, the noise level in the channel increases. Conversely, in the shade, the noise level of a channel is reduced. The control over the VCA's gain ensures that each channel is amplified to the extent allowed without bringing background noise to exceed the comparator's threshold level.

Alternatively or additionally, in some implementations, two photo-detectors 30a and 30b (shown in the inset in FIG. 10) can be connected in parallel to a single electronic detection channel. This option might reduce the cost and power consumption of the device, yet introduces a larger noise level in the combined channel due to the increased overall detector capacitance.

A further optional feature is an additional comparator, 36, which is adjusted to a fixed, relatively high threshold level ensuring that it is always higher than the worst case noise level. This second comparator provides an indication for the presence of a strong signal from the interrogation wave-beam IWB, thus providing a partial solution to determination of the strength (intensity/amplitude) of the interrogation wave-beam as explained above.

According to some embodiments, measurement of the intensity of the detected interrogation wave-beam IWB is achieved by utilizing the ability of the controller 130 (e.g. 37 in the present figure) to control the amplification gain of the detected signal by means of the VCA 34. As noted above, according to some embodiments of the present invention the interrogation system 100 operates to transmit an intensity measurement sequence including a series of intensity measurement segments (e.g. pulses) of the interrogation wave-beam IWB. For example, following the synchronization set described above, the interrogator 100 emits a series of pulses for interrogation wave-beam intensity measurement. In operation 432.3, the microcontroller 37 varies the gain of the detection channels which receive the interrogation wave-beam/signal IWB (e.g. by sequentially and gradually reducing the gain of VCA 34). Then, by recording the number of pulses detected by the comparator 35 out of the full set of the intensity measurement segments (pulses), the microcontroller 37 determines the intensity of the interrogation signal IWB, in operation 432.4.

For example, in some cases the interrogation system 100 is configured to emit an intensity measurement sequence of 32 pulses/segments. The pulse repetition rate of the interrogator 100 may, for example, be in the order of 10 KHz, so 32 pulses span 3.2 ms, a time duration that may typically be insignificant with respect to a desired overall interrogation time duration of the system. The responder 200 receives/detects the intensity measurement sequence with variable gain. For example the responder 200 initially detects the few (e.g. four) pulses with maximum gain (a gain setting that is the absolute maximum gain of the VCA even if there is noise present) and the comparator 35 transfers the signals exceeding the threshold to the microcontroller, where the form of the signal is determined: either noise, or pulses. After the first four pulses, controller 37 reduces the gain of the VCA 34 to a lower level and the next four pulses are detected with this gain, and the comparator 35 transfers the signals that exceed the threshold to the microcontroller 37. This process may be repeated another six times such that at the end of the intensity measurement sequence, the microcontroller 37 has eight gain levels, with four measurements in each allowing it to determine in which of the gain levels a signal is detected. In this example, if eight intensity measurement segments (e.g. of four pulses each) are included in the intensity measurement sequence, the intensity of the interrogation wave-beam IWB can be determined/resolved to a resolution of ⅛ of the expected intensity range of the interrogating wave-beam.

An alternative procedure for measuring the intensity/amplitude of the interrogation wave-beam/signal with improved resolution may be achieved by varying the gain during the received intensity measurement sequence utilizing the principles of a binary search algorithm. For example, consider again an intensity measurement sequence comprised of 32 pulses equally segmented into eight intensity measurement segments of four pulses each. The gain of the VCA 34 is first set by the controller 37 to the middle of the range of intensities/amplitudes at which the interrogation wave-beam IWB is expected to be detected. Then, in case the signal exceeds the threshold of the comparator 35, the next gain level is adjusted to 75% of the intensity-range (half of the upper half of the range in which the signal is located) and alternatively, in case it does not exceed the threshold the gain is set to 25% of the intensity-range (half of the lower half of the range in which the signal is located). This procedure is repeated for each such intensity-measurement segment, setting the gain of the next stage at half the portion of the range in which the current stage is made. In this manner simple, low cost, low power hardware provides for a complete 8 bit measurement of the intensity/amplitude of the interrogation wave-beam while alleviating the need for using high speed, high power consumption, and higher cost ADCs.

A major design consideration of the interrogation beam receiving module 210 relates to the optimal number of detection-modules/detection surfaces and the total area detection surface needed to cover a half-space. This relates in many cases to the relatively high cost of the detectors used for detecting interrogation wave-beams (e.g. near infra-red (NIR) InGaAs photodiodes). To this end, according to the present invention, various techniques are provided enabling to reduce the number of detectors and/or the total detection area needed for detecting an interrogation wave-beam from anywhere within a predetermined solid angle. In this connection it is first noted that improved detection results and lower detection threshold, specifically for detection beams incidence at oblique angles, may be obtained by dividing a given total detection area/surface into a large number of detectors. This is also shown graphically and mathematically in relation to FIG. 12 in the co-pending IL patent application No. 225251, which is assigned to the assignee of the present application and incorporated herein by reference. As also shown there, there is a growing benefit to using concentrators C (light collecting/magnification optics) to enhance the sensitivity of each detection module. Consequently, according to the present invention, it may be advantageous to configure the responder system 200 with three and preferably more detection modules, and especially when considering illumination at the angles.

Additionally, according to the present invention, for certain detector types such as InGaAs photodiodes, the required number of detectors may in some cases be reduced (e.g. by up to half) by utilizing both the front and back sides of the detector for detecting the interrogation wave-beam. In other words, utilizing this technique, the total area of usable detection surface for a given set of detectors may increase (e.g. be doubled). The detection modules may be configured in this without utilizing beam concentrators or with concentrators as for example described with more detail with relation to FIG. 10B below.

Figure 11A:
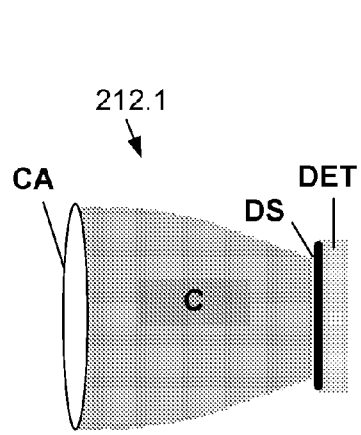
FIG. 11A is an example of an interrogation wave-beam detection module used by the responder system according to some embodiments of the present invention.

Reference is made to FIG. 11A illustrating schematically a detection module included in the interrogation beam receiving module 210 of system 200 according to some embodiments of the present invention. As noted above, this typically includes at least three detection modules 212.1 to 212.*k*. FIG. 11A illustrates schematically a detection module 212.1 according to an embodiment of the present invention. The detection module 212.1 includes a detection surface DS (e.g. being a surface of a detector element DET). The detection surface DS is coupled to a collection aperture CA (e.g. being an optical and/or acoustical window) directed for collecting the interrogation wave-beam IWB propagating thereto from within a certain solid angle and coupling/directing the collected interrogation wave-beam IWB to the detector surface DS.

Typically, detection module 212.1 includes a detector DET and a collector/concentrator module C having an output port coupled to the detection surface DS of the detector and a larger input port defining the collection aperture CA. The detector DET may, for example, be an optical detector (e.g. in cases where the interrogation beam is optical such as infra-red light), an acoustical transducer (e.g. in cases where the interrogation beam IWB is acoustical) and/or an antenna module and/or antenna array (e.g. in cases where the interrogation beam IWB is EM radiation). The concentrator module C, may be formed utilizing any suitable wave-beam concentration techniques such as utilizing optical/acoustical concentrators (e.g. compound parabolic concentrators for collecting optical and/or acoustical beams) and/or reflector elements or concentrators for collecting RF radiation.

In the specific embodiment further described herein with reference to FIGS. 11A to 12D, the interrogation wave-beam is optical and accordingly detector DET is an optical detector sensitive to light radiation in one or more wavelength bands. Specifically the interrogation wave-beam IWB may be in the infra-red wavelength regime and the detector being a light detector sensitive to that wavelength and formed utilizing InGaAs semiconductor technology. Alternatively the detector may be made of Silicon (Si) for use in the infra-red band of 800-1,000 nm. Accordingly, the concentrator C is optimally a non-imaging compound parabolic concentrator (CPC), which can be shown to perform close to the thermodynamic limit for concentration of light, coupled to the surface of the detector element DET.

Figure 11B:
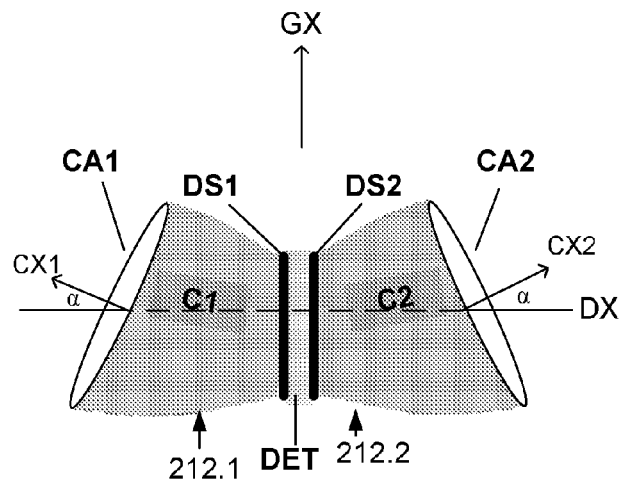
FIGS. 11B to 11D exemplify three configurations of pairs of interrogation wave-beam detection modules coupled to opposite faces of a single detector element.

In relation to the detector it should be noted that, according to some embodiments of the invention, a single detector DET is associated with multiple (two or more) detection modules/channels. This may provide for reduced power consumption and weight of the responder system 200. Specifically, FIG. 11B illustrates two detection modules, 212.1 and 212.2, which are associated with, or include, a single common detector DET. The detection modules, 212.1 and 212.2 include two respective concentrators C1 and C2 coupled to opposite faces/surfaces, DS1 and DS2, of the detector element DET and respectively defining collection apertures CA1 and CA2. This configuration offers twice the solid angle coverage possible with a single detector element while utilizing a single electronic amplification channel.

In the specific configuration of FIG. 11B, the two collecting apertures CA1 and CA2 are suitably tilted with respect to the axes of their respective detection surfaces DS1 and DS2 in order to optimize the layout of the solid angles for collection of an incoming interrogation wave-beam by the collection apertures CA1 and CA2. In other words, concentrators C1 and C2 are configured such that their principal axes of light collection, CX1 and CX2, are tilted with respect to the axis DX orthogonal to the detection surfaces DS1 and DS2, each at a tilt angle $\alpha$. Indeed, in some cases, tilting the collecting optics with respect to its associated detection surface may reduce the light collection performance. Nevertheless, for limited tilt angles (e.g. of $\alpha<20°$), the light collection performance remains reasonable and the configuration of FIG. 11B allows a reduction in the number of detectors DET required in system 200. Indeed, for $\alpha=0$, this configuration is trivially optimal for light collection, but such a configuration may not be suitable for efficient coverage of a hemisphere of incident interrogation directions as may be required in some embodiments of the present invention. For larger values of $\alpha$, as described in the following with reference to FIG. 11C, total internal reflection (TIR) elements (TIRE) can be used to allow such tilt with reasonable performances.

The pair of detection modules illustrated in FIG. 11B offer a major improvement on the performance of a photodetector DET as they collect light from various directions to illuminate the photosensitive component of the detector from both of its sides. If, for example, a circular InGaAs detector element DET of about 1.1 mm in diameter is used, CPC's of lengths of under 5 mm can collect light from a cone of apex angle of some 70°, forming a very compact assembly. To improve the collection performance, antireflection coatings may be used. For example, in cases where the CPC is in the form of a hollow reflector, antireflection coating may be used on the interface between the CPC and the detector (e.g. air-InGaAs interface). Alternatively, in cases where the CPC is formed of a solid material, such as glass or plastic, antireflection coatings may be used on both the front face of the CPC (e.g. air-glass interface) as well as on the interface between the CPC and the detector (e.g. glass-InGaAs interface).

Figure 11C:
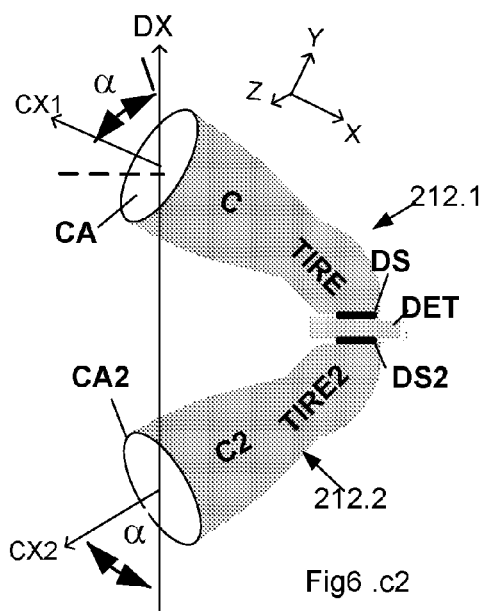

FIG. 11C is a schematic illustration showing another configuration, according to the present invention, of a pair of detection modules 212.1 and 212.2 coupled to opposite faces of a common detector DET. This configuration is similar to that illustrated in FIG. 11B, except that here the detection modules 212.1 and 212.2 are optically coupled to the detection surfaces DS1 and DS2 of detector DET by utilizing wave guiding modules TIRE which are configured as a structure that reflects waves, such as electromagnetic/optical wave-beams or acoustic wave-beams, from the output of concentrator C to the detection surface DS. In this connection it should be noted that the term wave guiding module is used herein to generally denote a structure that guides waves, such as electromagnetic waves or sound waves. In the specific example described in the following, the waveguiding module is configured as a channel with a reflective inner surface arranged such as to couple the collected wave-beam to the detector via total internal reflection (TIR) of the wave-beam from the inner-surfaces. Accordingly the waveguiding module is referred to in the following interchangeably as a TIR element and/or a reflective element.

In this particular example, the waveguiding module/TIR-element TIRE is configured as a reflective element with an ellipsoid body of revolution having reflective inner surface(s) whose geometry is selected to couple the collected wave-beam to the detector. To this end, the CPC C, the reflective element TIRE and the detection surface DS of detector DET are associated with one of the detection modules 212.1 and are collectively configured for collecting light arriving from within apex angle $2\theta$ about the principal axis CX1, concentrating that light and redirecting it to the photodetector surface DS with the TIRE. Also, the reflective inner surfaces of the channel like reflective element TIRE, are configured such that their cross-sections, taken along the general direction of propagation of the wave-beam through the element TIRE (i.e. taken in the X-Y plane), have an elliptical shape which is selected to allow for efficient folding of the light emanating from the standard CPC C onto the detector's surface DS. In this example, a second detection module 212.2 coupled to the second detector surface DS2 is configured similarly to the first module 212.1, and includes a second CPC C2 with a second elliptic folding element TIRE2 that couples CPC C2 to the surface on the opposite side of detector DET. It should be however understood that the two channels may be configured differently and, for example, detection module 212.2 may be configured in the manner illustrated in FIG. 11B.

The configuration of the detection modules illustrated in FIG. 11C may be associated with improved collection and concentration efficiencies and specifically in cases where large tilt angles $\alpha$ between the collection aperture CA and the detection surface DS are required (i.e. where large tilt angles $\alpha$ exist between the principal axis CX1 of collection of the concentrator C and the orthogonal DX to the detection surface DS). For example, a pair of detection modules configured similarly to that of FIG. 11C may be used in the six-detection module arrangements illustrated in FIGS. 12C and 12D in cases where large tilt angles are required.

Figure 11D:
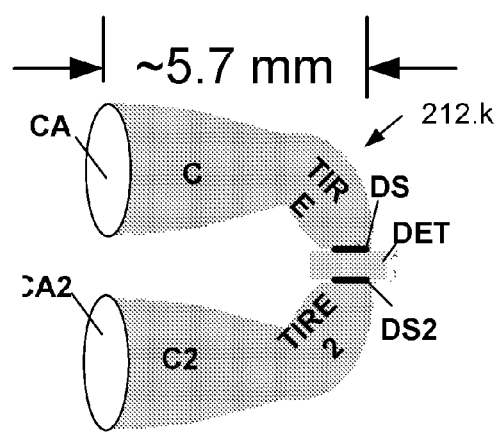

Another embodiment of the invention is illustrated in FIG. 11D showing a special case of the configuration of FIG. 11C where the apertures of the two detection modules are configured to collect light from the same direction, that is α=90°. This configuration simplifies the design of a multiple detection element arrangements for collecting light from a hemisphere. Specifically this configuration, designed for an InGaAs circular detector of diameter of 1.1 mm; shows a combined CPC and TIRE assembly extending some 5.7 mm can collect light from a cone of apex angle of some 70°, again offering a compact assembly. For example, an odd number of elements is possible, whereas with the configuration of FIG. 11B, which implements two detection directions, only an even number of detectors is practical.

Figure 13:
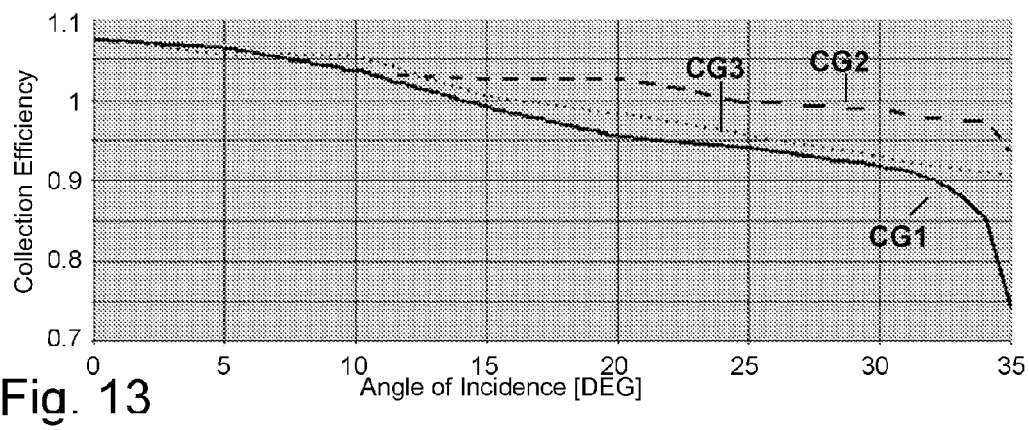
FIG. 13 shows graphs presenting the effectiveness of the detection as a function of the number of detection modules.

FIG. 13 is a ray-tracing simulation of the operation of the interrogation beam detection module 212.1 of FIG. 11C in which concentrator C was configured with apex angle of collection of up to incident angles of about θ=35° and the TIRE is configured to optically couple the concentrator C to the detection surface DS with tilt angles α~90° (namely FIG. 11D). The diameter of the detection areas DS and DS2 is 1.1 mm. The overall height of the assembly is approximately 5.7 mm. The graphs show the relative collection/concentration efficiency as a function of angle of incidence of light on the collection aperture CA where the concentrator C is configured with apex angle of about 2θ=70°. The reflective element TIRE directs the radiation/wave-beam collected at collection aperture CA to the detection surface DS. The Cartesian axes X, Y and Z are illustrated such that X and Y are in the plane of the figure, X is parallel to the principal axis of collection CX1 of aperture CA, and Z protrudes perpendicularly outwards from the plane of the figure. Different collection efficiencies are typically obtained for wave-beams incident on the aperture CA with similar values of the incident angles θ but from different directions (measured from the axis of collection CX1). Here the term collection efficiency indicates the ratio between the power of the wave beam arriving to the detection surface and the power of the wave beam that is incident on the collection aperture. Specifically, graphs CG1 and CG2 indicate the collection efficiencies of a wave-beam as a function of the incidence angle θ arriving respectively in the planes X-Y and X-Z (i.e. graph CG1 incidents the collection efficiencies for various incident angles θ lying in the plane of the drawing; and graph CG2 indicates the collection efficiencies for incident angles lying in a plane perpendicular to the plane of the drawing). Graph CG3 indicates the collection efficiencies obtained for incident angles lying at an intermediate plane collinear with the X axis and oriented at 45° from the Y and Z axes.

Evidently, the smaller the angular separation between the incident wave-beam and optical axis of the collecting apertures, the higher is the collection efficiency of the optics (concentrator C and reflective element TIRE). Furthermore, the collecting efficiency for rays in the X-Y plane is lower than that for rays in the X-Z plane. This is in accordance with the notion that a large tilt angle α introduces large coupling losses; rays in the X-Y plane are tilted by some 90°, where rays in the X-Z plan need only be guided with essentially no tilt. Nevertheless, the results show a reasonable performance of the configuration up to incident angles of around 35° offering an overall improvement in the performance of light collection by a factor of about 1.9 as compared with configurations in which a single detection module is coupled to the detector, for an incidence angle of up to about θ~30° (the graphs shown are for one collector; the collection is doubled with the second collector illuminating the opposite side of the photodetector, and the average collection efficiency, with angles up to 30°, is about 0.95). Similarly the collection efficiency for 35° is still approximately 1.6 (twice the average collecting efficiency of 0.85 when using a single detection module coupled to the detector).

Accordingly, the arrangement of FIG. 11C, provides for collecting nearly twice the light and redirecting it onto the detector DET as compared with the collecting power of a similarly sized optical-element/concentrator C and detector used in the configuration of FIG. 11A, which collects light onto only one face of the detector DET. Conversely, for a given sensitivity required, a detector with approximately half the area can be used, reducing the size of the detector and subsequently of the entire system. Furthermore, when the optical axes of each of the optical elements are tilted with respect to their detector surfaces DS, the configuration of FIG. 11C provides for a significantly higher collection power at large incident angles as compared to the collection power of the configuration of FIG. 11B, in which a TIRE reflecting module is not used. The configurations illustrated in FIGS. 11B and 11C may be used alone or in combination to provide a significant saving in a detector active area for a given sensitivity. Furthermore, the use of smaller area photodetectors DET also reduces the capacitance of the detector DET thus providing an additional important advantage in coupling the signal from the photodetector to the system's amplifier.

According to some embodiments of the present invention, coverage of a hemisphere in collecting angles may be obtained by utilizing two pairs of detection modules similar to the pair illustrated in FIG. 11B or FIG. 11C. Each of the pairs is associated with a single detector, such that the two detection module assemblies facilitate a half of sphere coverage. The pairs of detection modules may be oriented orthogonally to one another with respect to the general collection axis GX, such that a first pair is laid, as illustrated in FIG. 11B, or FIG. 11C in the plane of the figure, and the second pair (not illustrated) is laid perpendicular to the first pair with respect to axis GX. To obtain the half of a sphere coverage, the concentrators C1 and C2 of each pair are each tilted with tilt angle α=45° with respect to their common detector DET.

Alternatively, more than four detection modules may be used for covering a total, hemisphere solid angle. For example, six detection modules may be utilized, arranged in three pairs (respectively coupled to three detectors), with approximately 58° angular separation between the detecting aperture axes. In this case pairs of detection modules coupled to opposite sides of a single detection module, as shown in FIGS. 12A and 12B, can be used in two different arrangements for six detection modules, that is three pairs can be arranged as shown in FIGS. 12C and 12D.

Specifically, FIGS. 12A and 12B are schematic illustrations of detection module pairs similar to those illustrated in FIG. 11C, whose tilt angles are specifically adapted for use in a six-detection module arrangements illustrated in FIGS. 12C and 12D. FIG. 12A shows detection module pairs with a tilt angle α~58°, and FIG. 12B shows a detection module pair with a tilt angle of α~32°.

FIGS. 12C and 12D are schematic illustrations of two configurations of six detection modules 212.1-212.6 arranged in three pairs such that their collection apertures CA1 to CA6 are parallel to six faces of a dodecahedron (a 12 face Platonic Solid), The platonic Solid PS is illustrated in the figures only as a guide to the arrangement of the detection modules and is not part of the system. The arrangement and configuration of the detection modules 212.1-212.6 allows use of three detectors DET1-DET3 for collecting light from interrogation wave-beams arriving from any direction within a hemisphere solid angle. Specifically, in the configurations of FIGS. 12C and 12D, two pairs of detection modules 212.1-212.4 form four collection apertures on the circumference of the dodecahedron, and a third pair 212.5-212.6 provides for a collection apertures in the center face (212.5) and in the fifth circumference face of the dodecahedron.

As shown in the example of FIG. 12C, in order to provide for the hemisphere coverage while coupling pairs of detection modules to opposite faces of a common detector, a relatively large tilt angle is required between the collecting optics/aperture axis and the normal to the detector surface. Specifically, the configuration of FIG. 12A with a tilt angle of the order of α~58° is needed. This tilt angle offers improved performance in comparison to the configuration of FIG. 11C where the tilt angle is α~90°.

According to some embodiments of the present invention, an alternative arrangement of the six detection modules 212.1-212.6 is used in which two collecting optics/apertures that are not adjacent to each other (e.g. that are not located parallel to adjacent faces of a dodecahedron) are coupled to a single detector. Specifically, as illustrated in FIG. 12D, considering the dodecahedron, two of the pairs of the detection modules may be arranged such that the collection apertures of each pair face non-adjacent faces of the dodecahedron. Accordingly the angular separation between the collection apertures of each of these pairs is approximately 58×2=116°, that is each collection aperture should be tilted by a small tilt angle of about α~32°. Such small tilt angles used with the configuration of FIG. 11C and/or 12B offer improved performance as compared to the configuration of FIG. 12A. Nevertheless, in this arrangement of detection modules, the collection apertures of the third pair of detection modules remain parallel to adjacent facets of the dodecahedron (namely with angular separation of approximately 58° between them). Accordingly, in case the arrangement of FIG. 11B is used for this third pair of detection modules, the collecting performance may be reduced due to the relatively large tilt angle required at the interface to the detector. This may be solved for example by utilizing individual (un-paired) detection modules (e.g. with the configuration of FIG. 11A) and/or by configuring the third pair as described in the following with reference to FIG. 11C and/or by using larger are detectors specifically for this pair.

Thus, as illustrated in FIG. 12C, in some embodiments the responder 200 may include three sets/pairs of such detection modules wherein the CPCs (C and C2) and elliptic reflectors (TIRE and TIRE2) are configured to provide an angle of 58° between respective CPC axes CX1 and CX2. This provides a six detection module arrangement with 58° angular separation between the detection axes. Alternatively or additionally, as illustrated in FIG. 12D, in some embodiments the responder 200 may include three sets/pairs of such detection modules wherein the CPCs (C and C2) and elliptic reflectors (TIRE and TIRE2) of two pairs configured to provide an angle of 116° between respective CPC axes CX1 and CX2, and the third pair provides an angle of 58° between respective CPC axes CX1 and CX2. This provides a six detection module arrangement with 58° angular separation between the detection axes, but at least the two pairs of detectors with 116° between their optical axes, offer a significantly improved optical collection efficiency.

As noted above, according to some embodiments of the present invention, the collection apertures CA of the detection modules are arranged for completely covering a certain desired total solid angle of collection such as half-a-space. In some embodiments of the present invention the case of circular detection surfaces/detectors are used in association with circular conical solid angles of collection (i.e. light collecting envelopes) which are defined by the concentrators C and their associated collection apertures CA. To this end, according to some embodiments of the present invention, the collection apertures (i.e. their associated conical solid angles of collection) are optimally symmetrically arranged to cover the desired total solid angle of collection. Specifically, half-a-space total collection angle may be divided to symmetrical sections based on the format of the five Platonic Solids such that each collection aperture is configured and laid out for detecting light from a respective section.

For example, considering the first platonic solid, the tetrahedron, If the tetrahedron is mounted in a conscribing sphere representing the full range of angles, for half a sphere, one would need to consider only the angles covered by the three upper faces. These are calculated by considering the circle conscribing each face. Considering each such conscribing circle as a base of a collecting cone envelope, three detectors are obtained, each with a collecting cone subtending θ~54° half apex angle. Similarly for five detectors one would base the division of angles on a hexahedron (or cube), each face subscribed by a circle forming the base of a cone with θ~45° half apex angle. Similarly the collecting envelopes for six detectors are based on a dodecahedron, forming cones with θ~37° half apex angle.

Is should be noted that according to some embodiments of the present invention the concentrators C (e.g. illustrated in FIGS. 11A, 11B, 11C, 11D, and 14A-14B) are configured as a compound parabolic concentrator (CPC). Such concentrator configurations provide for collection apertures CA optimizing both the angular acceptance envelope and the concentration/magnification factor M for the detection modules. Indeed, the concentrating power of a CPC degrades with the requirement for increased acceptance angle θ (e.g. the limiting concentration factors of a CPC of material with n=1.5 are in the order of M(θ=60°)≈3 and M(θ=30°)≈9). Nevertheless use of such concentrators is advantageous even at the lower concentration factors.

One straightforward approach to couple a solid CPC on an optical detector (e.g. on a InGaAs element) is to mount the CPC directly onto the detector's surface. This requires, however, direct access to the manufacturing process of the detector, as suitable anti-reflection coatings and cementing procedures are required for the CPC-detector interface.

Figure 14A:
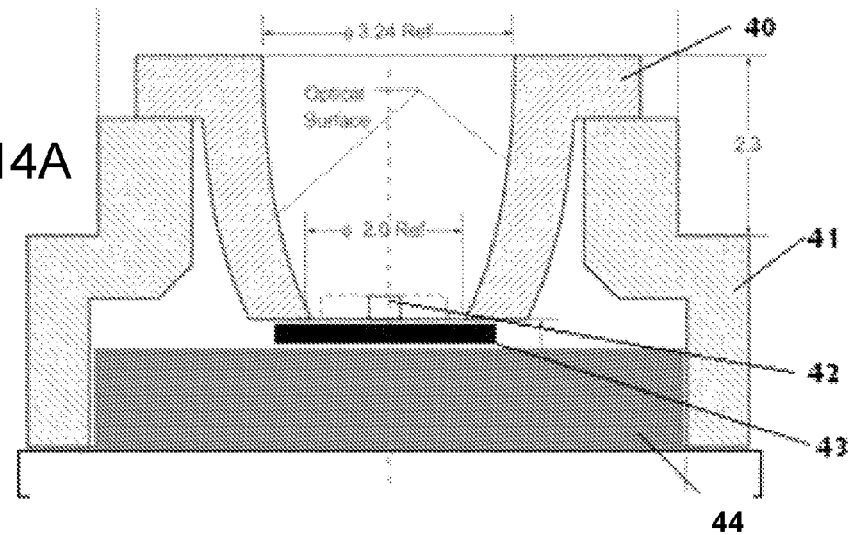
FIGS. 14A and 14B are a schematic illustration of top and side views of a detection module including a reflective compound parabolic concentrator.
Figure 14B:
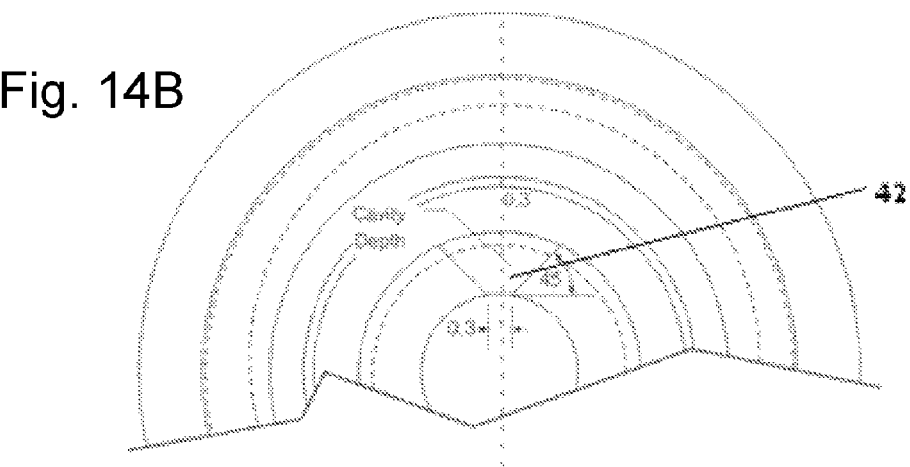

Another technique provided according to the present invention and illustrated in FIGS. 14A and 14B, allows to efficiently mount the CPC on the detector without applying processing in the detector-CPC interface which may require specific manufacturing processes of the detector and/or intervening with the detector's manufacturing. To this end, a concentrator, formed as a hollow reflector in the shape of a CPC is mounted directly onto the detector assembly. Differently from solid CPCs which are formed with solid material in their optical propagation path (such as plastic and/or glass with refraction indices n of about 1.5 or more), a hollow reflective CPC utilizes an air medium in the optical propagation path. Accordingly, in this approach, the standard air-detector interface anti-reflection coating is still suitable, alleviating the complexity of special manufacturing processes.

FIG. 14A shows a cross-sectional view of a detection module (e.g. 212.1) including a hollow reflective CPC, 40, as mounted directly on a 2 mm diameter detector enclosure base, 44. The enclosure base 44 details the detector chip itself, 43, the base material and flange and a portion of the lead wires extending downwards. FIG. 14B shows a top view the CPC reflector 40. The detector chip, 43, is in direct contact with the reflector 40.

According to some embodiments the detection module comprises the CPC reflector, 40, the detector element/active surface 43, an enclosure thereof (e.g. packaging), and a mount (e.g. mounting ring), 41, that is configured for coupling/connecting the CPC reflector 40 to the detector. Specifically the mount 40 fits onto the enclosure base 44 and matches the CPC 40. The overall height of the device for the detection module with the detector and the CPC is about 5 mm (e.g. about 2.5 times the diameter of the detector and less than 2 mm more than the standard package of the detector (e.g. standard TO39 package). The diameter of the detection module is similar to that of the original package of the detector (i.e. with the original cap). In some embodiments a protective window (not shown in FIGS. 14A and 14B) is also mounted onto the assembly (e.g. on top of the CPC) to seal it from the environment. The CPC can, for example, be manufactured with electroforming which is a cost-effective technology for high quality hollow reflectors. In some embodiments the reflective surface of the CPC includes a relief, 42, configured to allow room for the electrical bond wire attached to the detector's front face.

It should be appreciated that the technique of the present invention, as presented in any one of the above figures, can be implemented to generate a combined wave-beam which may be any kind of wave-beam (light, RF, acoustic) having a frequency chosen from a wide range. Nevertheless, in some specific embodiments of the present invention it is preferable to generate the interrogation wave beam utilizing a specific range of wavelengths in the infra-red regime and particularly of about 1.5 µm to 1.7 µm. This limited wavelength range may be used to satisfy several desirable properties of an IFF system. For example, considering interrogation systems designed for mounting on tanks, the desired properties may include: utilizing a relatively small source size (for example, under 1 meter) for producing an interrogation wave-beam having a relatively small lateral extent W (for example, 20 m), with essentially no side lobes, at an operating range R of 0.3 to 4 km from the light beam source. It is generally impractical to obtain these parameter utilizing long wavelengths electromagnetic beams, such as RF, as the divergence of such beams generated by a source having an aperture of about 1 m is much larger than the beam size required, and because relatively large side lobes are formed. On the other hand, when operating in the daylight, the optical detector 210 in the responder 200 may be directly illuminated by the sun and may be affected by shot-noise generated by the intense sun illumination and thereby misidentify the interrogation wave-beam. As such, wavelengths in which the sun illumination is less intense are preferred for better signal-to-noise performance in daylight: these are the shorter wavelengths (blue and UV) and the longer wavelengths, such as near-infrared (NIR) and infrared (IR), or even mm waves or RF. However, the shorter wavelengths, such as visible and UV, are rapidly scattered by the atmosphere and would typically incur high losses over the desired operating range of the system (e.g. 4 km), especially in lower visibility situations (such as rain, fog or smoke). This constraint leads to a preference of longer wavelengths (NIR and IR). Finally, in cases where eye safety is a consideration, eye-safe wavelengths in the range 1.5 µm to 1.7 µm may be selected. This range is in the short wave infrared (SWIR) range, which satisfies the above considerations as well, namely a transmission window in the atmosphere, and decreased intensity by the sun's illumination. In some cases, longer wavelengths within in the IR range may also be used, however the cost, size and limited availability of suitable detectors, optical elements, and sources in these wavelengths make them less favorable for implementing the specific example in which the source of the interrogating beam is mounted on a tank.

It will be evident to those skilled in the art that the invention is not limited to the details of the foregoing illustrated embodiments and that the present invention may be embodied in other specific forms without departing from scope of the attached claims. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A method for producing a wave-beam having substantially constant lateral extent over a desired range of distances, the method comprising generating a plurality of at least partially incoherent constituent wave-beams having different divergences and directing the plurality constituent wave-beams to propagate along substantially parallel propagation axes such that the constituent wave-beams at least partially overlap and superpose to form a combined wave-beam, wherein said divergences and intensities of said constituent wave-beams are selected such that the combined wave-beam has a desired substantially constant lateral extent over a desired range of distances along said propagation axes.

2. The method of claim 1, wherein said constituent wave-beams are emitted from one or more output apertures of dimensions significantly smaller than said desired substantially constant lateral extent, and wherein said one or more output apertures are arranged such that a distance between propagation axes of any two of said constituent wave-beams is significantly smaller than said constant lateral extent of the desired combined wave-beam.

3. The method of claim 1, wherein said plurality of said constituent wave-beams are generated substantially simultaneously, either concurrently or sequentially within a time frame not exceeding a response time of a certain intensity detector.

4. The method of claim 1 wherein each two constituent wave-beams of said plurality of constituent wave-beams are produced with at least one of the following: having different wavelengths, having different polarizations, having different path lengths being on the order or greater than a coherence length, and produced at different times all within a time frame shorter than a response time of a certain detector; thereby resulting with said at least partial incoherence of said plurality of constituent wave-beams.

5. The method of claim 1, further comprising adjusting the lateral extent of the desired combined wave-beam by controllably varying at least one of the divergence or intensity of at least one of the constituent wave-beams.

6. A wave-beam generator, comprising: a wave directing and focusing module adapted for receiving at least one primary wave-beam, and generating a plurality of at least partially incoherent constituent wave-beams having different divergences and directing the plurality of constituent wave-beams to propagate along one or more substantially parallel propagation axes such that the constituent wave-beams at least partially overlap and superpose to form a combined wave-beam, wherein the divergences and intensities of said constituent wave-beams are set such that the combined wave-beam has a desired substantially constant lateral extent over a desired range of distances along said propagation axes.

7. The wave-beam generator of claim 6, comprising: at least one beam source adapted for providing said at least one primary wave-beam; and wherein said wave directing and focusing module comprises: at least one input coupled to the at least one beam source, one or more outputs, and an arrangement of one or more wave-affecting elements arranged to define a plurality of paths of different focusing powers in between said at least one input and said one or more outputs and configured and operable for producing, from said at least one primary wave-beam, said plurality of at least partially incoherent constituent wave-beams having the different divergences and directing them to output from said one or more outputs and propagate along said one or more substantially parallel axes and at least partially overlap to form a combined wave-beam.

8. The wave-beam generator of claim 7, wherein said one or more outputs are associated with apertures of dimensions significantly smaller than said desired substantially constant lateral extent, and are arranged such that a distance between said propagation axes of is significantly smaller than said desired substantially constant lateral extent of the combined wave-beam.

9. The wave beam generator of claim 6 configured for producing one or more groups of constituent wave beams each group including up to four wave-beams having respective linear polarization along desired orientations, each orientation being at least at a 45 degree angle with a preceding orientation and a subsequent orientation; at wherein said different groups differing from one another in at least one of the following parameters: wavelength, polarization, and path length of their constituent wave-beams.

10. The wave beam generator of claim 7, wherein properties of said at least one beam source and said one or more of optical modules are controllable enabling to controllably vary at least one of the following: intensity, divergence, of at least one of the constituent wave-beams, thereby enabling control over the lateral extent of the combined wave-beam.

11. An interrogation system comprising a wave beam generator configured according to claim 6.

12. The system of claim 11, further comprising a wave-beam generation controller adapted for selectively operating said wave-beam generator module for causing the generation of a desired interrogation wave-beam having a desired substantially constant lateral extent over a selected range of distances along a general direction of propagation of the interrogation wave-beam by concurrently producing respective constituent wave-beams of a selected combination of said combinations of the wave-beams selected such that superposition of the respective constituent wave-beams forms said desired interrogation wave-beam with the a desired lateral extent over the selected range.

13. The interrogation system of claim 12 comprising a target detection module comprising a interrogation wave-beam scanning module and adapted for sequentially operating said wave-beam generation controller for sequentially generating two or more interrogation wave-beams associated with at least one of different ranges and different lateral extents thereby enabling determination of a position of a responder system interrogated by one or more of the interrogation beams.

14. The interrogation system of claim 12 comprising an interrogation control module operative in accordance with a predetermined interrogation protocol and adapted for operating said wave-beam generator a to encode said interrogating wave-beam protocol with at least one of the following associated with said predetermined interrogation protocol:
 a) an initialization sequence including series of initialization segments extending over a time duration greater than a predetermined standby time duration of a responder system to be interrogated, thereby enabling said responder system to identify said at least one of said initialization segments after recovering from a standby mode of duration not exceeding said standby time duration;
 b) a synchronization data set encoded based on said predetermined interrogation protocol; includes data indicative of one or more of the following data fields:
  i. end-of-initialization data field marking the end of an initialization sequence;
  ii. authentication data field indicative of at least one of a type and identity of said interrogating system; and
  iii. at least one communication data field indicative of a communication parameter to be used by said target responder system for communication of an acknowledgment response to said interrogation;
 c) intensity measurement sequence that enables said responder to efficiently estimate the intensity of the interrogation wave-beam by utilizing varied amplification gains.

15. The interrogation system of claim 12 comprising an interrogating wave-beam scanning module adapted for sequentially operating said wave generation controller for causing sequential generation of two or more interrogation wave-beams, associated with at least one of different ranges and different lateral extents to thereby enable to estimate the location of said target responder with improved accuracy.

16. The interrogation system of claim 12 wherein said responder is adapted for randomly selecting a time delay for communicating an acknowledgment response signal in response to an interrogation wave-beam detected by the responder to thereby reduce the probability of said acknowledgment response signal interfering with acknowledgment response signals of other responders that may be responding to the same interrogation wave-beam.

17. The system of claim 11, further comprising a responder system comprising: an interrogation beam receiving module configured and operable for detecting said interrogation wave-beam, and a transmission module, configured and operable for transmitting an acknowledgment communication in response to detection of said interrogation wave-beam; and wherein said the interrogation beam receiving module comprises at least one of the following:
 a) an optical detector and one or more wave-guiding modules coupled to said optical detector enabling detection of said interrogation wave-beam by at least two light sensitive faces of said optical detector;
 b) at least three detection modules arranged for detecting an interrogation wave-beam propagating towards the responder system from within an horizontal collection angle of at least 180°.

18. The system of claim 17 wherein collection elements of said at least three detection modules are configured and arrangement to have at least partially overlapping solid collection angles such that a total solid angle of collection of said interrogation beam by the interrogation beam receiving module covers at least the solid angle of a hemisphere.

19. The system of claim 17 wherein the detection module comprises:
 a detector associated with said detection surface; and
 a collection element comprising concentrator module having an output port coupled to said detection surface of the detector and a larger input port defining said collection aperture; and wherein said concentrator module is configured for collecting an interrogation wave-beam arriving to said certain solid angle and to said collection aperture and concentrating the power of the collected interrogation wave-beam and directing it to said output port.

20. The system of claim 19 wherein said detector is a photo-detector sensitive to light radiation in one or more wavelength bands and said concentrator is a non-imaging compound parabolic concentrator (CPC) coupled to said surface of said detector.

21. A responder system comprising:
an interrogation beam receiving module configured and operable for detecting interrogation by an interrogation wave-beam, and a transmission module, configured and operable for emitting an acknowledgment signal in response to detection of said interrogation wave-beam; wherein said interrogation beam receiving module comprises at least three detection modules arranged for detecting an interrogation wave-beam propagating towards the responder system from within an horizontal collection angle of at least 180°
wherein one or more detection modules of said at least three detection modules comprise: a detection surface of a detector sensitive to said interrogation wave-beam; and a collection element comprising concentrator module having an output port coupled to said detection surface of the detector and a larger input port for collecting said interrogation wave-beam arriving thereto from within a certain solid angle and directing the collected interrogation wave-beam to the output port of the concentrator module, while concentrating the power of the collected interrogation wave-beam.

22. The system of claim 21 wherein detection surfaces of at least two of said detection modules are two sensing regions respectively located at two opposite facets of a common detector; and wherein an output port of at least one concentrator module associated with said detection modules is coupled to one of said sensing regions via a total internal reflection module.

* * * * *